US011349874B2

(12) United States Patent
Mahaffey et al.

(10) Patent No.: US 11,349,874 B2
(45) Date of Patent: *May 31, 2022

(54) METHODS AND SYSTEMS FOR PROVIDING A SECURE CONNECTION TO A MOBILE COMMUNICATIONS DEVICE WITH THE LEVEL OF SECURITY BASED ON A CONTEXT OF THE COMMUNICATION

(71) Applicant: LOOKOUT, INC., San Francisco, CA (US)

(72) Inventors: Kevin Patrick Mahaffey, San Francisco, CA (US); Timothy Strazzere, Oakland, CA (US); Brian James Buck, Livermore, CA (US)

(73) Assignee: LOOKOUT, INC., San Francisco, CA (US)

( * ) Notice: Subject to any disclaimer, the term of this patent is extended or adjusted under 35 U.S.C. 154(b) by 320 days.

This patent is subject to a terminal disclaimer.

(21) Appl. No.: 16/250,852

(22) Filed: Jan. 17, 2019

(65) Prior Publication Data
US 2019/0158540 A1 May 23, 2019

Related U.S. Application Data

(63) Continuation of application No. 15/952,110, filed on Apr. 12, 2018, now Pat. No. 10,243,999, which is a (Continued)

(51) Int. Cl.
*H04L 29/06* (2006.01)
*H04L 9/40* (2022.01)
*H04W 12/086* (2021.01)

(52) U.S. Cl.
CPC ............ *H04L 63/20* (2013.01); *H04L 63/105* (2013.01); *H04L 63/18* (2013.01); *H04W 12/086* (2021.01); *H04L 63/08* (2013.01); *H04L 63/14* (2013.01)

(58) Field of Classification Search
CPC ....... H04L 63/20; H04L 63/105; H04L 63/18; H04L 63/08; H04L 63/14; H04W 12/0806
See application file for complete search history.

(56) References Cited

U.S. PATENT DOCUMENTS 6,185,689 B1  2/2001  Todd et al.
6,272,353 B1  8/2001  Dicker et al.
(Continued)

FOREIGN PATENT DOCUMENTS

CN    103167488    6/2013
WO    WO2008007111    1/2008

OTHER PUBLICATIONS

F-Secure, "F-Secure Mobile Security for S60 Users Guide", pp. 1-34, retrieved on Aug. 10, 2011, published on Jan. 26.
(Continued)

*Primary Examiner* — Ayoub Alata
(74) *Attorney, Agent, or Firm* — Dergosits & Noah LLP; Michael E. Dergosits

(57) ABSTRACT

Based on context received regarding a mobile communications device a server determines whether an existing network connection employed by the mobile communications device offers a level of security that is appropriate. When the server determines that the level of security is appropriate, the mobile communications device is allowed to continue using the network connection. Otherwise, the server directs the mobile communications device to terminate the network connection.

21 Claims, 18 Drawing Sheets

Related U.S. Application Data continuation of application No. 14/071,366, filed on Nov. 4, 2013, now Pat. No. 9,973,534.

(56) References Cited

U.S. PATENT DOCUMENTS

| | | | |
|---|---|---|---|
| 6,301,668 B1 | 10/2001 | Gleichauf et al. | |
| 6,453,345 B2 | 9/2002 | Trcka et al. | |
| 6,907,530 B2 | 6/2005 | Wang | |
| 6,959,184 B1 | 10/2005 | Byers et al. | |
| 7,178,166 B1 | 2/2007 | Taylor et al. | |
| 7,236,598 B2 | 6/2007 | Sheymov et al. | |
| 7,237,264 B1 | 6/2007 | Graham et al. | |
| 7,304,570 B2 | 12/2007 | Thomas et al. | |
| 7,437,158 B2 | 10/2008 | Russell | |
| 7,472,422 B1 | 12/2008 | Agbabian | |
| 7,568,220 B2 | 7/2009 | Burshan | |
| 7,634,800 B2 | 12/2009 | Ide et al. | |
| 7,882,247 B2 | 2/2011 | Sturniolo et al. | |
| 7,882,557 B2 | 2/2011 | Coskun et al. | |
| 7,978,691 B1 | 7/2011 | Cole | |
| 8,001,610 B1 | 8/2011 | Chickering et al. | |
| 8,095,172 B1 | 1/2012 | Cole et al. | |
| 8,112,797 B2 | 2/2012 | Coskun et al. | |
| 8,126,456 B2 | 2/2012 | Lotter et al. | |
| 8,127,350 B2 | 2/2012 | Wei et al. | |
| 8,200,773 B2 | 6/2012 | Bluestone et al. | |
| 8,259,568 B2 | 9/2012 | Laudermilch et al. | |
| 8,464,335 B1 | 6/2013 | Sinha et al. | |
| 8,484,332 B2 | 7/2013 | Bush et al. | |
| 2004/0022258 A1 | 2/2004 | Tsukada et al. | |
| 2004/0120260 A1 | 6/2004 | Bernier | |
| 2004/0225887 A1 | 11/2004 | O'Neil et al. | |
| 2004/0259532 A1 | 12/2004 | Isomaki et al. | |
| 2005/0010821 A1 | 1/2005 | Cooper et al. | |
| 2005/0074106 A1 | 4/2005 | Orlamunder et al. | |
| 2005/0076246 A1 | 4/2005 | Singhal | |
| 2005/0091308 A1 | 4/2005 | Bookman et al. | |
| 2005/0102514 A1 | 5/2005 | Bergenwall | |
| 2005/0130627 A1 | 6/2005 | Calmels et al. | |
| 2005/0240999 A1 | 10/2005 | Rubin et al. | |
| 2005/0278777 A1 | 12/2005 | Loza | |
| 2006/0075472 A1* | 4/2006 | Sanda | G06F 21/316 726/3 |
| 2006/0130145 A1 | 6/2006 | Choi et al. | |
| 2006/0150238 A1 | 6/2006 | D'Agostino | |
| 2006/0224742 A1 | 10/2006 | Shahbazi | |
| 2006/0253584 A1 | 11/2006 | Dixon et al. | |
| 2006/0272011 A1 | 11/2006 | Ide et al. | |
| 2006/0277408 A1 | 12/2006 | Bhat et al. | |
| 2006/0294582 A1 | 12/2006 | Linsley-Hood et al. | |
| 2007/0011319 A1 | 1/2007 | McClure et al. | |
| 2007/0015519 A1 | 1/2007 | Casey | |
| 2007/0028095 A1 | 2/2007 | Allen et al. | |
| 2007/0089165 A1 | 4/2007 | Wei et al. | |
| 2007/0154014 A1 | 7/2007 | Aissi et al. | |
| 2007/0186275 A1 | 8/2007 | Shahbazi | |
| 2007/0214245 A1 | 9/2007 | Hamalainen et al. | |
| 2007/0214504 A1 | 9/2007 | Milani Comparetti et al. | |
| 2007/0250627 A1 | 10/2007 | May et al. | |
| 2007/0293263 A1 | 12/2007 | Eslambolchi et al. | |
| 2008/0070495 A1 | 3/2008 | Stricklen et al. | |
| 2008/0109871 A1 | 5/2008 | Jacobs | |
| 2008/0134281 A1 | 6/2008 | Shinde et al. | |
| 2008/0148381 A1 | 6/2008 | Aaron | |
| 2008/0172746 A1 | 7/2008 | Lotter et al. | |
| 2008/0178294 A1 | 7/2008 | Hu et al. | |
| 2008/0181116 A1 | 7/2008 | Kavanaugh et al. | |
| 2008/0318562 A1 | 8/2008 | Featherstone et al. | |
| 2008/0275992 A1 | 11/2008 | Basty et al. | |
| 2009/0070283 A1 | 3/2009 | Kang et al. | |
| 2009/0205016 A1 | 8/2009 | Milas | |
| 2010/0064341 A1 | 3/2010 | Aldera | |
| 2010/0100939 A1 | 4/2010 | Burgess et al. | |
| 2010/0100959 A1 | 4/2010 | Mahaffey | |
| 2010/0154032 A1 | 6/2010 | Ollmann | |
| 2011/0107414 A1 | 5/2011 | Diab et al. | |
| 2011/0195665 A1* | 8/2011 | Friedlaender | H04M 1/72577 455/41.2 |
| 2011/0235624 A1 | 9/2011 | Scott et al. | |
| 2012/0042382 A1 | 3/2012 | Mahaffey | |
| 2012/0084836 A1 | 4/2012 | Mahaffey et al. | |
| 2012/0159607 A1 | 6/2012 | Wei et al. | |
| 2012/0173680 A1 | 7/2012 | Coskun et al. | |
| 2012/0233674 A1 | 9/2012 | Gladstone et al. | |
| 2012/0240183 A1 | 9/2012 | Sinha | |
| 2012/0254285 A1 | 10/2012 | Tiger et al. | |
| 2012/0311659 A1 | 12/2012 | Narain et al. | |
| 2013/0097710 A1 | 4/2013 | Basavapatna et al. | |
| 2013/0155879 A1 | 6/2013 | He | |
| 2013/0294602 A1 | 11/2013 | Huxham | |

OTHER PUBLICATIONS

Kaspersky "Kaspersky Mobile Security", available at http://usa.kaspersky.com/products-services/home-computer-security, published on Jan. 1, 2007, retrieved on Oct. 21, 2008, 1 page.

"Kaspersky Mobile Security", Kaspersky Lab 2008, available at http://www.kaspersky.com/kaspersky_mobile_security, retrieved on Sep. 11, 2008, published on Jun. 22, 2010, 2 pages.

TippingPoint "TippingPoint Security Management System (SMS)", available at http://www.tippingpoint.com/products_sms.html, retrieved on Oct. 21, 2008, published on Mar. 31, 2005, 2 pages.

Summerson, Cameron "5 Android Antivirus Apps Compared, Find Out Which Ones Are Worth Having!," Android Headlines, available at http://androidheadlines.com/2011/03/5-android-antivirus-apps-comapred-find-out-which-ones-are-worth-having.html, retrieved on Mar. 30, 2012, published on Mar. 8, 2011, 9 pages.

"Get the Physical Location of Wireless Router From its MAC Address (BSSID)," Coderrr, available at http://coderrr.wordpress.com/2008/09/10/get-the-physical-location-of-wireless-router-from-its-mac-address-bssid/, retrieved on Mar. 30, 2012, published on Sep. 12, 2008, 13 pages.

Diligenti, M., et al. Focused Crawling Using Context Graphs:, Proceedings of the 26th VLDB Conference, Cairo, Egypt, pp. 1-8, available at www.vldb.org/conf/2000/P257.pdf, retrieved on Oct. 21, 2008, published on Sep. 10, 2000.

Grafio "Stay Secure", available at http://widgets.opera.com/widget/4495/, retrieved Oct. 21, 2008, published on Sep. 29, 2008, 4 pages.

Dormann et al. "Securing Your Web Browser", Software Engineering Institute, Carnegie Mellon. Web page downloaded Nov. 4, 2013 from http://www.cert.org/tech_tips/securing_browser/, pp. 1-17.

* cited by examiner

METHODS AND SYSTEMS FOR PROVIDING A SECURE CONNECTION TO A MOBILE COMMUNICATIONS DEVICE WITH THE LEVEL OF SECURITY BASED ON A CONTEXT OF THE COMMUNICATION

CROSS-REFERENCE TO RELATED CASES

This application is a continuation of U.S. patent application Ser. No. 15/952,110, entitled "METHODS AND SYSTEMS FOR PROVIDING SECURE NETWORK CONNECTIONS TO MOBILE COMMUNICATIONS DEVICES," filed on Apr. 12, 2018, notice of allowance mailed on Oct. 17, 2018, which is a continuation of U.S. patent application Ser. No. 14/071,366, entitled "METHODS AND SYSTEMS FOR SECURE NETWORK CONNECTIONS," filed on Nov. 4, 2013, now U.S. Pat. No. 9,973,534, which are both hereby incorporated by reference.

BACKGROUND

The present disclosure relates to the field of mobile technology and more particularly, to systems and techniques that relate to network connections.

Mobile computing devices seem to be everywhere. People can be found using their mobile devices in their homes and offices, at the airport, in coffee shops and libraries, and many other places. Mobile apps on these devices are used for both personal and business purposes. People use their mobile devices for tasks as diverse and varied as checking the weather, reading the news, managing their finances, shopping, making appointments with their doctor, checking their business and personal e-mail, and producing work-related reports and analysis—just to name a few examples.

The rise and ubiquity of such devices has been accompanied by a rise in information and identity theft, snooping, eavesdropping, and other unsavory acts. Users have seen their bank accounts emptied, identities stolen, and personal health information improperly accessed. Corporations have seen their intellectual property stolen, trade secrets misappropriated, and so forth.

A secure network connection can help to thwart such attacks. Such a connection, however, is not without disadvantages. For example, such connections can be cumbersome to make and may adversely affect response times. Therefore, there is a need to provide more intelligent approaches to managing network connections.

BRIEF SUMMARY OF THE INVENTION

Context information associated with a mobile communications device and a network connection for the mobile communications device is collected. A security policy is applied to determine whether the security offered by the network connection is appropriate for the context. If the security offered by the network connection is not appropriate for the context, the network connection may be made more secure, less secure, or a different network connection having an appropriate level of security may be used for the data associated with the context.

In a specific implementation, disclosed are systems and methods relating to secure network connections with mobile communications devices. Mobile banking activities can be secured, safe mobile browsing can be ensured, malware can be identified before reaching the mobile device, and the device can be prevented from communicating with malware servers. A server may receive a request for a secure network connection account. A mobile communications device may generate the request in response to a trigger. A server may generate a secure network account in response to receiving the request. The secure network connection account may include credentials for a secure network connection. The credentials may be transmitted to the mobile communications device. A secure network connection may be established with the mobile communications device based on the credentials. Furthermore, a trigger may be identified by analyzing network traffic in the secure network connection. The secure network connection may be modified in response to identifying the trigger.

In a specific implementation, a method includes storing on a mobile communications device a security policy to manage network connections, collecting context information at the mobile communications device to evaluate a first network connection between the mobile communications device and a target destination, applying the security policy using the collected context information at the mobile communication device, and based on the application of the security policy, determining whether or not there should be a second network connection between the mobile communications device and the target destination, where the second network connection offers a level of security different from a level of security offered by the first network connection.

The method may further include if the step of determining whether there should be a new network connection between the mobile communication device and the target destination is that a second network connection should be established, terminating the first network connection, and establishing the second network connection between the mobile communications device and the target destination, where the level of security offered by the second network connection is greater than the level of security offered by the terminated first network connection.

The method may further include if the step of determining whether there should be a new network connection between the mobile communication device and the target destination is that a second network connection should be established, terminating the first network connection, and establishing the second network connection between the mobile communications device and the target destination, where the level of security offered by the second network connection is less than the level of security offered by the terminated first network connection.

The level of security offered by one of the first or second network connection may include encryption of the respective network connection, the one of the first or second network connection thereby offering a greater level of security than another of the first or second network connection.

In another specific implementation, the method further includes storing at the mobile communications device a list including a plurality of target destinations, and a plurality of categories, each target destination being categorized into a category of the plurality of categories, scanning the list to identify a category of the target destination, if the target destination is in a first category, determining that there should be the second network connection between the mobile communications device and the target destination, and if the target destination is in a second category, different from the first category, determining that there should not be the second network connection between the mobile communications device and the target destination.

The method may further include transmitting from the mobile communications device to a server a request to identify a category of the target destination, receiving from the server the category of the target destination, if the target destination is in a first category, determining that there should be the second network connection between the mobile communications device and the target destination, and if the target destination is in a second category, different from the first category, determining that there should not be the second network connection between the mobile communications device and the target destination. The context information may include a security level of the first network connection.

The method may further include determining that there should be the second network connection between the mobile communications device and the target destination because the level of security offered by the first network connection is not appropriate based on user activity included in the collected context information. The method may further include determining that there should be the second network connection between the mobile communications device and the target destination because the level of security offered by the first network connection is not appropriate based on a location of the mobile communications device included in the collected context information.

In another specific implementation, a method includes storing on a mobile communications device a security policy to manage network connections, on the mobile communications device, intercepting an attempt by the mobile communications device to establish a first network connection between the mobile communications device and a target destination, and applying the security policy on the mobile communications device according to context information associated with the mobile communications device to determine whether or not a second network connection should be established between the mobile communications device and the target destination, where a level of security offered by the first network connection is different from a level of security offered by the second network connection.

The method may further include in the applying step, determining that the second network connection need not be established, and allowing the first network connection to be established between the mobile communications device and the target destination, while the first network connection is established between the mobile communications device and the target destination, collecting new context information associated with the mobile communications device on the mobile communication device, and based on the newly collected context information, applying the security policy on the mobile communications device to determine whether or not the second network connection should be established between the mobile communications device and the target destination, where the level of security offered by the second network connection is greater than the level of security offered by the first network connection.

The method may further include in the applying step, determining that the second network connection need not be established and allowing the first network connection to be established between the mobile communications device and the target destination, while the first network connection is established between the mobile communications device and the target destination, collecting new context information associated with the mobile communications device on the mobile communication device, and based on the newly collected context information, applying the security policy on the mobile communications device to determine whether or not the second network connection should be established between the mobile communications device and the target destination, where the level of security offered by the second network connection is less than the level of security offered by the first network connection.

The method may further include in the applying step, determining that the second network connection need not be established and allowing the first network connection to be established between the mobile communications device and the target destination, while the first network connection is established between the mobile communications device and the target destination, collecting new context information associated with the mobile communications device on the mobile communication device, and based on the newly collected context information, applying the security policy on the mobile communications device to determine whether or not the first network connection should remain established between the mobile communications device and the target destination, where the level of security offered by the first network connection is greater than the level of security offered by the second network connection.

The method may further include in the applying step, determining that the first network connection should be established between the mobile communications device and the target destination, while the first network connection is established between the mobile communications device and the target destination, collecting new context information associated with the mobile communications device on the mobile communications device, and based on the newly collected context information, applying the security policy on the mobile device to determine whether or not the first network connection should remain established between the mobile communications device and the target destination, where the level of security offered by the first network connection is less than the level of security offered by the second network connection.

In another specific implementation, a method includes at a mobile communications device connected to a target destination via a first network connection, receiving a security policy specifying a particular type of network connection to be used during a particular context, on the mobile communication device, collecting context information associated with the mobile communications device, on the mobile communication device, analyzing the collected context information and determining whether or not the context information corresponds to the particular context specified in the security policy, and upon a determination that the collected context information corresponds to the particular context specified in the security policy, determining whether or not the type of network connection established between the mobile communications device and the target destination matches the particular type of network connection specified in the security policy.

The method may further include if the type of network connection established between the mobile communications device and the target destination does not match the particular type of network connection specified in the security policy, terminating the first network connection and establishing a second network connection between the mobile communications device and the target destination, where the second network connection is of the particular type specified in the policy, and where a level of security offered by the second network connection is greater than a level of security offered by the terminated first network connection.

The method may further include if the type of network connection established between the mobile communications device and the target destination does not match the particular type of network connection specified in the security policy, terminating the first network connection and establishing a second network connection between the mobile communications device and the target destination, where the second network connection is of the particular type specified in the policy, and where a level of security offered by the second network connection is less than a level of security offered by the terminated first network connection.

In another specific implementation, a method includes receiving, at a server, context information associated with a mobile communications device, at the server, analyzing the context information to determine whether a first existing network connection from the mobile communications device for a first application program executing on the mobile communications device offers a level of security appropriate for the first application program, if the first existing network connection does not offer the appropriate level of security, sending instructions to the mobile communications device to terminate the first existing network connection, and if the first existing network connection does offer the appropriate level of security, then allowing the first existing network connection to be maintained on the mobile communications device.

The method may further include after the step of sending instructions to the mobile communication device to terminate the first existing network connection, at the server, sending instructions to the mobile communications device to establish a second network connection for the first application program executing on the mobile communications device, where a level of security offered by the second network connection is greater than a level of security offered by the terminated first existing network connection.

The method may further include after the step of sending instructions to the mobile communications device to terminate the first existing network connection, at the server sending instructions to the mobile communications device to establish a second network connection for the first application program executing on the mobile communications device, where a level of security offered by the second network connection is less than a level of security offered by the terminated first existing network connection.

Other objects, features, and advantages of the present invention will become apparent upon consideration of the following detailed description and the accompanying drawings, in which like reference designations represent like features throughout the figures.

DETAILED DESCRIPTION

Figure 1:
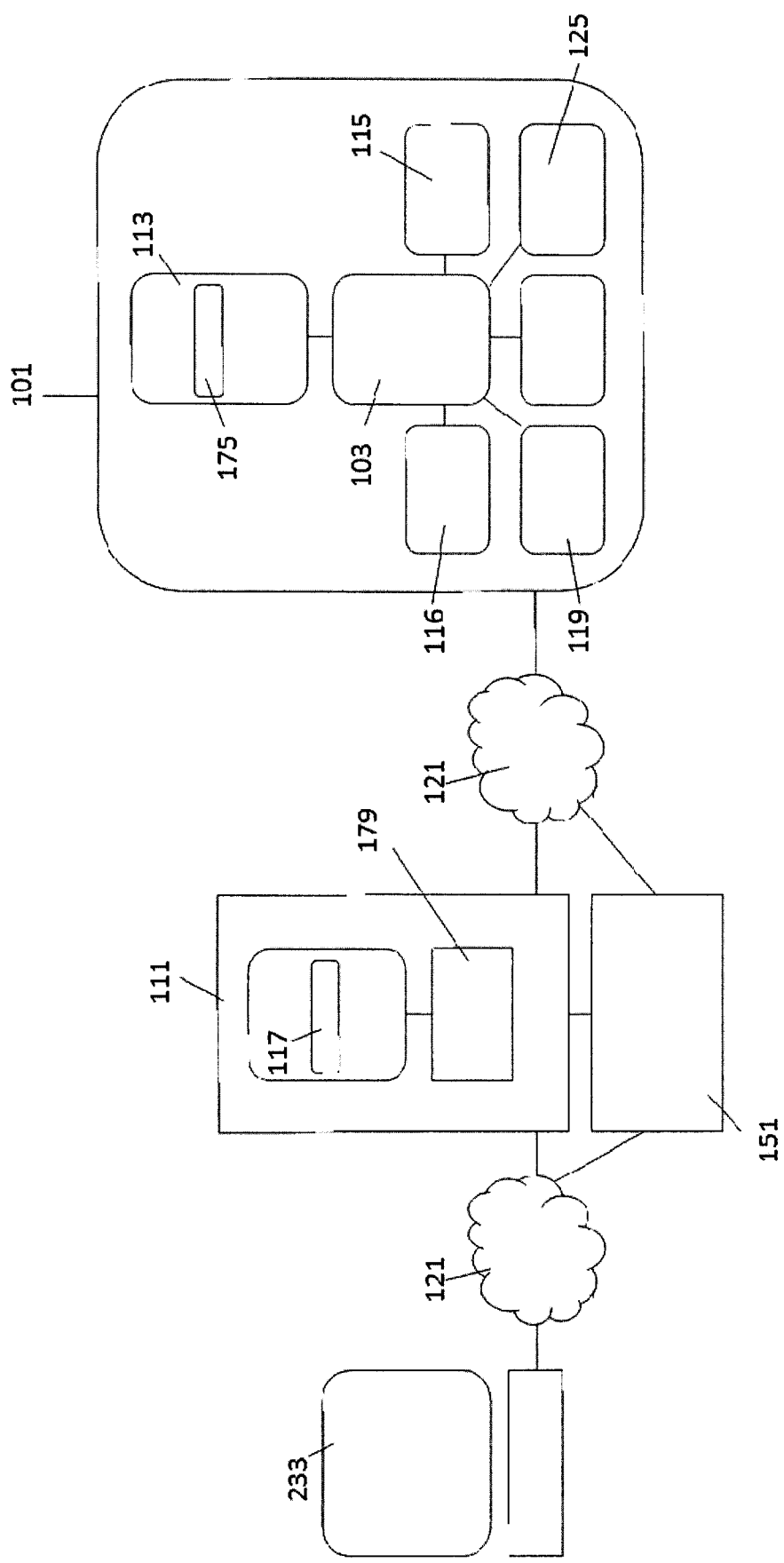
FIG. 1 shows a block diagram of a system for providing services to a mobile communications device, in accordance with some implementations.

It should be appreciated that the present systems and techniques can be implemented in numerous ways, including as a process, an apparatus, a system, a device, a method, or a computer readable medium such as a computer readable storage medium containing computer readable instructions or computer program code, or a computer network wherein computer readable instructions or computer program code are sent over optical or electronic communication links.

Applications, software programs or computer readable instructions may be referred to as components or modules. Applications may take the form of software executing on a general purpose computer or be hardwired or hard coded in hardware. Applications may also be downloaded in whole or in part through the use of a software development kit, framework, or toolkit that enables the creation and implementation of the present systems and techniques. In general, the order of the steps of disclosed processes may be altered within the scope of the invention.

As used herein, the term "mobile communications device" refers to mobile phones, PDAs and smartphones. The term "mobile communications device" also refers to a class of laptop computers which run an operating system that is also used on mobile phones, PDAs, or smartphones. Such laptop computers are often designed to operate with a continuous connection to a cellular network or to the internet via a wireless link. Mobile communications devices may include devices for which wireless communications services such as voice, messaging, data, or other wireless Internet capabilities are a primary function. As used herein, a "mobile communications device" may also be referred to as a "device," "mobile device," "mobile client," or "handset." However, a person having skill in the art will appreciate that while the systems and techniques are disclosed herein as being used on mobile communications devices, features of the system may also be used on other computing platforms, including desktop, laptop, notebook, netbook or server computers.

As used herein, the term "client computer" refers to any computer, embedded device, mobile communications device, or other system that can be used to perform the functionality described as being performed by the client computer. Specifically, client computers include devices which can be used to display a user interface by which the functionality provided by the server can be utilized by a user. Client computers may be able to display a web page, load an application, load a widget, or perform other display functionality that allows the client computer to report information from the server to the user and to receive input from the user in order to send requests to the server.

A user of a device or an administrator of a device may desire an appropriate level of security on a network connection made by a device to protect the privacy of data sent or received over the network connection, or to ensure that authentication information sent over the connection cannot be leaked nor impersonated.

Examples of network connections include virtual private network (VPN) connections or other secure tunneling protocols, HTTPS connections (SSL/TLS) either directly to a target network endpoint or to an intermediate proxy server, or other forms of encryption from end-to-end over a network connection, or over part of a network connection, e.g., using an SSL connection to a proxy server to prevent eavesdropping on the portion of the network connection being transmitted over a coffeeshop Wi-Fi connection. Various types of secure network connections (SNC) can be used.

An SNC may be a virtual private network (VPN) connection, which is a network connection in which a private network connection is established over a public network. A VPN connection may enable a host computer or server to send and receive data across shared or public networks as if they were part of a private network. This may be accomplished by using a tunneling protocol to tunnel traffic from one end point to another end point.

An SNC connection may use authentication information to authenticate both endpoints of the SNC tunnel. Accordingly, a first end point, such as a client machine or mobile communications device, may be configured using authentication information. Furthermore, a second end point, such as a server, may also be configured using authentication information. Accordingly, the two endpoints may use the authentication information to authenticate themselves to each other and establish the SNC connection.

Conventional methods remain limited because they do not detect when a secure connection should be established, and they do not automatically create an appropriate level of secure connection in such circumstances. Moreover, conventional methods do not provide the ability to efficiently and automatically manage secure connections once they have been established.

Conventional methods of establishing and managing secure connections remain limited because they largely rely on manual intervention to establish the connection and modify the connection once established. For example, a user employing a VPN for a secure connection may have to manually configure his or her VPN settings at a mobile communications device when the user determines that a VPN connection should be established.

Moreover, a network or organizational administrator may need to configure the one or more servers that may serve as the other end point of the VPN connection. Conventional methods repeat this process whenever a VPN connection is desired. Thus, the user has to remember to configure the VPN connection each time, and must do so manually when appropriate. Such laborious conventional methods of manually establishing VPN connections are complicated and error-prone. If a VPN connection is configured to automatically connect all the time (to make it simpler for the user) it may impose performance overhead for times or tasks when a VPN connection is used, but is either not needed or is inappropriate, for example, on an internal corporate network.

Systems and methods are disclosed herein that may automatically detect when a secure connection should be established with a mobile communications device. Moreover, the secure connection may be automatically configured and established, with a level of security based on contextual information. Accordingly, a process residing on the mobile communications device or at a server may automatically detect a trigger which is an event or condition in which a secure connection should be used. In response to detecting the trigger, credentials for the secure connection may be automatically generated and implemented. In this way, a secure connection may be created automatically and dynamically while a user is using a mobile communications device and without user intervention. Once the secure connection has been established, a mobile communications device may be provided with a secure tunnel that is secure from sniffing and various malicious attacks.

Moreover, an endpoint of the tunnel may be controlled to provide additional security functionalities for all traffic that flows through the secure tunnel, such as modified or enhanced functionality of a domain name system (DNS) server. An example of a security feature provided via the secure connection may be prevention from malware attacks.

As similarly discussed above, suspicious behavior on the mobile communications device may automatically trigger the establishment of a secure connection. Once the secure connection has been established, traffic inside the tunnel may be controlled to prevent malicious activities performed by malware that may reside on the device, such as downloading malicious files or communicating with a command and control server.

An additional security functionality provided via the secure connection may be safe internet browsing. For example, attempted connections to blacklisted domains and/or internet protocol (IP) addresses or ranges may be detected and/or prevented. The blacklisting of domains and addresses may be at any level of the domain structure. For example, a domain may be blacklisted if it matches "*.ru" or "*.badsite.ru." Furthermore, blacklisting may include specific IP addresses, or IP address blocks for specific organizations or geographic top-level domains.

It will be appreciated that whitelisting may be performed as well as blacklisting, as is further discussed in U.S. patent application Ser. No. 13/160,382 (the '382 application), filed Jun. 14, 2011, (Publication No. 2012/0324568), which is incorporated herein by this reference. In some implementations, whitelisting and blacklisting are performed based on categories associated with types of connection identifiers.

For example, an electronic communication may be categorized based on an analysis of an identifier included in the electronic communication, such as a business category associated with a recipient of the electronic communication, or a presence or absence of the recipient in a contact list. The electronic communication may be whitelisted or blacklisted based on its associated category, as is discussed in greater detail in U.S. patent application Ser. No. 13/693,877 (the '877 application), filed Dec. 4, 2012, which is incorporated herein by this reference. Blocking can be based on not just the categories as described in the '382 application, but also the use of categories to allow or restrict connections or communications as described in the '877 application.

Prior to describing the subject matter in detail, an example of a mobile communications network in which the subject matter may be implemented shall first be described. Those of ordinary skill in the art will appreciate that the elements illustrated in FIG. 1 may vary depending on the system implementation.

FIG. 1 shows a block diagram of a system for providing services to a mobile communications device, in accordance with some implementations. The mobile communications device 101 includes: an operating system 113, an input device 115, a radio frequency transceiver(s) 116, a visual display 125, and a battery or power supply 119. Each of these components is coupled to a central processing unit (CPU) 103. The device operating system 113 runs on the CPU 103 and enables interaction between security system application programs and the mobile communications device hardware components.

In an embodiment, the mobile communications device 101 receives data through an RF transceiver(s) 116 which may be able to communicate via various networks, for example: Bluetooth, local area networks such as Wi-Fi, and cellular networks such as GSM or CDMA.

In an embodiment, a local software component 175 is an application program that is downloaded to a mobile communications device and installed so that it integrates with the operating system 113. Much of the source code for the local software component 175 can be reused between various mobile communications device platforms by using a cross-platform software architecture.

In such a system, the majority of software functionality can be implemented in a cross-platform core module. The cross-platform core can be universal, allowing it to interface with various mobile communications device operating systems by using a platform-specific module and a platform abstraction module that both interact with the mobile communications device operating system 113. See, e.g., U.S. patent application Ser. No. 12/255,626, filed Oct. 21, 2008, now U.S. Pat. No. 8,099,472, issued Jan. 17, 2012, which is incorporated herein by this reference. In another embodiment, the local software component 175 can be device, platform or operating system specific.

The mobile communications device 101 accesses a communications network 121 which permits access to a server 111. The server 111 may also be accessed by a client computer 233 via network 121. The network 121 will normally be the Internet but can also be any other communications network. Alternatively, the mobile communications device 101 may access the server 111 by a different network than the network that the client computer 233 uses to access the server 111. In an embodiment, the server 111 is provided with server software 117.

The server software 117 on the server 111 provides functionality to allow two-way communication between the server 111 and the mobile communications device 101, as well as two-way communication between the server 111 and the client computer 233 also through the network 121. The server software 117 on the server 111 enables the client computer 233 to access the mobile communications device 101 and issue commands from the client computer 233 to the mobile communications device 101.

The server software 117 also allows for the mobile communications device 101 to communicate with the client computer 233 to deliver status information about the mobile communications device 101 after the commands from the client computer 233 have been executed or while they are in progress. Furthermore, the server software 117 allows data, such as location-related information, pictures, contacts, videos, SMS messages, call history, event logs, and settings to be transferred from the mobile communications device 101 to the client computer 233 and from the client computer 233 to the mobile communications device 101.

In an embodiment, the server software 117 generates a web page for display on the client computer 233 which allows an authorized user to use remote access and configuration controls relating to the mobile communications device 101. In an embodiment, the server also includes a data store 179 that is used to store backed-up data, profile information, and other information pertaining to the mobile communications device 101.

In an embodiment, an offering server 151 has access to server 111 and mobile communications device 101. As will be discussed further below, offering server 151 may generate one or more offers to replace mobile communication device 101 in the event that device 101 is lost, stolen, compromised, or otherwise becomes a candidate for replacement. In an embodiment, offering server 151 may be a separate or part of server 111.

Of course, it is understood by those of ordinary skill in the art that the functionality performed by server 111 does not necessarily have to be accomplished on a single hardware device. In this context, the use of the term server is intended to refer to one or more computers operating in cooperation or collaboration to provide the functionality described herein.

The computers may be co-located or in different locations. The computers may inter-operate in such a way that portions of functionality are provided by separate services that may or may not be operated by the same entity as other computers which provide other functionality. For example, one set of servers may provide data storage functionality while another provides all other functionality. The data storage servers may be operated by a separate company than the servers that provide the other functionality. S3 (simple storage system), from Amazon, Inc. is such a data storage service which may be utilized by separate set of computers to enable the present systems and techniques.

With regard to the client computer 233, in the preferred embodiment, the client computer accesses the server software 117 on the server 111, and does not require that the client computer 233 to possess computer program instruction sets for the server software 117 locally. However, in certain embodiments, the client computer 233 can be programmed with software that allows it to remotely control or access a mobile communications device.

In various implementations, specific communication protocols are used between the server 111 and the local software component 175 on the mobile communications device 101 to facilitate secure communications. In a preferred embodiment, commands can be sent both from the server 111 to the client 101 and from the client 101 to the server 111. The connection uses a standardized transport protocol such as HTTP to transmit data in both directions. The connection may use a security layer such as TLS (Transport Layer Security) or SSL (Secure Sockets Layer).

Because HTTP is composed of request and response pairs, in order to support a persistent connection, multiple request and response pairs are strung together. A protocol such as SyncML is used on top of the HTTP layer to structure the information exchanged between the mobile communications device 101 and the server 111 and manage the logical session that is composed of the individual HTTP request and response pairs. The mobile communications device 101 will initiate a connection whenever it has commands to send to the server 111 or when the server 111 indicates that it has commands to send to the device 101. The device 101 continues sending HTTP requests to which the server 111 responds while either the mobile communications device 101 or server 111 have outstanding commands.

It is understood to one of ordinary skill in the art that the device 101 and the server 111 may be configured to communicate in ways other than those directly described in this disclosure to perform the functionality of the inventive system. Such additional manners of communication include using different transport protocols (e.g. TCP instead of HTTP), using different structured data formats (e.g. JSON instead of XML), using different indication mechanisms (e.g. XMPP instead of SMS), and other changes that do not meaningfully alter the functionality or functions provided by the present system.

Figure 2:
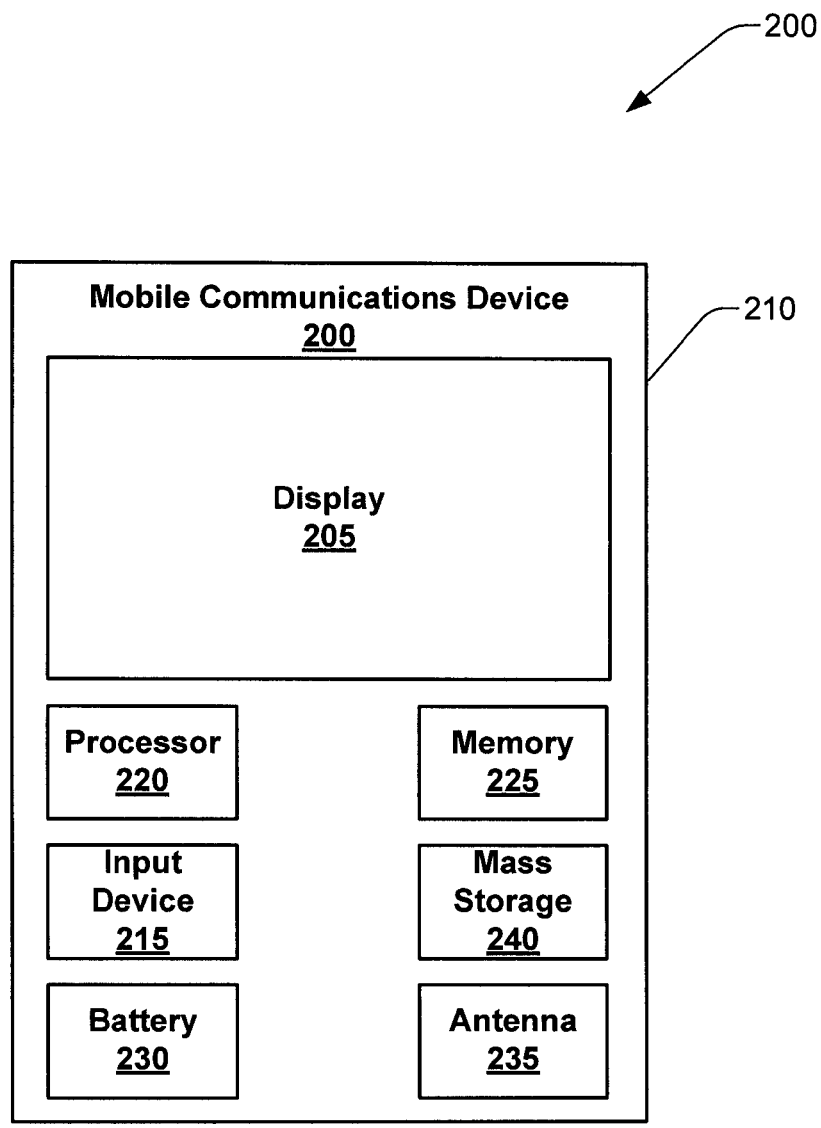
FIG. 2 shows an example of a mobile communications device, in accordance with some implementations.

FIG. 2 shows an example of a mobile communications device, in accordance with some implementations. In an embodiment, a user interfaces with the system through a mobile communications device. Accordingly, mobile communications device 200 includes a display, screen, or monitor 205, housing 210, and input device 215. Housing 210 houses familiar components, some of which are not shown, such as a processor 220, memory 225, battery 230, speaker, transceiver, antenna 235, microphone, ports, jacks, connectors, camera, input/output (I/O) controller, display adapter, network interface, mass storage devices 240, and the like.

Input device 215 may also include a touchscreen (e.g., resistive, surface acoustic wave, capacitive sensing, infrared, optical imaging, dispersive signal, or acoustic pulse recognition), keyboard (e.g., electronic keyboard or physical keyboard), buttons, switches, stylus, or combinations of these.

Mass storage devices 240 may include flash and other nonvolatile solid-state storage or solid-state drive (SSD), such as a flash drive, flash memory, or USB flash drive. Other examples of mass storage include mass disk drives, magnetic disks, optical disks, magneto-optical disks, fixed disks, hard disks, battery-backed-up volatile memory, and other similar media, and combinations of these.

The system may also have different configurations, e.g., with additional or fewer subsystems. For example, a mobile communications device could include more than one processor (i.e., a multiprocessor system, which may permit parallel processing of information) or a system may include a cache memory. The mobile communications device shown in FIG. 2 is but an example of a communications device suitable for use.

Other configurations of subsystems suitable for use will be readily apparent to one of ordinary skill in the art. For example, in a specific implementation, the mobile communications device is a smartphone or tablet computer. Some specific examples of smartphones include the Droid Incredible and Google Nexus One, provided by HTC Corporation, the iPhone or iPad, both provided by Apple, and many others. The mobile communications device may be a netbook.

A computer-implemented or computer-executable version of the program instructions useful to practice the systems and techniques described in this application may be embodied using, stored on, or associated with computer-readable medium. A computer-readable medium may include any medium that participates in providing instructions to one or more processors for execution. Such a medium may take many forms including, but not limited to, nonvolatile, volatile, and transmission media.

Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software useful to practice the techniques described in this application may be stored or reside in RAM or cache memory, or on mass storage device 240. The source code of this software may also be stored or reside on mass storage device 240 (e.g., flash drive, hard disk, magnetic disk, tape, or CD-ROM). As a further example, code useful for practicing the techniques described in this application may be transmitted via wires, radio waves, or through a network such as the Internet. In another specific embodiment, a computer program product including a variety of software program code to implement features described in this application is provided.

Computer software products may be written in any of various suitable programming languages, such as C, C++, C#, Pascal, Fortran, Perl, Matlab (from MathWorks, www.mathworks.com), SAS, SPSS, JavaScript, CoffeeScript, Objective-C, Objective-J, Ruby, Python, Erlang, Lisp, Scala, Clojure, and Java. The computer software product may be an independent application with data input and data display modules. Alternatively, the computer software products may be classes that may be instantiated as distributed objects. The computer software products may also be component software such as Java Beans (from Oracle) or Enterprise Java Beans (EJB from Oracle).

An operating system for the system may be the Android operating system, iPhone OS (i.e., iOS), Windows Phone, Symbian, BlackBerry OS, Palm web OS, bada, Embedded Linux, MeeGo, Maemo, Limo, or Brew OS. Other examples of operating systems include one of the Microsoft Windows family of operating systems (e.g., Windows 95, 98, Me, Windows NT, Windows 2000, Windows XP, Windows XP x64 Edition, Windows Vista, Windows 7, Windows 8, Windows CE, Windows Mobile, Windows Phone 7), Linux, HP-UX, UNIX, Sun OS, Solaris, Mac OS X, Alpha OS, AIX, IRIX32, or IRIX64. Other operating systems may be used.

Furthermore, the mobile communications device 200 may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system useful in practicing the systems and methods in this application using a wireless network employing a protocol such as Wi-Fi (IEEE standards 802.11, 802.11a, 802.11b, 802.11e, 802.11g, 802.11i, and 802.11n).

Figure 3:
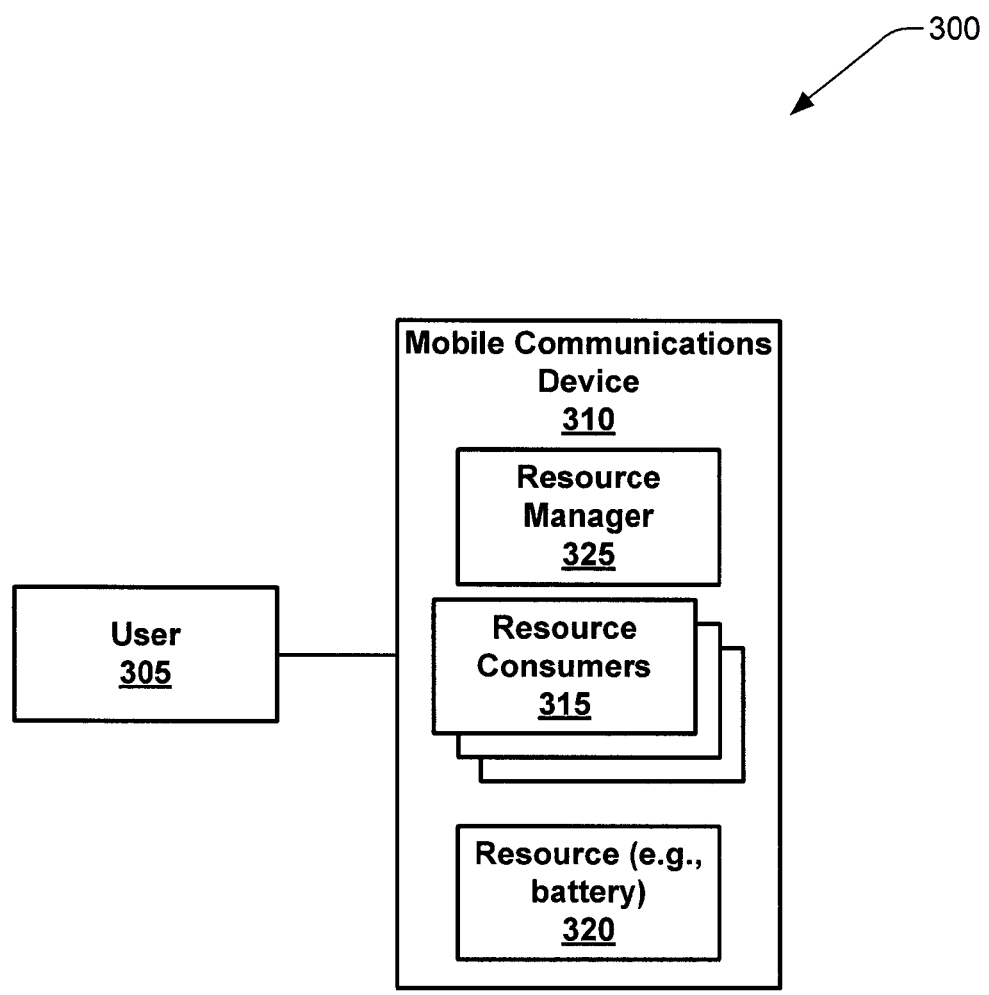
FIG. 3 shows a block diagram of a user using a mobile communications device, in accordance with some implementations.

FIG. 3 shows a block diagram of a user 305 using a mobile communications device, in accordance with some implementations. The mobile communications device 310 includes a set of resource consumers 315, a resource 320, and a resource manager 325. A resource consumer can be any application program, function, setting, option, configuration, or hardware component that consumes a resource of the mobile communications device. In a specific implementation, the resource includes a battery such as a lithium ion (Li-ion) rechargeable battery. Other examples of batteries include lead-acid, nickel cadmium (NiCd), nickel metal hydride (NiMH), and lithium ion polymer (Li-ion polymer).

The resource manager is part of a resource prediction system that uses contextual information to predict resource usage. The resource manager helps to ensure judicious use of a resource so that the resource can be available when needed. More particularly, mobile communications devices have a variety of sensors that can sense information about the user and the environment. These devices also have information on the state of device components and resources such as batteries, communications systems, processors, cameras, audio input and output devices, and on the state or configuration of applications installed or running on the device. Such information may be referred to as contextual information.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context.

Figure 4A:
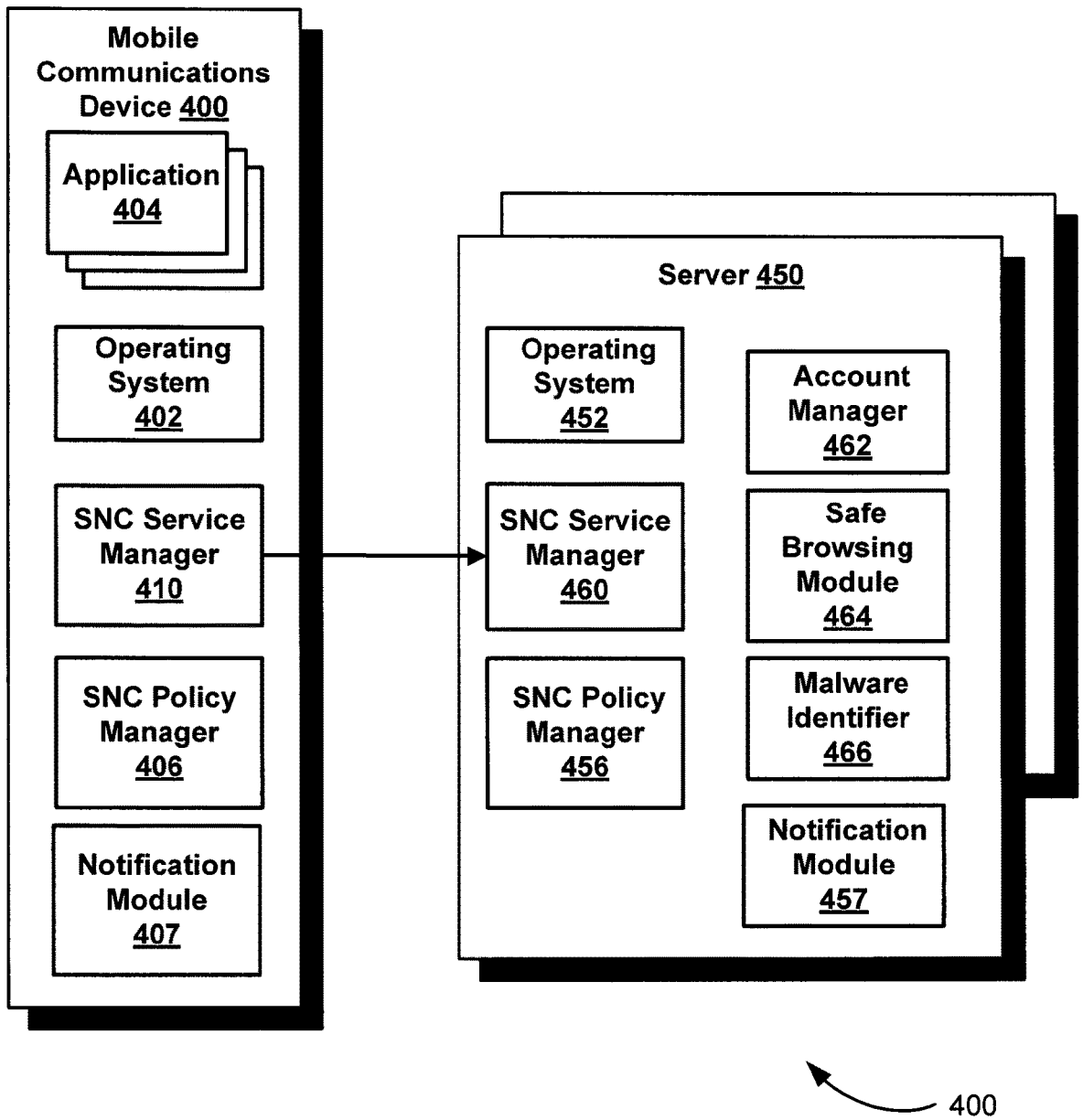
FIG. 4A illustrates an example of a block diagram of a system for automatically providing a secure network connection to a mobile communications device, implemented in accordance with some implementations.

FIG. 4A illustrates an example of a block diagram of a system for automatically providing a secure network connection to a mobile communications device, implemented in accordance with some implementations. System 400 may be used to automatically establish a secure and safe network connection via a VPN or other secure network connection technique with a mobile communications device. System 400 implements SNC service managers and SNC policy managers to determine when an SNC connection should be established, and to automatically establish the SNC connection in response to making such as determination.

System 400 may include mobile communications device 400, which may be a mobile communications device such as a Smartphone, tablet personal computer (PC), electronic reader, or laptop computer machine which is capable of a long distance communication such as a cell connection or a Wi-Fi connection, or other personal devices which use other mobile communications devices for long distance communication, communicating with them via shorter distance protocols such as Bluetooth or NFC, devices such as smart watches, physiological monitoring devices, smart head-mounted glasses, or other devices which may be worn or carried about a person.

Mobile communications device 400 may include operating system 402, which may manage hardware resources on mobile communications device 400 and provide services to one or more programs or applications 404 installed on mobile communications device 400. Accordingly, mobile communications device 400 may include one or more applications 404, which may be software programs implemented on mobile communications device 400 that provide one or more services or functionalities to a user of mobile communications device 400.

In some implementations, mobile communications device 400 communicates with server 450, which may be an account creation server used to provide secure network connectivity to mobile communications device 400 and applications 404 implemented on mobile communications device 400, as discussed in greater detail below.

Figure 4B:
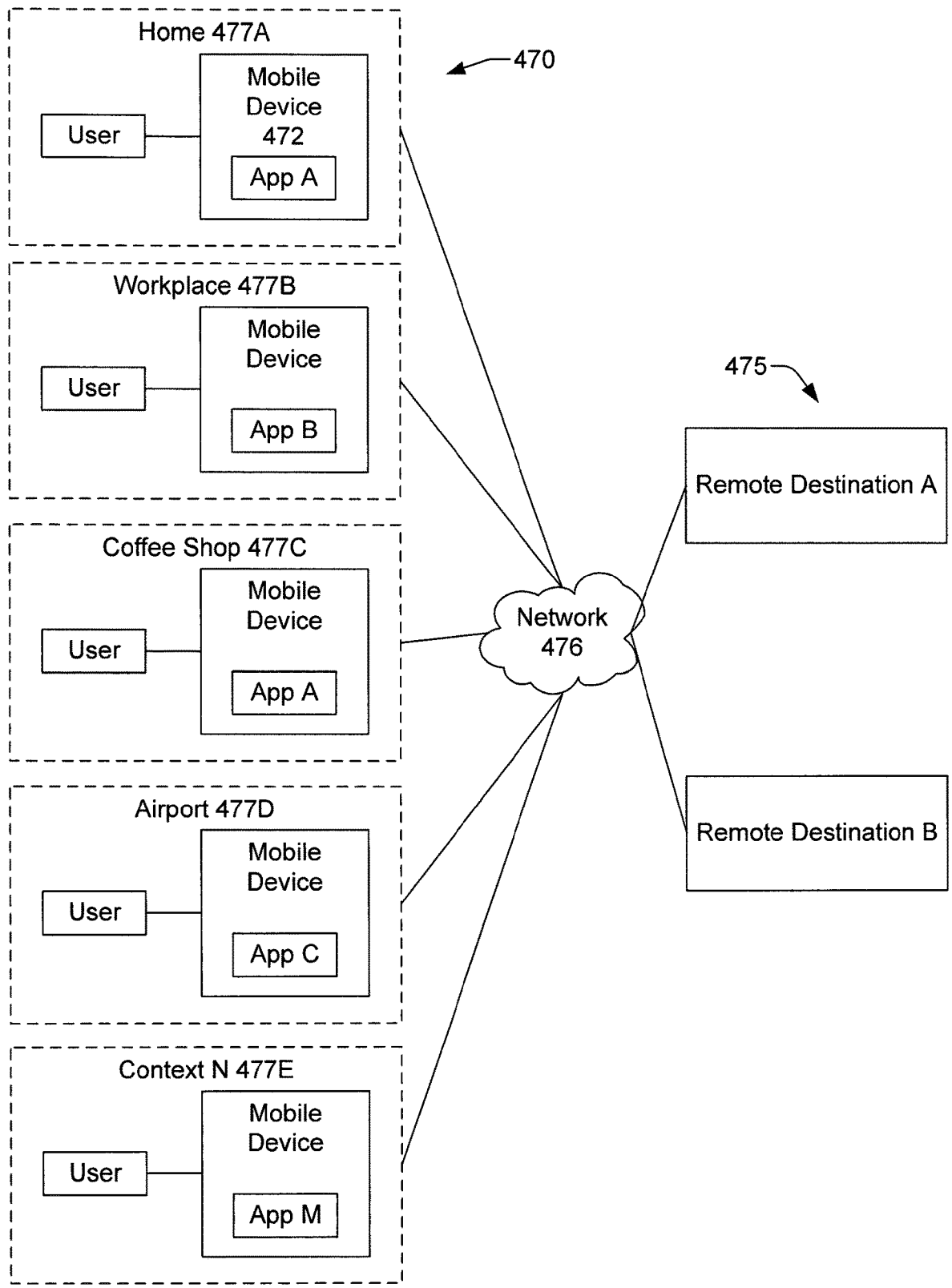
FIG. 4B shows an example of contexts in which a mobile communications device might be used.

FIG. 4B shows a block diagram of various contexts 470 in which a mobile communications device 472 may connect to various remote destinations 475 via a network 476 (e.g., wide area network or Internet). The network is as shown in FIG. 1 and described above. A remote destination may include a server or server system including a website, web server, application server, corporate or company network, service, computing node, and the like. A remote destination may be referred to as a target destination.

As an example, in a first context 477A, a user may be at home. While at home, the user may be using an application program A on a mobile communications device 472 to exchange data with a remote destination. As another example, in a second context 477B, the user may be at work. While at work, the user may be using an application program B on the mobile communications device to exchange data with the same or different remote destination.

As another example, in a third context 477C, the user may be in a coffee shop. While at the coffee shop, the user may be using an application program B on the mobile communications device to exchange data with the same or different remote destination. As another example, in a fourth context 477D, the user may be in an airport. While at the airport, the user may be using an application program C on the mobile communications device to exchange data with the same or different remote destination, and so forth.

Users may desire a secure connection (e.g., VPN) for safe communications from a mobile device in some situations, and not at other times. For example, when the user is in the user's work environment, connected to the company network, the user may not want to have a VPN connection in place because such a connection may add undesired overhead and complexity.

When the user is at home doing normal browsing or other activities, the presumption could be made that the user's home network is secure, and once again, the user may not want to have a VPN connection in place because it may add desired overhead and complexity. For example, transmitting data through a secure tunnel or connection such as a VPN may include encrypting and decrypting data packets. Encryption and decryption involves computing resources such as processing time. Network throughput and quality-of-service (QOS) may be reduced because of the encryption and decryption processes.

Figure 4C:
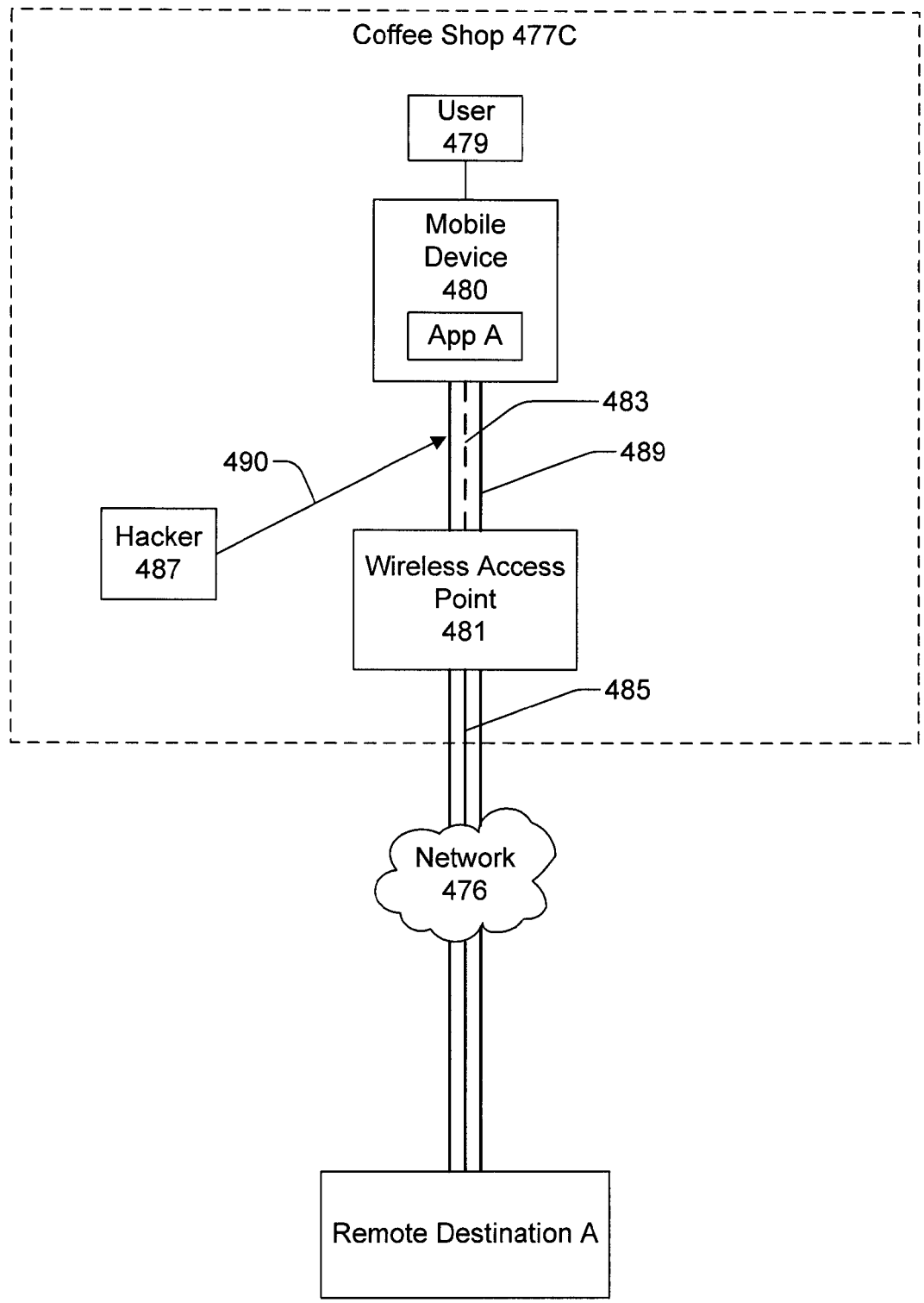
FIG. 4C shows a more detailed block diagram of a particular context.

But if the user is in a coffee shop connected to a public Wi-Fi access point, a VPN (or other secure connection) may be desired to preserve the privacy and security of information being communicated. For example, FIG. 4C shows a network topology of context 477C. In this example, a user 479 in a coffee shop is using a mobile device 480 to connect to a remote destination A. The coffee shop includes a wireless network including a wireless access point 481.

The mobile communication device is connected to the wireless access point via a connection 483. Connection 483 is a wireless connection. The wireless access point, in turn, provides a connection 485 to another network (e.g., Internet) to the remote destination. Locations such as coffee shops are generally open to the public. In the example shown in FIG. 4C, there is a hacker, spy, or eavesdropper 487 in the coffee shop. The hacker may be using a packet sniffing program to "sniff" 490 the wireless transmissions and discover the data being transmitted. In this context, a secure tunnel 489 can help to preserve the privacy and security of the information being exchanged.

Also, mobile devices are often configured to attempt to connect to available Wi-Fi access points that are detected; it can often be the case that the mobile device has connected to a Wi-Fi access point that was not explicitly selected by the user, and in fact it may not be the Wi-Fi access point that was desired. E.g., a user in the office seated next to a window may have a mobile device which has connected to a Wi-Fi access point from the building next door because the device "thought" that that network was stronger than the corporate Wi-Fi network.

The user would be unaware that this had happened (a fleeting notification message may have been displayed, e.g., "Connected to Neighboring-Unsecure-Network-of-Attacker" instead of "Connected to Secure-Corporate-Wi-Fi-Network." Increasingly mobile devices make network connections autonomously without explicit action by a user (or without a user being necessarily aware of what connections are being made—e.g., IEEE 802.11u standard and Hotspot 2.0 (also known as HS2 and Wi-Fi Certified Passpoint) specifications are designed with automatic network connection in mind); the user's device may have connected to a network with an inappropriate level of security protection for the user's current context, or may have connected to a network that the user does not wish the user's mobile device to be connected to. The iOS 7 may be supporting Hotspot 2.0.

In another situation, a user may be playing an online game on the user's mobile device while sitting in an airport; a secure connection (e.g., VPN) may not be desirable for this application because it may not require a higher level of security. In this case, the secure connection may not be made.

In another situation, a user may be in the user's workplace, but may be using an application or interacting with a website that uses private financial or medical information of the user; in such a situation, the user may desire that there be a VPN connection in place, effective for that application or that website session, to protect and preserve the user's privacy.

What all of these situations share is that there is a decision being made by the system based on contextual factors as to whether or not a secure connection should be used for a particular application, website, activity, or communication. A secure connection or tunnel can include a VPN, SLL/TLS (Secure Sockets Layer/Transport Layer Security), or https proxy or other means of securing a network connection.

More particularly, in a specific implementation, a method includes detecting the context on the mobile device, assessing the current network connection, deciding what level of security is necessary for the context, and taking action to have the appropriate level of security on the network connection. When the destination context (running a particular application or class of application (e.g., banking app), or browsing to a particular location dictates, according to user preference or policy (set by user or by user's parent or by user's corporate administrator or set by the destination itself (e.g., a banking site that requires a secured connection be used)), then establishing a secured network connection.

The method may further include when the geographical context (location of user and mobile device) dictates, according to user preference or policy (set by user or by user's parent or by user's corporate administrator or set by the destination itself (e.g., a banking site that requires a secured connection be used)), then establishing a secured network connection.

The method may further include when the user's geographical context is a known one for which there is a user preference or a policy regarding which network the user's mobile device can or should be connected to, breaking an existing network connection or establishing a new network connection that meets the preference or policy with respect to security or privacy.

The method may further include identifying the network context (is it a secure Wi-Fi connection or not, is it the corporate or home network, is it this specific MAC address or BSSID or SSID or HESSID (Homogenous ESSID, as per 802.11u hotspot specification).

When the device has been reported lost or stolen, a different policy may be in place to restrict the set of services or network connections that can be made. The system can assess the situation and establish the appropriate level of security based on policy for the situation (which can be to not use a secure connection such as a VPN). The system can perform actions such as breaking the existing network connection and establishing a new one at the lowest network layers (e.g., the case in which the mobile device has made an automatic connection to a network provider which is either not preferred by policy or is prohibited by policy).

In a specific implementation, there can be a piece of network infrastructure (e.g., a Wi-Fi access point device). In this specific implementation, the mobile device establishes a secure connection with the piece of network infrastructure, which then creates appropriately secured network connections upstream of the network device according to policy previously provisioned to the network device, or supplied by the mobile network device itself (it sends its policy to the network device, which acts on behalf of the mobile device to establish the appropriate level of secured connection based on context). In a specific implementation, instead of a server it is a piece of network infrastructure, e.g., a Wi-Fi access point which is making the decision about what type of network connection is appropriate.

In this specific implementation, a method may include detecting the context on the mobile device, passing the context information to a network device, which assesses the current network connection, deciding what level of security is necessary for the context, and taking action to have the appropriate level of security on the network connection(s) from the mobile device.

The network device could also be a server, such as a network server operated by Lookout® or another provider of secure connections. In this specific implementation, the mobile device connects with Lookout® via a tunneling operation, and policies regarding security of network connections are applied at the server (thus affecting the network connections as they continue beyond the server to elsewhere in the internet).

In the above, the discussion of context may lead to there being more than one type of secured network connection active at the same time; e.g., there could be VPN connections to be used by different applications according to user choice and/or security policy. Some mobile device operating systems directly support per-application VPN connections, some do not. In either case, the secure network connection manager can implement per-application secure network connections whether the OS directly supported it or not.

There can be connections by different apps (application programs). There can be connections by two different web applications/destination websites within the same browser (application program), wherein each of the two different web apps could have different policy-driven requirements for security levels. Not all transactional access may occur in dedicated apps, some may occur in web browsers, and in such a case the same application (the web browser) may have different network connections depending on what the network destination actually is.

More particularly, in a specific implementation, a method includes allowing the mobile communications device to maintain a second existing network connection for a second application program executing on the mobile communications device. In this specific implementation, a level of security offered by the first existing network connection for the first application program is greater than a level of security offered by the second existing network connection. In another specific implementation, a level of security offered by the first existing network connection for the first application program is less than a level of security offered by the second existing network connection.

The case of a destination establishing a policy regarding secure connection that is to be followed may include a site hosting a file similar to the "robots.txt" file, call it, for example, "vpn.txt" which can establish security requirements depending on what resources are being accessed at the destination site. E.g., "vpn.txt" could contain statements like:

User-agent: *
RequireVPN: /
-or-
User-agent: *
RequireVPN: /onlinebanking/The

The case in which network destination context is used can be accomplished by intercepting network connections in the OS or in the browser or in a separate security program (secure network connection manager) to assess and decide regarding the level of security that is appropriate based on context.

It should be appreciated that the specific contexts shown in FIG. 4B are merely examples. One of skill in the art would understand that the principles of the system can apply to other contexts including other location-based contexts such as in a school, library, restaurant, park, bus, train, and many others.

The contexts may be organized according to an ontology or taxonomy having hierarchies of classes. A context can include a class, subclass, and so forth. Each class, subclass, or both may be associated with a set of attributes, aspects, properties, features, characteristics, metatags, labels, parameters, or combinations of these. U.S. patent application Ser. No. 13/686,028, filed Nov. 27, 2012, provides additional discussion of context models and is incorporated by reference.

As an example, a particular context may be represented as "Public>Coffee Shop>Banking." In this example, the user is in a public space and, in particular, is in a coffee shop. While in the coffee shop, the user is using a banking application. Another context may be represented as "Public>Coffee Shop>Playing Game." This example is similar to the earlier example. In this example, however, the user is playing a game while in the coffee shop. Based on the network connection policies, different types of connections may be used for the different contexts. In the former (or first) context a first type of network connection may be established. In the latter (or second) context a second type of network connection may be established.

A level of security offered by the first type of network connection may be different from a level of security offered by the second type of network connection. For example, the level of security offered by the first type of network connection may be greater than the level of security offered by the second type of network connection.

Thus, when the user is engaged in the banking activity, the connection will very secure to help protect the user's financial data. When the user is engaged in playing a game, the connection may be less secure as the data associated with game may not be as sensitive as the data associated with financial transaction. The advantage of the less secure connection, however, is that the connection may provide a faster response as compared to the connection for the banking activity.

Providing a secure connection or safe browsing experience may be facilitated through controlling a domain name system (DNS) server for resolving network addresses of all connections via whitelisting or blacklisting by specific domains or top-level domains (TLDs) or categories of destinations. A network connection can include any combination of Wi-Fi, VPN, cell network, macro cell network, small cell network, micro cell or microcellular network, Bluetooth, near field communication (NFC), Zigbee/ 802.15.x/wireless personal area network (WPAN), mobile ad hoc network (MANET), mesh network, or the like. U.S. patent application Ser. No. 12/255,614, filed Oct. 21, 2008, now U.S. Pat. No. 8,051,480, issued Nov. 1, 2011; 13/284, 248, filed Oct. 28, 2011, now U.S. Pat. No. 8,505,095, issued Aug. 6, 2013; and Ser. No. 13/919,901, filed Jun. 17, 2013, include further discussion of preventing malware, inspecting network traffic, and monitoring and analyzing multiple interfaces/protocols, and are incorporated by reference.

In a specific implementation, a greater level of security includes encryption of the network connection. The greater level of security may include providing safe browsing by controlling the DNS server for resolving the network address of all connections (via whitelisting or blacklisting by specific domains or TLDs or categories of destinations).

Referring now to FIG. 4A, in various implementations, mobile communications device 400 further includes SNC service manager 410, which may be a process or application implemented on mobile communications device 400. SNC service manager 410 may be configured to communicate with server 450 and may handle and manage SNC connections made with mobile communications device 400.

Thus, SNC service manager 410 may be configured to provide SNC services, such as establishing and terminating an endpoint of a SNC tunnel, and applying one or more policies to a SNC connection. In various implementations, the operations of SNC service manager 410 are controlled or configured by one or more rules or policies stored in SNC policy manager 406.

Thus, SNC policy manager 406 may include or be coupled to one or more data stores that store policies that configure or manage one or more actions or operations performed by SNC service manager 410. For example, a policy stored in SNC policy manager 406 may configure SNC service manager 410 to establish a SNC connection in a first geographical location, but not in a second geographical location.

In various implementations, SNC service manager 410 may be preloaded or installed on mobile communications device 400 prior to being provided to the user. Thus, SNC service manager 410 may already be installed when it is received by a user from a carrier or manufacturer. Furthermore, SNC service manager 410 may be a component of and built into operating system 402. When built into operating system 402, SNC service manager 410 may be invoked directly by applications 404 without requiring execution of or function calls to a separate application.

System 400 may also include SNC service manager 460 and SNC policy manager 456 that may be implemented on one or more servers, such as server 450. SNC service manager 460 may provide server-side SNC services and functionalities associated with SNC service manager 410. Thus, an instance of SNC service manager 460 and SNC policy manager 456 may be created for each mobile communications device or user that is provided SNC services by system 400. As discussed above with reference to SNC policy manager 406, SNC policy manager 456 may be used to configure or control the operation of SNC service manager 460.

According to various implementations, SNC policies can be modified at mobile communications device 400 or at server 450. If changes are made to an instance of one SNC policy manager, the changes may be communicated and incorporated into the other instance. For example, an administrator may change policies at a server-side SNC policy manager 456. The changes may be communicated to mobile communications device 400 and implemented in SNC policy manager 406.

In another example, if a change is made to SNC policy manager 406, a message may be sent from mobile communications device 400 to server 450 that identifies the changes that were made. The information included in the message may be used to modify SNC policy manager 456 to reflect the changes that were made to SNC policy manager 406.

In some implementations, policies may be managed at several levels of granularity. Policies may be modified on a per-user basis. Alternatively, policies may be changed or modified for one or more groups of users at a time. A management console may be provided to a user, such as an administrator, that may provide the user with a user interface that may be used to manage policy settings for one or more users and their mobile communications devices.

Alternatively, a user may modify or change settings via an input device of the mobile communications device. For example, a user may have administrator privileges and be able to change or modify the policies applied to the user's own mobile communications device. In this example, separate polices may be changed or modified for each device or user using system 400.

In another example, policies may be managed at a group level by a group administrator. In this example, the group administrator may be an administrator for an organization, corporation, or enterprise. The group administrator may change or modify policies associated with the applications the organization has installed on its employees' mobile communications devices. Once the administrator makes one or more changes, they may be applied to the mobile communications devices of one or more groups of users that work for the organization.

In yet another example, a parent-child relationship may exist between multiple devices. Thus, several mobile communications devices may be designated as children of a parent device that resides elsewhere, such as a laptop computer or a desktop computer. If a change is made to a policy of the parent device, the change may be automatically applied to the mobile communications devices by virtue of the parent-child relationship.

In yet another example, a mother or father or guardian for a minor child may manage the policy for any devices operated by the minor child. Such policy management may occur even in situations in which the device is owned by another organization, e.g., the child's school. In this case there may be two levels of policy management: one by the administrator for the school, and another by the parent of the minor child.

System 400 may further include account manager 462 which may be a process or application implemented on server 450. Account manager 462 may be responsible for authenticating requests from mobile communications device 400, and for creating an account associated with a user of mobile communications device 400. For example, account manager 462 may be configured to generate an account having one or more account settings associated with the user. The account may be a temporary account used to provide SNC services to the user via mobile communications device 400.

Account manager 462 may be configured to remove or delete the temporary account when the SNC connection is no longer used. Account manager 462 may also handle load balancing and scaling of functionalities provided by server 450. For example, if more users or mobile communications devices initiate SNC connections with server 450, account manager 462 may spawn or spin up additional server instances to provide additional SNC services for those additional users and mobile communications devices. In this way, the processing load incurred by servicing users may be balanced among several servers.

Furthermore, account manager 462 may transfer SNC functionalities to another server based on a geographical parameter associated with a user or mobile communications device 400. For example, mobile communications device 400 may be located in a first geographical region and may initiate a connection with server 450 which is also located in the first geographical region. If mobile communications device 400 moves to a second geographical region, account manager 462 may transfer the connection to an account creation server located in the second geographical region.

System 400 may include malware identifier 466, which may inspect network traffic flowing to and from mobile communications device 400. Malware identifier 466 may be configured to identify attempts to exploit vulnerabilities of mobile communications device 400 and applications 404 which may be installed and running on mobile communications device 400. Malware identifier 466 may monitor traffic and identify malicious files and/or activities based on a predetermined list of filenames. Malware identifier 466 may also identify malicious files and/or activities based on detected behaviors. U.S. patent application Ser. No. 12/255,635, filed Oct. 21, 2008, now U.S. Pat. No. 8,060,936, issued Nov. 15, 2011; 12/255,632, filed Oct. 21, 2008, now U.S. Pat. No. 8,087,067, issued Dec. 27, 2011; 12/255,621, filed Oct. 21, 2008, now U.S. Pat. No. 8,108,933, issued Jan. 31, 2012; 12/868,669, filed Aug. 25, 2010, now U.S. Pat. No. 8,347,386, issued Jan. 1, 2013; and Ser. No. 12/868,672, filed Aug. 25, 2010, now U.S. Pat. No. 8,533,844, issued Sep. 10, 2013, include further discussion of malware identification and monitoring, and are incorporated by reference.

Thus, malware identifier 466 may identify malicious files and/or activities dynamically based on behaviors, such as a frequency of requests generated, or a type or recipient of a request. The list of malicious files and/or activities may be stored locally or remotely in a storage location accessible by other components of server 450.

Malware identifier 466 may be configured to scan applications that are being downloaded to the device and determine whether or not the applications are malicious. Malware identifier 466 may be further configured to scan for abnormalities or malformedness of files and file formats being sent to mobile communications device 400.

For example, malware identifier 466 may examine file formats such as Adobe Acrobat® documents, Microsoft Office® documents, Adobe Flash® player files, and image files, such as .JPEG, .PNG, and .TIFF. Furthermore, malware identifier 466 may be configured to scan network protocol data units for format consistency and validity. Techniques for safe browsing are further described in U.S. patent application Ser. No. 13/160,447, filed Jun. 14, 2011, which is incorporated by reference along with all other references cited in this application.

System 400 may also include safe browsing module 464, which may be an application or process implemented on server 450. Safe browsing module 464 may filter network traffic based on DNS or IP addresses associated with the network traffic. For example, safe browsing module 464 may be an implementation of a modified DNS server that is configured to filter traffic that is being sent to bad or malicious websites from the mobile communications device.

Safe browsing module 464 may include a data store that stores modified DNS entries for known or dynamically identified malware sites. The modified DNS entries may be used to redirect a data packet or request to a safe website. Alternatively, safe browsing module 464 may be configured to refuse to resolve the DNS address, which may result in a failed DNS resource resolution for the client on mobile communications device 400.

Safe browsing module 464 may also be configured to point a user of mobile communications device 400 to a location which explains the vulnerability and may optionally allow the user to choose to continue or not. The actions performed by safe browsing module may be configured by one or more active policies stored in a SNC policy manager.

In some implementations, sites which are identified by malware identifier 466 as serving malware have their domains and/or internet protocol (IP) addresses added to a list of blacklisted sites for use by safe browsing module 464. In this way, a black list may be populated dynamically, and safe browsing module 464 may be configured dynamically and on-the-fly. Thus, safe browsing module 464 may populate a blacklist while a SNC connection is in use and in response to malware identifier 466 identifying a site as malicious.

Safe browsing module 464 may also be configured based on previously determined information. For example, a system administrator may pre-load a list of malicious sites to be used as a black list. System administrators may choose to allow their list of malicious sites to be shared with a central server or directly with other system administrators. A system administrator may specify that any site listed as malicious by a configurable number of other system administrators is to be added to the system administrator's list of malicious sites. Such a configurable rule may also specify the type of organization or a specific list of organizations whose black lists are to be examined for automatically populating the administrator's own list.

System 400 may further include notification module 407 and notification module 457. Notification modules 407 and 457 may be configured to generate one or more user interface components capable of providing a notification to a user. The user interface component may be a graphical icon presented in a display of the mobile communications device. The graphical icon may display a color-coded image, or display automatically generated text descriptive of a SNC connection status.

Accordingly, the notification may display information about the current status of a secure network connection, such as a SNC connection, or various events and conditions that may be associated with a SNC connection. For example, if a SNC connection is currently established and active, notification module 407 or notification module 457 may indicate that the mobile communications device is protected. If the mobile communications device is in a poor service area or does not have a strong network signal, notification module 407 or notification module 457 may provide a notification indicating that the mobile communications device's connection strength is not strong enough to generate an account and establish a SNC connection.

Notification module 407 or notification module 457 may also provide the user with the option to proceed to connect to a network unprotected. Notification module 407 or notification module 457 may also provide a notification that indicates that a mobile communications device is not protected when no SNC connection is established.

Figure 5A:
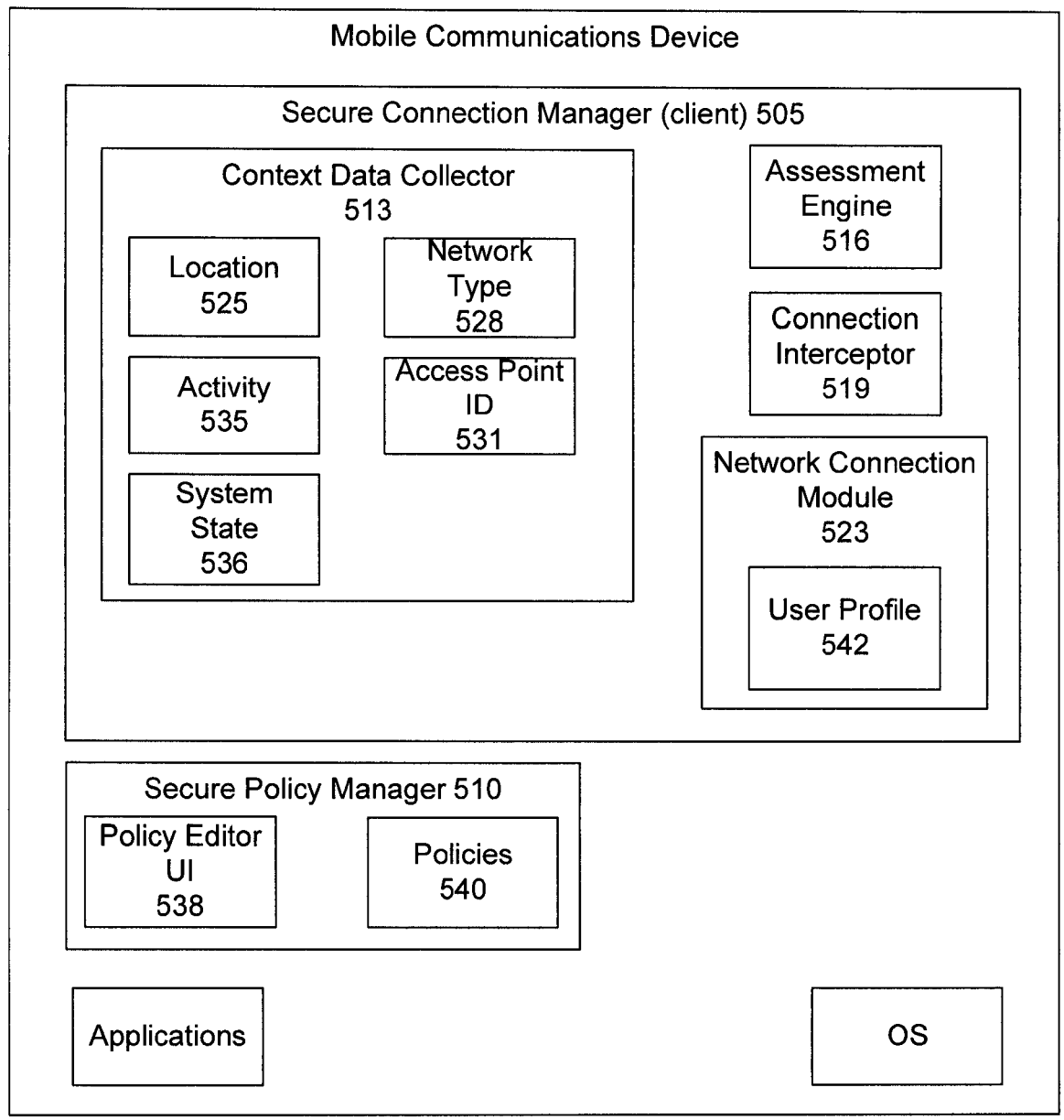
FIG. 5A shows a block diagram of a specific implementation of a client-side secure connection manager.

FIG. 5A shows a more detailed block diagram of a specific implementation of a client-side secure connection manager 505 and secure connection policy manager 510. As shown in the example of FIG. 5A, secure connection manager 505 includes a context data collector 513, an assessment engine 516, a connection interceptor 519, and a network connection module 523.

The context data collector is responsible for collecting context information associated with the mobile device. Context information may include data identifying, representing, or describing the real-time physical environment or setting of the mobile communications device, ambient audio, video and photographs of the physical surroundings, computing execution environment (e.g., device configuration settings, system services, active processes, or task status), user activity data, system state, accelerometer data, location data, and the like.

More particularly, in a specific implementation, context information may include a geographical location 525 of the device, information identifying a type of network 528 that the device is connected to, information identifying an access point 531 that the device is connected to, user activity data 535, system state 536, or combinations of these.

The geographical location data may include Global Positioning System (GPS) coordinates such as latitude and longitude. Network type 528 may include information indicating whether or not the network connection is secure, information indicating whether or not the network connection is unsecure, an identification of the secure connection service or protocol, an identification of the communication protocol, an identification of the physical network type, or combinations of these. Some examples of protocols include Point-to-Point Tunneling Protocol (PPTP), Layer 2 Tunneling Protocol (L2TP), Secure Sockets Layer (SSL), Internet Protocol Security (IPsec), Secure Shell (SSH), and OpenVPN—just to name a few examples.

Access point identifier 531 may include the media access control (MAC) address assigned to the access point, base station identifier (BSSID), extended service set identification (ESSID), Ethernet hardware address (EHA), hardware address, physical address, IP address, or any other identifier or combination of identifiers that can uniquely identify the access point. Context information may include an identity of a physical provider of the network connection.

User activity data 535 may include information identifying application programs that the user is currently using, browsing activity, files that have been accessed (e.g., files that the user has opened, read, or modified), and the like. User activity data can include any combination of an identification of a specific application program on the mobile communications device, an identification of a web application, an identification of a website connected to, a class or category of the specific application program (e.g., a financial services app or web app; an enterprise app or a web app, and so forth), a day of week, or a time of day.

System state data may include information indicating remaining battery power (e.g., battery voltage measurement), configuration information (e.g., operating system version, system memory, firmware version, or processor type), or combinations of these.

Other examples of context information include:

1) Existence or not of a device lock personal identification number (PIN) or device passphrase or other device lock authentication process;

2) Existence or not of a biometric device lock authentication process;

3) Occurrence of unsuccessful unlock attempts prior to a successful unlock;

4) Occurrence of a failed authentication attempt to an app or a web application;

5) Elapsed time since last successful device unlock;

6) Elapsed time since last successful or unsuccessful authentication attempt to an app or a web application;

7) Evidence of possible user lack of physical control of device (e.g., accelerometer readings showing device has fallen or been set down and is unattended for a period of time, as on a desk); counter-evidence of user attendance is continued periods of interaction with device (typing input, touches on device, application launches) or continued carrying of device (accelerometer readings showing device has been placed in user's pocket or handbag or holster or is being carried in hand, with continued movement indications, not interrupted by quiet periods of no movement); or 8) Elapsed time since possible user lack of physical control of device.

Secure policy manager 510 may include a policy editor user interface 538 for editing connection policies, and a database 540 to store network connection policies. A network connection policy may include conditional statements, expressions, constructs, consequences, alternatives, actions, operators, or combinations of these. A policy may be referred to as a security policy. An example of the structure of a rule that may be included in a policy is shown below:

IF <boolean condition> THEN <consequence> ELSE <alternative>

For example, a policy rule may specify:

IF <current context=y> THEN <establish a first type of connection> ELSE <establish a second type of connection>

In the example above, if the Boolean condition evaluates to TRUE (i.e., the current context corresponds "y") then the action is to establish the first type of connection. Alternatively, if the Boolean condition evaluates to FALSE (i.e., the current context does not correspond "y") then the action is to establish the second type of connection. The first type of connection may be a secured connection (e.g., VPN). The second type of connection may be an unsecured connection, or vice-versa.

A context can include location data and user activity data. Below is another example of a policy rule:

IF <location="coffee shop"> AND <user activity data="banking"> THEN <establish a first type of connection>

In the example above, the context includes a first condition (location="coffee shop") and a second condition (user activity data="banking"). The two conditions are joined by the "AND" operator. In this example, both conditions must evaluate to TRUE in order for the first type of connection (e.g., secured connection) to be established. The connection policies allow for making very granular decisions on when a particular type of network connection should (or should not be) established. For example, below is another example of a policy rule:

IF <location="coffee shop"> AND <user activity data="playing game"> THEN <establish a second type of connection>

In the example above, playing a game while in a coffee shop results in establishing the second type of connection (e.g., unsecured connection). Establishing an unsecured connection can result in faster response times as compared to a secured connection and thus improve the user experience.

While an unsecured connection may be vulnerable to eavesdropping, the data at risk may be less critical as compared to the user's financial data. Thus, a user may be willing to accept the trade-off. In contrast, if the user is accessing a bank account while in a coffee shop as in the earlier example, the user may desire a secure network connection so as to protect sensitive financial data.

In a specific implementation, connection policies are user-configurable. In this specific implementation, the system allows users to create and edit their own network connection policies that reflect their own preferences and priorities regarding tradeoffs between response time and security. In another specific implementation, connection policies are not user-configurable. For example, editing and creating policies may be allowed only for IT administrators. This specific implementation of the system can help enterprises implement policies uniformly.

A policy may originate from: 1) User; 2) Administrator for the mobile device; 3) Administrator for the physical network to which a connection is made (e.g., the Starbucks coffeeshop providing Wi-Fi to the mobile device, or the corporation operating the Wi-Fi network in a corporate office); 4) The network destination (e.g., a bank or a corporation's server); 5) A combination of policies from the above sources. There can be more than one applicable policy.

In a specific implementation, a security policy does not exist as a separate thing or object, but rather there is a collection of user choices/preferences. In this specific implementation, there is not really a "thing" called a policy, rather, the user has made some choices which essentially constitute a policy; thus there is in this case essential a single "policy" which is configured by the user making settings choices. A security policy may be selected as a user preference. A security policy may include a collection of user choices or preferences.

In a specific implementation, the system determines the appropriate type of network connection based on inferring one or more user choices, preferences, options, or settings. In a specific implementation, a method includes displaying for a user a list of contexts (e.g., home, office, coffee shop, or train), and a network connection security option associated with each context.

In this specific implementation, the user can indicate whether a secure or unsecure network connection is desired for a particular context. Enabling a network connection security option associated with a context may indicate that the user desires a secure network connection for the context. Disabling the network connection security option indicates that the user desires an insecure network connection for the context.

In another specific implementation, the system can evaluate a user-selectable option to infer whether or not there should a secure connection for a particular context. For example, very privacy conscious users may disable location services, cookies, browsing history, or the like. In this specific implementation, the system may infer that the user prefers secure network connections based on the user disabling location services, cookies, browsing history, or the like.

In contrast, less privacy conscious users may enable location services, cookies, browsing history, or the like. For this user, the system may infer that the user prefers the convenience of less secure network connections based on the user enabling location services, cookies, browsing history, or the like.

Connection interceptor 519 is responsible for intercepting an attempt to make a network connection. For example, the interceptor may intercept an attempt by an application program on the mobile device to connect to a network.

The assessment engine is responsible for evaluating or applying a connection policy based on the current context. Network connection policy evaluations can occur before a connection is established, after a connection has been established, or while a connection is established. For example, upon the connection interceptor intercepting a connection attempt, the assessment engine may be called to determine the type of connection that should be established. Determining the type of connection that should be established is based on the collected context data (e.g., location and user activity).

Alternatively, a connection policy may be evaluated after a connection has been established. A policy may be evaluated during or while there is an existing network connection. Evaluating the connection policy while there is an existing network connection helps to account for changes in the current context. For example, a user may have initially been playing an online game where, based on a connection policy, the connection network could be unsecured.

Subsequently, however, the user may have switched to a banking application in order to pay some bills. In this case, the policy may specify that a secure network connection be used. If the existing network connection offers a security level different from what is specified by the policy, the system can terminate the existing network connection and establish a new network connection that offers the appropriate level of security for the current context.

Network connection module 523 is responsible for establishing and terminating network connections. The network connection module may store a user profile 542. The user profile can include user credentials (e.g., username and password) for establishing a secure network connection. A user profile may include multiple sets of credentials for different types of secure services.

For example, a first set of credentials may be used for first type of secure connection (e.g., point-to-point tunnel protocol). A second set of credentials may be used for a second type of secure connection (e.g., layer 2 tunneling protocol).

The first and second set of credentials may have the same or different levels of authentication. For example, the first and second set of credentials may use single factor authentication (e.g., username and password). Alternatively, one set of credentials may use single-factor authentication and the other set of credentials may use multi-factor authentication (e.g., two-factor authentication). In an implementation, the network connection module is capable of establishing different types of network connections, where each type offers a different level of security.

That is, the connection module may establish a first type of connection that offers a first level of security, and a second type of connection that offers a second level of security, different from the first level of security. For example, the first type of connection may be point-to-point tunneling protocol. The second type of connection may be a layer 2 tunneling protocol. L2TP can offer a higher level of security than PPTP, but can be more complicated to establish.

The ability to access different types of secure services that offer different levels of security helps to ensure that high security can be provided in very sensitive contexts while less security (and less complexity) can be provided in less sensitive contexts. Further, in some cases a particular secure service may be unavailable. For example, a VPN server associated with a particular secure service may have crashed or may otherwise be offline. In this case, the system can use a different secure service in order to help ensure that the communications to and from the mobile device remain secure.

Figure 5B:
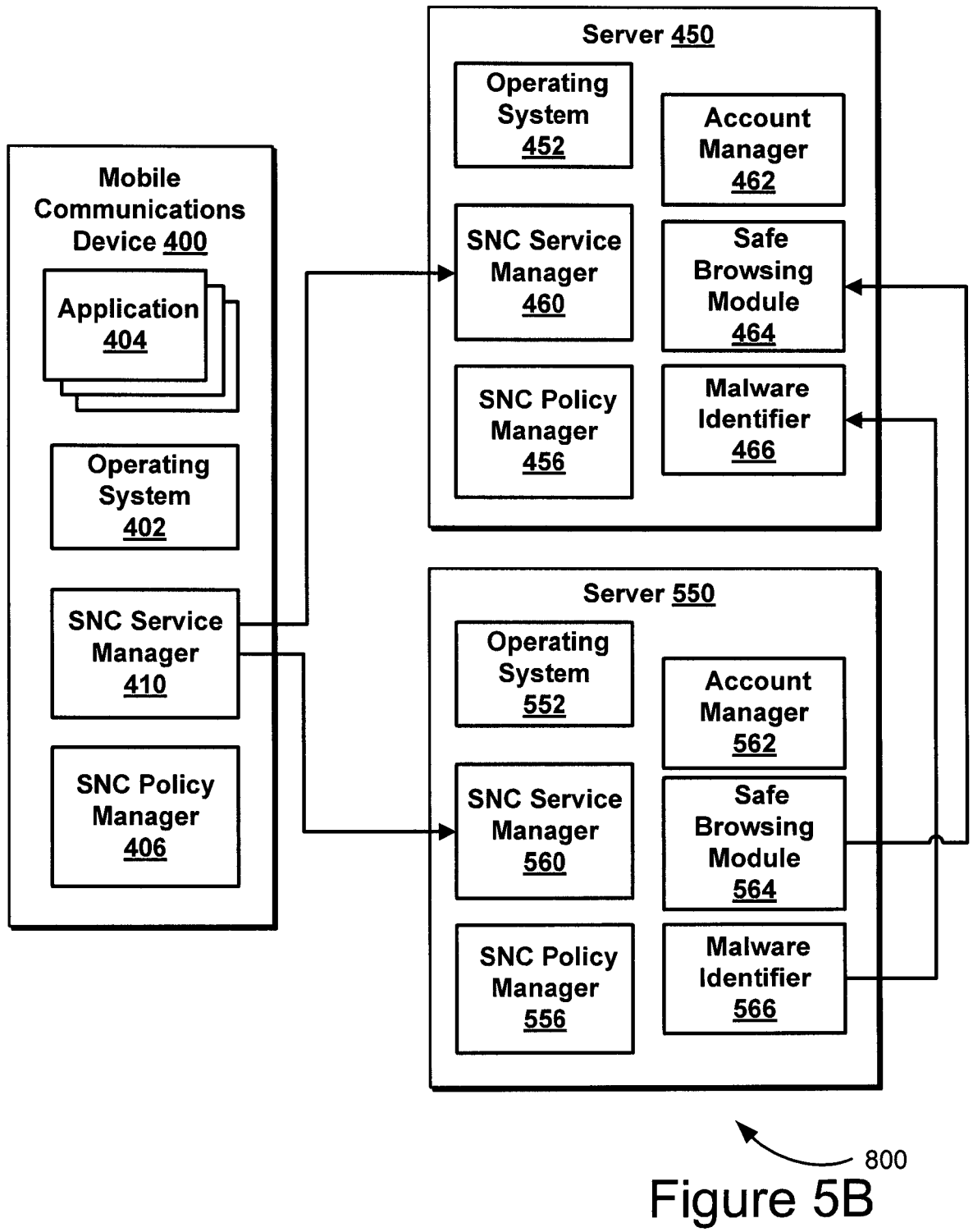
FIG. 5B illustrates an example of a block diagram of a system for automatically providing multiple secure network connections to a mobile communications device, implemented in accordance with some implementations.

FIG. 5B illustrates an example of a block diagram of a system for automatically providing multiple secure network connections to a mobile communications device, implemented in accordance with some implementations. System 500 may be used to automatically establish a several SNC connections between a mobile communications device and multiple service providers.

As discussed above with reference to FIG. 4, a mobile communications device may use an instance of a SNC service manager implemented on a server. In various implementations, mobile communications device 400 may use different instances of SNC services implemented on different servers. The use of a particular instance may depend on a context, application, website, or network connection that is currently being used. Mobile communications device 400 may connect to an appropriate SNC service manager based on one or more policies, as may be determined by SNC policy manager 406.

Connections to both SNC service manager 460 and SNC service manager 560 may be active simultaneously. Thus, multiple connections may be active with multiple SNC service managers. For example, a bank may have setup a SNC infrastructure for use by its customers when using the bank's website or banking application program. The user's employer may have a setup a separate SNC infrastructure for use when connecting to the employer's in-house or cloud-based services. The user may also be using a SNC infrastructure provided by a service provider, such as Lookout®, to manage other network connections. Each SNC connection may be associated with an instance of a SNC service manager provided by the respective servers of each service provider. Each SNC connection may be managed and governed by SNC service managers and SNC policy managers implemented on the mobile communications device and on the servers of the service providers.

According to various embodiments, server 550 is a server operated and maintained by a service provider, such as Lookout®. Server 550 may include various components which may be used to provide automatic and safe SNC connections to users of mobile communications devices. Accordingly, server 550 may include safe browsing module 564 and malware identifier 566, which may be in communication with other components of the service provider's infrastructure.

For example, safe browsing module 564 and malware identifier 566 may be in communication with one or more databases that serve as a centralized repository for libraries of safe and malicious websites and IP addresses, as well as safe and malicious files. In addition to maintaining a centralized repository of information, the infrastructure components may provide services such as safe browsing and malware identification instead of components of a local server.

Thus, other components in the service provider's infrastructure may be performing safe browsing checks and malware identification as a service for server 550. Alternatively, the infrastructure components may send current or updated information to server 550 so that components local to server 550 may perform the appropriate safe browsing and malware identification operations. In various implementations, the current or updated information sent to server 550 includes data or executable application code, such as a software update.

Figure 6:
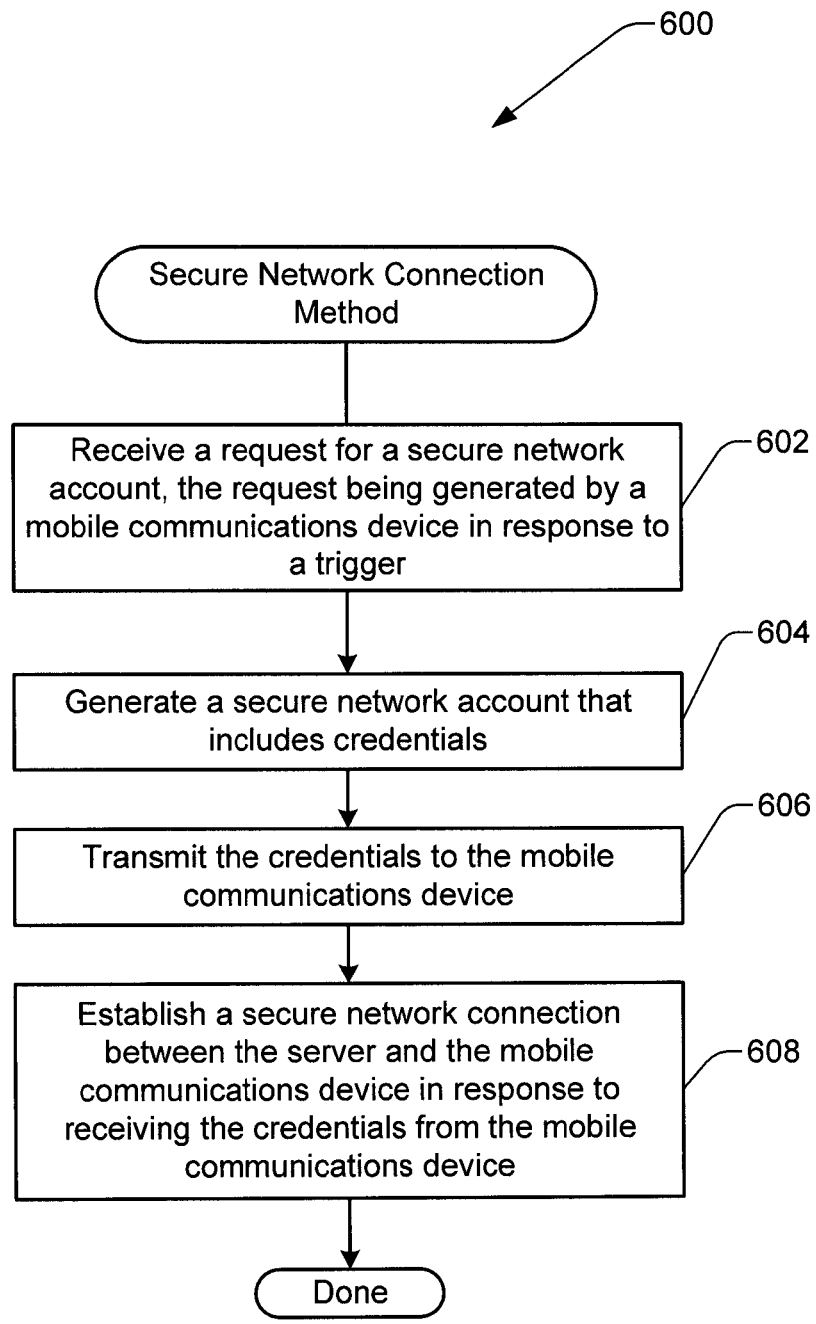
FIG. 6 illustrates an example of a block diagram of a method for providing a secure network connection to a mobile communications device, implemented in accordance with some implementations.

FIG. 6 illustrates an example of a block diagram of a method for providing a secure network connection to a mobile communications device, implemented in accordance with some implementations. Method 600 may be used to automatically identify situations in which a secure network connection should be used, and automatically configure and establish a secure network connection.

Configuration and establishment of the secure network connection may occur dynamically and based on the mobile communications device's current context. Furthermore, the configuration and establishment of the secure network connection may be automatic and transparent to a user. Once established, network traffic flowing through the secure network connection may be analyzed to determine if modifications should be made to the secure network connection, or if the connection should be terminated.

Accordingly, at step 602, a request for a secure network connection account may be received at a server. In some implementations, the request may be generated by a mobile communications device in response to a trigger. Thus, a process or application installed on the mobile communications device may identify an event or situation in which the mobile communications device should use a secure network connection. This may occur automatically and based on one or more secure network connection policies stored on the mobile communications device and/or on the server.

The policies may include several rules that define events, situations, and conditions that trigger the automatic configuration and creation of a secure network connection. In some implementations, a policy may indicate that if the mobile communications device leaves or enters a particular geographical region, a SNC connection should be used for any outgoing network access requests, and a request for a secure network connection account may be generated and sent to a server.

For example, public locations, such as cafés and other public hotspots, may be prone to eavesdropping attempts made by malicious entities, such as hackers. A list of public locations may be generated by a service provider, such as Lookout®, and stored on the mobile communications device. If the mobile communications device enters one of the locations identified by the list, a policy may indicate that a secure network connection account should be requested.

Accordingly, a secure network connection account may be requested and generated, and a secure network connection may be established. Once established, the secure network connection may provide the mobile communications device with a safe and encrypted network connection that is not susceptible to eavesdropping attempts.

At step 604, a secure network connection account may be generated at the server. The secure network connection account may be a temporary account that includes credentials for a secure network connection. The credentials may be randomly generated authentication information that is generated specifically for the request. Thus, in response to receiving the request at step 602, a server may automatically generate a new account with new credentials which may subsequently be used to establish a secure network connection, such as a SNC connection. The credentials may be used to authenticate endpoints of a SNC tunnel, such as the mobile communications device and the server.

At step 606, the credentials may be transmitted to the mobile communications device. The mobile communications device may use the credentials to automatically configure a secure network connection, such as a SNC connection. The server may also automatically configure the secure network connection. In this way, both endpoints of the secure network connection may be configured automatically and without any intervention from a user or administrator.

At step 608, a secure network connection may be established between the server and the mobile communications device in response to receiving the credentials from the mobile communications device. Accordingly, the mobile communications device may use the credentials to authenticate itself to the account creation server, and a SNC connection may be established. This may occur automatically and without user intervention.

Moreover, once the connection has been established, traffic in the SNC tunnel may be monitored and modified to ensure that the mobile communications device remains protected and complies with the policies that are currently active. For example, if malware has been previously and inadvertently installed on the mobile communications device, traffic in the SNC tunnel may be dropped to prevent the malware from communicating with a malicious server, such as a command and control server.

Figure 7:
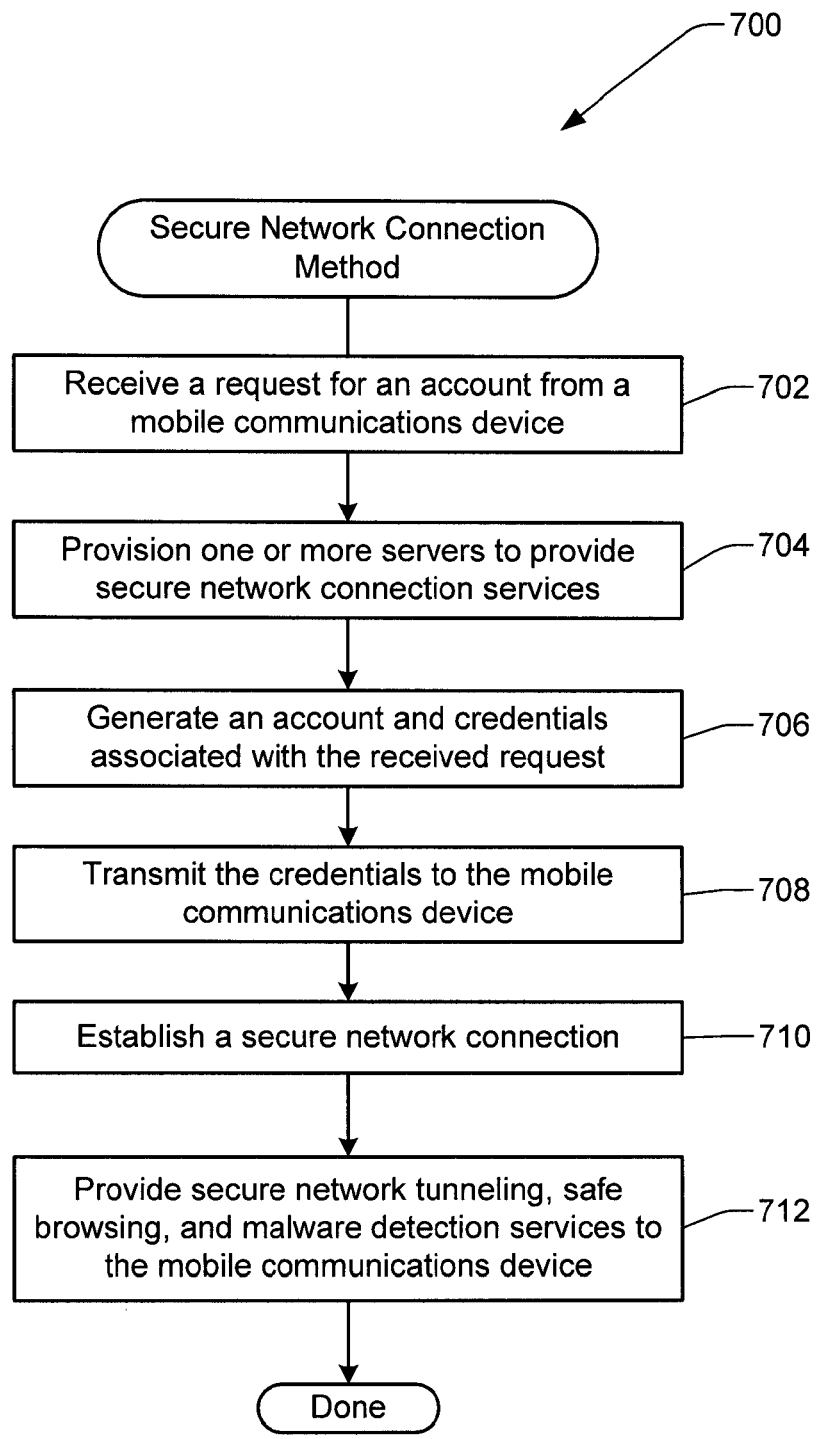
FIG. 7 illustrates an example of a block diagram of another method for providing a secure network connection to a mobile communications device, implemented in accordance with some implementations.

FIG. 7 illustrates an example of a block diagram of another method for providing a secure network connection to a mobile communications device, implemented in accordance with some implementations. Method 700 may be used to automatically establish a secure and safe SNC connection between a mobile communications device and a server. In some implementations, triggering events or conditions may cause an account creation server to create an account that may be used to establish a SNC connection. Credentials associated with the account may be sent to the mobile communications device and used to authenticate the mobile communications device. Upon authentication, a SNC connection may be established and SNC services may be provided.

At step 702, a request for a secure network connection account may be received. In some implementations, the request may be received from a mobile communications device. In some implementations, a secure network connection account is an account that includes authentication and configuration information required to establish a SNC connection between a mobile communications device and a service provider.

A request for a secure network connection account may be generated to create authentication information which may enable a mobile communications device and a server to authenticate themselves to each other, and establish a SNC connection. A SNC service manager implemented on the mobile communications device may generate the request and send the request to a server, such as an account creation server. The request may be generated in response to a system component, such as the SNC service manager, detecting whether a SNC connection should be established. If it is determined that a SNC connection should be established, the request may be generated and sent to the account creation server.

In various implementations, a system component may determine that a connection should be established in response to one or more triggering events or conditions. For example, a process running on the mobile communications device may analyze network traffic originating from the mobile communications device. The traffic may be generated by applications running on the mobile communications device.

In response to detecting one or more events or conditions, the process, which may be a SNC service manager, may generate a request for a secure network connection. The triggering events or conditions may be one or more parameters or characteristics of network traffic coming into or out of the mobile communications device. The events and conditions may include a type of network that is being connected to, a network address to which traffic is being sent, and an application that may be sending or receiving information over the network.

The system component may continually monitor activities and network traffic on the mobile communications device. The detection may be part of an ongoing background process that is transparent to a user of the mobile communications device, or does not utilize any user intervention. Thus, the process of detecting triggering events and conditions and generating a request may occur automatically and transparently.

In various implementations, the triggering events and conditions are determined based on one or more policies associated with a user or the user's mobile communications device. The policies may be sets of rules which specify or identify when a secure network connection should be requested and used.

For example, a policy may be a geographical location-based policy which determines whether or not a secure network connection should be used based on a geographical location of the mobile communications device. If a user is using the mobile communications device outside of a specified geographical region, a rule in a policy may determine that a secure network connection should be used, and an account should be requested.

Alternatively, the policy may be configured to use a secure network connection if the user enters a particular geographical location. The geographical location of the mobile communications device may be determined based on information obtained from the global positioning services on the mobile communications device, or network information received from the mobile communications device. U.S. patent application Ser. No. 12/372,719, filed Feb. 17, 2009, now U.S. Pat. No. 8,467,768, issued Jun. 18, 2013; and Ser. No. 13/842,884, filed Mar. 15, 2013, include further discussion of applying a security policy based on location, and are incorporated by reference. U.S. Patent Application No. 14/072,718 includes further discussion of evaluating security for an electronic transaction and is incorporated by reference.

For example, a policy may specify that a SNC connection should not be used when the mobile communications device is located at the user's work location, as may be determined by an area within a predetermined distance of a business address. The policy may further specify that a SNC connection should be used when the mobile communications device is not located at the user's work location.

Accordingly, if the user carries his or her mobile communications device outside of the user's work location, the change in the geographical location may be detected by the mobile communications device and a request for a network account may be generated. As is discussed in greater detail below, a SNC connection may be established to provide the mobile communications device with a secure network connection.

In another example, a triggering event or condition may be a download of a malicious application. A component provided by a service provider, such as Lookout®, may be monitoring outgoing requests made by applications executing on a mobile communications device. The component may be a malware identifier that may determine that an application on the mobile communications device is attempting to download a malicious file. The malware identifier may make this determination based on a comparison between the name of the file to be downloaded, and a list of known malicious files. The malware identifier may also make this determination based on an analysis of a website or DNS address associated with the file.

For example, the malware identifier may analyze a DNS address included in the request issued by the application. In response to determining that a malicious file has been requested, a request for a SNC account may be generated and sent to an account creation server. Once an account has been created and a SNC connection has been established, the account creation server may control communications sent through the SNC tunnel and block the download of the malicious file.

In yet another example, a triggering event or condition may be connecting to a particular type of network. If the mobile communications device connects to an unsecure network, a system component, such as a SNC service manager, may identify the connection as unsecure and generate a request for a SNC account.

Furthermore, a triggering event or condition may be a type of application that is making a request. For example, a policy may be configured to identify network access requests made by a corporate application, which may be an application provided by a corporation, company, or organization to provide a service, such as email client services, for the corporation. The policy may indicate that a corporate application should always be provided with a SNC connection when connecting to the Internet.

Thus, any application that is a corporate application will trigger a request for a SNC account when that application attempts to connect to the internet. For example, if an employee attempts to use a corporate application to access his or her work email, a request for a SNC account may be generated and sent to an account creation server. The account creation server may create the appropriate credentials and establish a SNC connection which may be used to provide secure access to the user's corporate email account.

In some implementations, a policy that determines whether or not an application is provided with a VPN connection is generated based on an input received from a user, such as a system administrator. The user may be provided with a management console or control panel which may be configured to receive an input from the user and generate a policy based on the received input. The input may specify or identify at least one application or type of application that should or should not be provided with a VPN connection in accordance with systems and methods disclosed herein.

Returning to a previous example, a system administrator may be an administrator for a particular company, and may specify that the company's mobile application should be provided with a VPN connection when requesting network access. The generated policy may be stored and implemented by a VPN service manager and VPN policy manager at a server. The policy may also be downloaded and implemented by a VPN service manager and VPN policy manager of a mobile communications device.

Further still, a triggering event or condition may be user specified or generated. In some implementations, an organization or small business may define triggering events or conditions to control the type of network access requests employees may perform on their mobile communications devices.

For example, an administrator for the small business may identify any access request made to a social network site, such as Facebook®, as a triggering event or condition. If an application on the mobile communications device, such as a web browser, issues a request intended for a social network site, as may be indicated by the request's DNS address, a SNC service manager may detect the web-browser's request, and generate a request for a SNC account.

As similarly discussed in greater detail below with reference to FIG. 8, once a SNC connection is established, the small business may control traffic flowing through the SNC tunnel by controlling a server that provides an endpoint of the tunnel. In this way, an administrator for the small business may configure a policy to block or permit traffic in the SNC tunnel.

In another example, a triggering event or condition may be a type or identity of a cellular tower that the mobile communications device is attempting to connect to. If a mobile communications device is attempting to connect to a network via a cellular tower that has been identified as unsecure, or has not been identified as secure, a request for a SNC account may be generated and sent to an account creation server. Once the account has been created and a SNC connection has been established, a SNC service manager, which may be implemented on a server or on the mobile communications device, may permit or block traffic through the SNC tunnel to provide malware identification and safe browsing functionalities.

Another example of a triggering event or condition may be a change in a status of the mobile communications device. In some implementations, an application installed and executing on the mobile communications device may be configured to locate the mobile communications device if the mobile communications device has been misplaced, lost, or stolen.

For example, a user may log into a web-portal that is linked to the application executing on the mobile communications device. The user may indicate that the mobile communications device is lost. The application may be configured to update a current status of the mobile communications device to a status indicating that the mobile communications device is lost, and further configured to retrieve GPS information and provide the GPS information to the user via the web-portal. In response to the application updating the mobile communications device's status to lost, a system component, such as a SNC service manager, may detect the status change and generate a request for a SNC account.

As discussed in greater detail below with reference to FIG. 8, once a SNC connection has been established, traffic flowing through the SNC tunnel may be controlled by the account creation server. Therefore, if the mobile communications device is lost, a SNC account may be requested, and a SNC connection may be established for any attempt the mobile communications device makes to connect to a network. For each SNC connection, traffic may be dropped, thus blocking all traffic originating from the mobile communications device.

At step 704, one or more servers may be provisioned to provide secure network connection services. In some implementations the server that receives the request generated at step 702 may be configured to determine if other servers should be used to provide secure network connection services to the mobile communications device associated with the request. This determination may be based on one or more load balancing metrics, which may include processing capacity, storage capacity, and bandwidth.

For example, the server that receives the request may be providing secure network connection services to several users and their mobile communications devices, and may be operating at 90% of its processing capacity. If other users request secure network connection accounts, the server might not have the processing capacity to provide services to all of the mobile communications devices. The server may send a message to one or more other servers that instantiates SNC service managers on those servers to provision them to provide services to the user and mobile communications devices that issued the requests.

Servers may also be provisioned based on a latency associated with a mobile communications device from which the request originated. The server that originally receives the request generated at step 702 may determine that another server may be able to provide the mobile communications device with secure network connection services faster due to a lower latency in the connection between the mobile communications device and the other server.

For example, the other server may be geographically closer to the mobile communications device than the server that originally received the request. The server that received the request may provision the other server to provide SNC services, and may transfer handling of the requested SNC account and connection to that server.

At step 706, an account and credentials associated with the received request may be generated. In some implementations, the user and mobile communications device may first be authenticated to the account creation server prior to generating an account and credentials for a particular SNC connection. This additional authentication process may verify that the mobile communications device is a device that is authorized to be provided with a SNC connection.

Thus, the user may provide general account information, such as username and password that a user has previously established for an account with a service provided by a mobile security service provider, such as Lookout®. The general account information may be used to authenticate the identity of the user and the mobile communications device, and indicate that the mobile communications device is authorized to be provided with a SNC connection. Once the account creation server has determined that the mobile communications device is authorized to receive a SNC connection, the account creation server may generate an account and credentials for a SNC connection specific to the request received at step 702.

In various implementations, the account is a temporary account that is discarded or deleted once the SNC connection has been terminated. As discussed in greater detail below with reference to FIG. 8, a temporary account may be deleted after a period of time, such as a grace period, has elapsed. The credentials may be information that may be used to authenticate the user and the user's mobile communications device when the SNC connection is established. For example, the credentials may include a randomly generated username and password.

At step 708, the credentials may be transmitted to the mobile communications device. Thus, the server that generated the credentials may serve them to the mobile communications device that initially sent the request for a SNC account. In various implementations, the mobile communications device may receive the credentials and store them for use when the SNC connection is created.

At step 710, a secure network connection may be established. The mobile communications device may use the received credentials to automatically configure SNC settings on the mobile communications device. The mobile communications device may use the authentication information included in the credentials to send the server a SNC connection request and authenticate itself to the server. Thus, the SNC connection request may include the credentials that were previously received at the mobile communications device. The server may receive the authentication information, authenticate the mobile communications device, and create the requested SNC connection. In various implementations, confirmation that the SNC connection has been established is sent to the mobile communications device.

At step 712, secure network tunneling may be provided. When in the SNC tunnel, network traffic may be controlled and protected by policy settings and rules. Accordingly, the flow of network traffic through the SNC tunnel may be managed by one or more policies and a current device context, which may be determined by the device's location, currently active applications and websites, and the data or applications that are installed on the device. Therefore, as discussed in greater detail below with reference to FIG. 8, while SNC tunneling is being provided, the server may continue to perform safe browsing and malware detection activities based on one or more policies.

Figure 8:
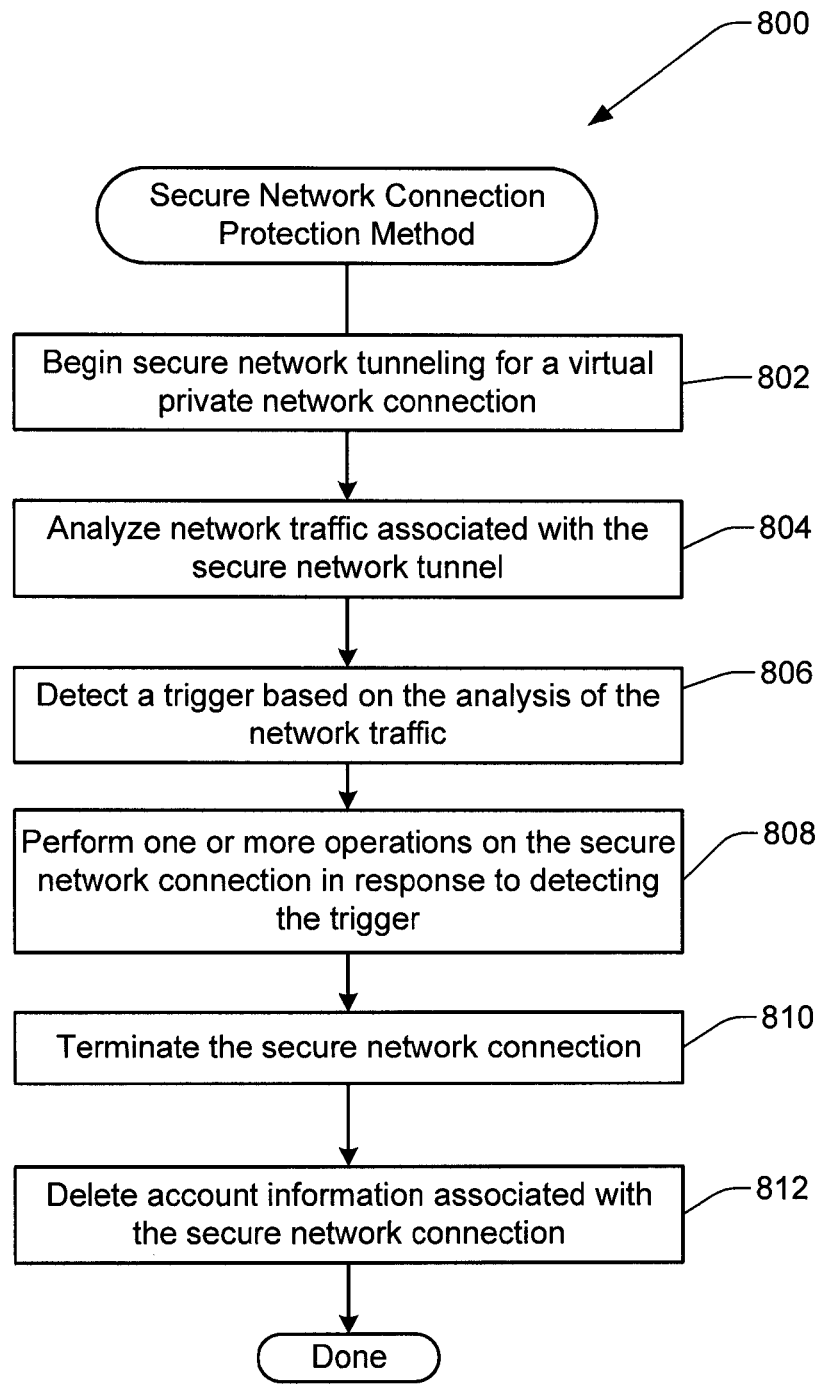
FIG. 8 illustrates an example of a block diagram of a method for automatically protecting a secure network connection, implemented in accordance with some implementations.

FIG. 8 illustrates an example of a block diagram of a method for automatically protecting a secure network connection, implemented in accordance with some implementations. Once a SNC connection has been established, traffic flowing through the SNC tunnel may be analyzed to continue to protect the mobile communications device during the entire time the SNC connection is established. Thus, a server may analyze information being transmitted to the mobile communications device and from the mobile communications device and determine whether or not the flow of network traffic should be changed in any way.

Accordingly, at step 802, tunneling may begin for a secure network connection. As discussed above with reference to FIG. 7, various events and conditions may trigger a mobile communications device to automatically establish a SNC connection with a server. Once established, network traffic flowing to and from the mobile communications device travels through the established SNC tunnel and is subject to the policies associated with the SNC connection that are managed by policy managers.

At step 804, network traffic associated with the secure network tunnel may be analyzed. The server providing an endpoint of the SNC connection may continually analyze information that is sent through the SNC tunnel, such as header information included in data packets.

Thus, traffic sent through the SNC tunnel may include header information that identifies where a packet or request came from, and where it is being sent to. The server may be configured to monitor and analyze information included in the header by parsing and retrieving one or more data values from the header. The server may compare the retrieved data values with data values identified by one or more policies associated with the mobile communications device that is using the SNC connection.

Accordingly, at step 806, a trigger may be identified based on the analysis of the network traffic. As similarly discussed above with reference to FIG. 7, various triggering events and conditions may trigger the establishment of a SNC connection.

Thus, an account creation server may have one or more components, such as SNC policy managers, that identify events or conditions that may trigger or cause the server to perform one or more actions or operations on traffic flowing through the SNC tunnel. The triggering events may be identified by an active policy that governs the flow of traffic through the tunnel.

For example, a triggering event may be downloading a malicious application, requesting a page or resource from an unsafe website or server, or transgressing a geographical boundary. The triggering event may be identified based on the comparison of the analyzed information and the policies associated with the SNC connection.

For example, a security policy may be implemented for a mobile communications device that provides a user of the mobile communications device with safe browsing by identifying and blocking known malicious websites and servers. The policy may include one or more rules that identify a several malicious servers, provide identification information for the malicious servers, such as an IP address, hostname, or DNS address, and specify one or more actions or operations to be taken for each malicious server.

If retrieved information, such as a DNS address, retrieved from the network traffic in the SNC tunnel matches any of the addresses identified by the policy, a triggering event may be identified, and the one or more actions or operations specified by a policy may be performed on the data packet or file associated with the retrieved information.

Accordingly, at step 808, one or more operations may be performed in response to identifying the trigger. Thus, a server may perform one or more operations identified by the policy that was used to detect the triggering condition or event. The operations may be performed to modify a flow of traffic through the SNC tunnel, and protect the mobile communications device from a threat associated with the triggering event.

An operation performed by the server may include providing a user with a notification, dropping a packet, dropping all packets or information sent through the tunnel, or terminating the SNC connection. For example, in response to detecting an application attempting to connect to a malicious command and control server, the user of the mobile communications device may be provided with a notification that displays the text, "We have found malware on your device. We have stopped all connections. Please rescan your device to remove any malware."

In another example, an application on a mobile communications device may request a webpage from a website that has been identified as a phishing site. A system component, which may be a SNC policy manager implemented on the mobile communications device or on the server, may identify the website as a phishing site based on its DNS address.

In response to identifying the request for the phishing site, the SNC service manager may stop or pause traffic passing through the SNC tunnel. In this instance, an application on the mobile communications device may continue to send requests. However, SNC service manager may prevent the requests from being sent to the phishing site and its associated server.

In some implementations, the user may be provided with a notification that indicates that the user, the application, or the mobile communications device is attempting to access or navigate to a website that may be a phishing site. The user may provide a response via a user interface of the mobile communications device. The response may indicate whether or not the SNC connection should be resumed or terminated.

In yet another example, a user may leave a geographical region by leaving a country. A system component, such as a SNC policy manger, may determine that all communications should be blocked when the mobile communications device has left the country.

Thus, in response to determining that the mobile communications device has left the country, a system component, such as SNC service manager, may drop any traffic passing through the SNC tunnel. In this instance, applications executing on the mobile communications device may continue to send requests, such as hypertext transfer protocol (HTTP) requests, using the SNC connection. However, instead of sending the requests to their intended destinations, the SNC service manager may drop the requests so that no requests are sent to their intended destinations.

In some implementations, an operation may be performed in response to determining that an application is attempting to connect to or request content from a server in a particular country. For example, a SNC policy manager may include a country blacklist that specifies that all traffic being sent to one or more particular countries should be dropped. A system component, such as a safe browsing module, may identify a destination country for each request leaving the mobile communications device based on the country that the DNS address associated with the request resolves to. If the country identified based on the DNS address matches a country identified in the blacklist, a system component, such as a SNC service manager, may drop the request.

In various implementations, an account creation server may maintain historical information about a mobile communications device and applications executing on the mobile communications device. The historical information may include information detailing access requests and connection attempts made by the mobile communications device. The historical information may be used to implement a policy based on an aggregation of one or more triggering conditions or events.

For example, historical information may be maintained for a particular SNC connection made with a mobile communications device. If an application on the mobile communications device that is using the SNC connection makes an access request to a potentially malicious server, a policy may indicate that the SNC connection should be allowed to proceed normally.

However, if the application makes more than a predetermined number of requests, the policy may indicate that an action or operation should be performed. For example, if the application on the mobile communications device makes three or more access requests to the potentially malicious server, all traffic in the tunnel may be dropped and communications and requests made by the application may be effectively blocked.

At step 810, the secure network connection may be terminated. The SNC connection may be terminated as part of the normal SNC connection process. Thus, a mobile communications device may finish using the SNC connection and the server providing the SNC connection may terminate the connection according to a conventional SNC termination method.

At step 812, account information associated with the secure network connection may be deleted. As set forth above, the accounts and credentials generated for the requested SNC connection may be temporary. Accordingly, accounts and credentials may be generated dynamically and on-the-fly for each connection request, and subsequently deleted. Additionally, a DNS cache may be flushed or cleared to remove any residual information from a previous SNC connection.

Generating and deleting accounts and credentials for each request in this way provides greater security because in the event account information is compromised, the compromised account information is automatically retired and deleted when the connection is terminated. New account information is automatically generated for any subsequent request made by the user or mobile communications device.

Thus, a particular user is not tied to a single account or set of credentials. If account information is compromised, traffic from the mobile communications device is only compromised temporarily. As soon as new account information is generated, the compromised account information becomes obsolete and unusable by the entity that has procured the information.

In various implementations, the accounts and credentials are deleted after a grace period. Accordingly, if the SNC connection between the mobile communications device and the server is terminated, the server may retain the credentials for a predetermined period of time. By retaining the account information and credentials, the mobile communications device has a window of time in which it may re-establish a connection with the server. Once the window of time elapses, the server may delete the account and credential information. The duration of the period of time may be determined by a user or an administrator.

It should be understood that although account information and credentials may be created and later discarded for security reasons, the account information and credentials may be retained for future use. Furthermore, the account may have been setup and configured in advance and may be reused when another request for an account is made.

Figure 9:
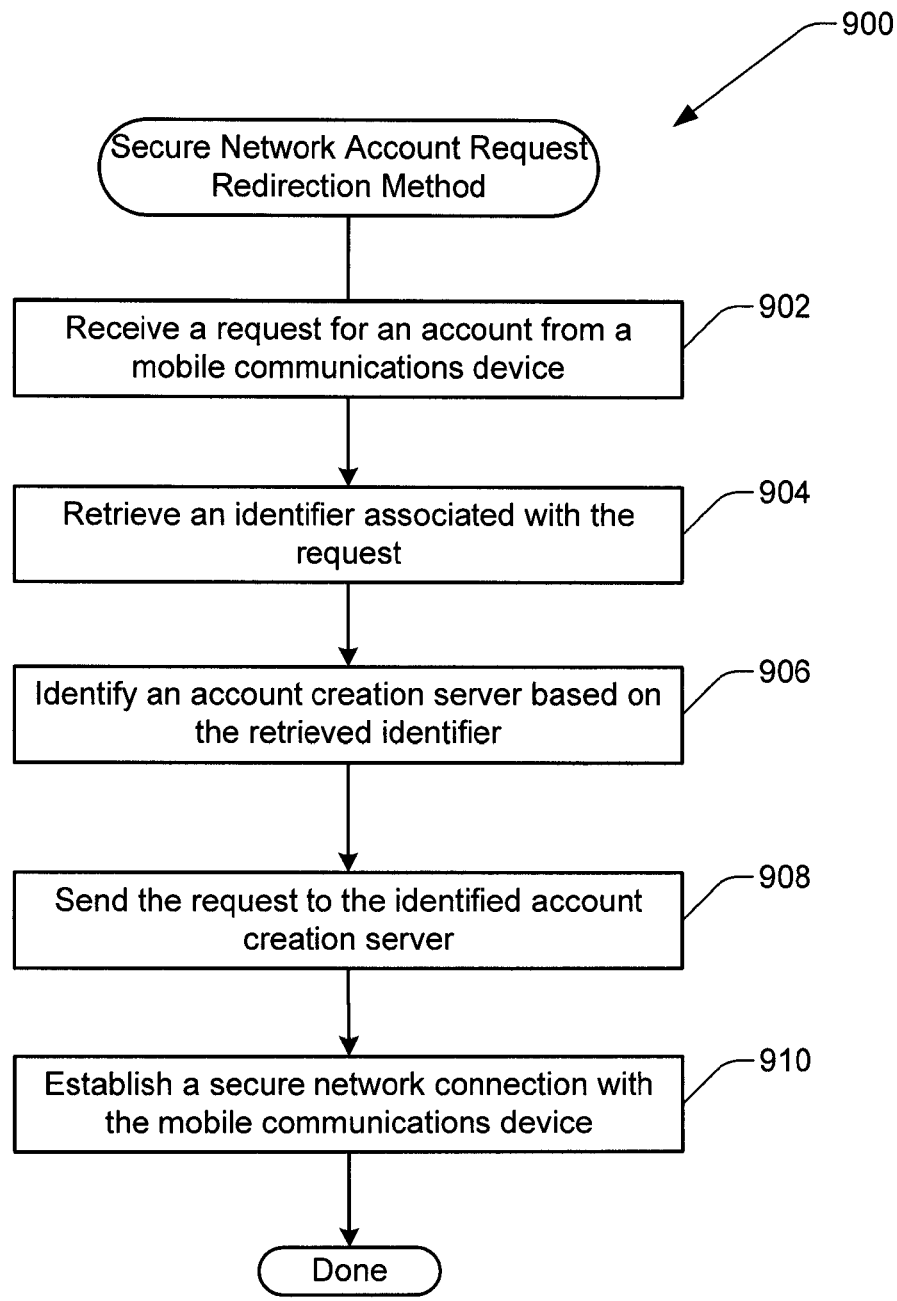
FIG. 9 illustrates an example of a block diagram of a method for redirecting a request for a secure network connection account, implemented in accordance with some implementations.

FIG. 9 illustrates an example of a block diagram of a method for redirecting a request for a secure network connection account, implemented in accordance with some implementations. Method 900 may redirect a request to ensure that the appropriate entity handles account generation and SNC connection services. For example, a company may prefer to handle all SNC connection services associated with the company's email service application. Method 900 may identify an appropriate SNC infrastructure to handle a request, and subsequently redirect the request to the appropriate SNC infrastructure. In this way, method 900 may manage account creation and SNC services provided by multiple entities.

Accordingly, at step 902, a request for an account may be received from a mobile communications device. As similarly discussed above with reference to FIG. 7, a mobile communications device may issue a request for an account in response to detecting one or more triggering events.

For example, a first application executing on the mobile communications device may be a type of application that has been identified or has been previously determined to require a secure network connection when connecting to a remote server via a network. The first application may be a corporate application that a company or an enterprise uses to allow remote employees to connect to their email accounts when working remotely. In response to a user of the mobile communications device attempting to access his or her email, the first application may attempt to connect to an exchange server via the mobile network. A second application may detect that the first application has attempted to connect to the network and may generate a request for a secure network connection account. The second application may send the request to an account creation server.

At step 904, an identifier associated with the request may be retrieved. In some implementations, the identifier is a DNS address or network address that is retrieved from information included in a header associated with the request. Returning to the previous example, the request may be directed to a particular server or host, such as an email exchange server that is operated and maintained by a particular company or enterprise. The header of the request may include a DNS address that identifies the server or host. A system component, such as a SNC service manager, may be configured to parse information from the header and retrieve one or more data values that identify the DNS address.

At step 906, an account creation server may be identified based on the retrieved identifier. As set forth above, a system component, such as a SNC service manager, may retrieve an identifier, such as a DNS address, from the request received at step 902. In some implementations, the retrieved identifier may be compared with a list of identifiers to identify an account creation server that should handle the request.

In some implementations, the list of identifiers may be a list of DNS addresses or IP addresses. The list may map identifiers retrieved from received requests to a destination address to which a request should be forwarded. If an identifier retrieved from a request is not included in the list, the request may be handled by the account creation server that originally received the request. However, if the identifier retrieved from the request is included in the list, a destination address may be looked up, and the request may be forwarded to or handled by the different account creation server identified by the destination address. In some implementations, the list may be comprised of several lists, where each list is associated with a different company or enterprise.

For example, a service provider, such as Lookout®, may provide mobile security services and operate and maintain a first account creation server. An application installed on the mobile communications device may be configured to generate a request for an account that may be used to establish an SNC connection. As similarly discussed, above, the application may detect a triggering event, such as a corporate email application requesting network access. The application may generate a request in response to detecting the event. The request may be sent to the first account creation server, which may retrieve a DNS address from the request. The first account creation server may compare the retrieved DNS address with a predetermined list of DNS addresses. The predetermined list may have been previously generated based on information provided by other entities, such as organizations.

In this example, the DNS address may match a DNS entry corresponding to the company utilizing the corporate email application. The first account creation server may look up a destination address from the predetermined list based on the retrieved DNS address. The first account creation server may subsequently forward the request to the identified account creation server so that the company's infrastructure may handle account creation and SNC connection operations.

Accordingly, at step 908, the request may be sent to the identified account creation server. As set forth above, a DNS address or IP address identifying an account creation server may be obtained from a list or table based on information retrieved from a received request. Accordingly, the server that initially received the request at step 902 may send or forward the received request to the account creation server identified by the looked up address. In this way, a list or table of data values may be used to route requests for accounts such that the creation of accounts and establishment and management of SNC connections may be managed by different entities regardless of where the request was initially received.

At step 910, a secure network connection may be established with the mobile communications device. In response to receiving the forwarded request for the account, the identified account creation server may create credentials, send them to the requesting mobile communications device, and establish an SNC connection, as similarly discussed above with reference to FIG. 7. The identified account creation server may provide monitoring and protection services for the SNC connection, such as safe browsing and malware protection. The identified account creation server may also handle termination of the SNC connection and retention or deletion of account information associated with the SNC connection.

Figure 10:
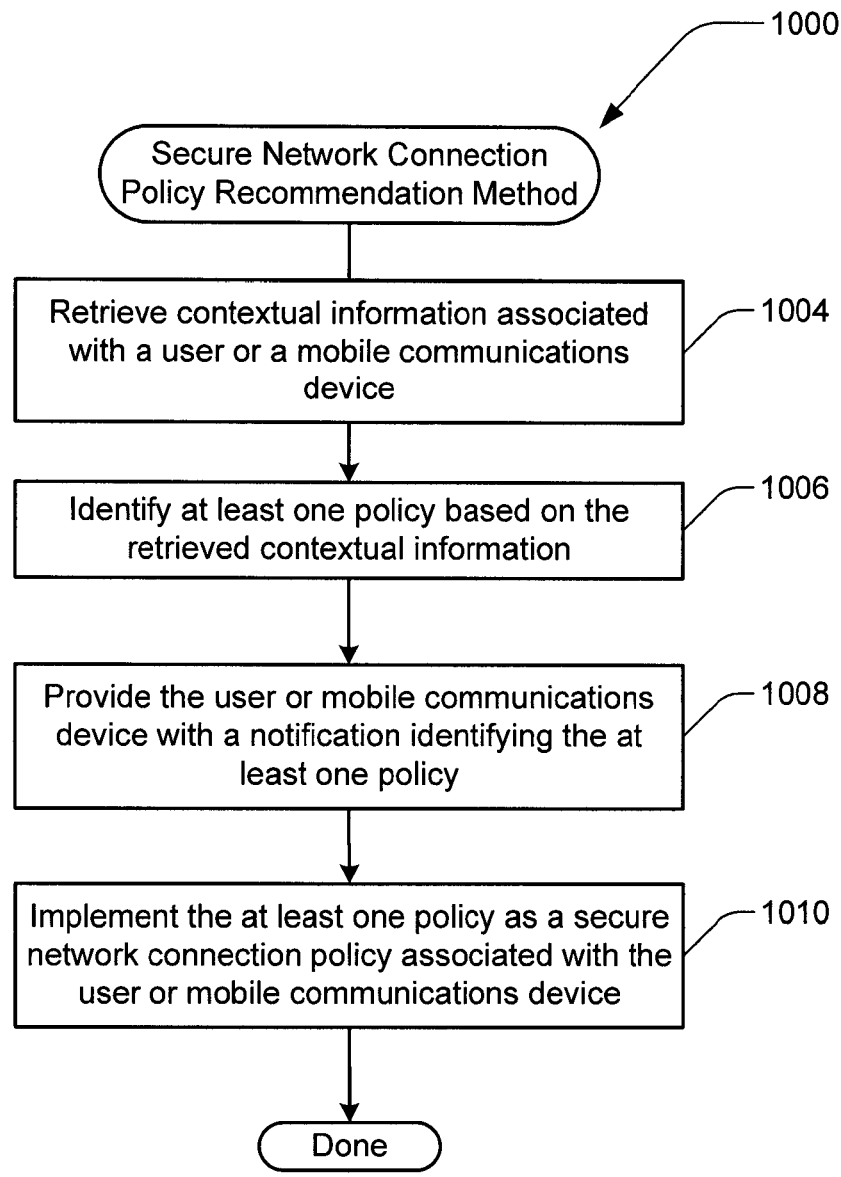
FIG. 10 illustrates an example of a block diagram of a method for recommending a policy for a secure network connection, implemented in accordance with some implementations.

FIG. 10 illustrates an example of a block diagram of a method for recommending a policy for a secure network connection, implemented in accordance with some implementations. Method 1000 may recommend and implement a SNC connection policy based on a user's context and behavior. Accordingly, method 1000 may identify a policy and provide a user with a notification and recommendation based on the user's present situation and based on the user's previous actions.

Accordingly, at step 1004, contextual information associated with a user or mobile communications device may be retrieved. In various implementations, contextual information may be information that identifies actions, activities, and locations associated with a user or the user's mobile communications device.

For example, contextual information may include a user's browsing history for a web browser installed on the mobile communications device. Contextual information may also include a configuration of the mobile communications device, such as applications installed on the mobile communications device, which applications have been accessed recently, and which applications have been used the most. For example, the presence of certain applications, such as gaming or corporate applications, on the mobile communications device may provide configuration information that forms the basis of recommending a policy specific to those applications.

Contextual information may also include data and information collected by sensors and sensing devices installed on mobile communications device. For example, contextual information may include a user's current geographical location, and geographical locations where a user has been in the past. The geographical location may be determined by global positioning system software and hardware installed on the mobile communications device. The geographical location may also be determined from cellular tower information or other such connectivity information.

The contextual information may be retrieved from one or more data stores of the mobile communications device. In some implementations, contextual information is collected and stored in one or more data stores as part of the mobile communications device's ordinary operations.

For example, a web browser installed on the mobile communications device may record recent websites visited by a user as the user's browser history. The browser history may be stored as a data record in the mobile communications device's memory or storage media. An application installed on the mobile communications device may retrieve contextual information from multiple sources to generate a centralized repository of contextual information. Thus, an application provided by a service provider, such as Lookout®, may collect contextual information from various different sources, such as a web browser, global positioning system, and an operating system installed on the mobile communications device.

At step 1006, at least one policy may be identified based on the retrieved contextual information. The policy may be identified by one or more components of the mobile communications device, such as a policy manager. A policy manager installed on the mobile communications device may be configured to identify one or more SNC connection policies based on the retrieved contextual information and based on one or more rules that may be included in the existing policies stored by the policy manager.

In one example, the policy manager may monitor contextual information, such as the mobile communications device's geographical location. In response to detecting a change in the mobile communications device's location, such as entering a different country or geographical region, the policy manger may identify a policy. For example, if the mobile communications device enters a different country, the policy manager may identify a policy in which a SNC connection is always used.

In some implementations, the policy is identified by the server. Thus, the application on the mobile communications device may package the contextual information in a message and send the message to the server. The application on the server may receive the message, and use the contextual information included in the message to identify a policy. As similarly set forth above, a server-side policy manager may identify one or more SNC connection policies based on the contextual information and based on one or more rules stored by the policy manager.

At step 1008, the user or mobile communications device may be provided with a notification identifying the at least one policy. In some implementations, a notification module implemented on an account creation server may generate a notification that may be sent to the mobile communications device. The notification may be displayed on a display of the mobile communications device. Thus, a user of the mobile communications device may be presented with a visual representation of the notification in a display of the mobile communications device.

The notification may provide the user with a generated text string that provides the user with information identifying a recommended policy. The notification may further provide the user with information identifying the basis of the recommendation. For example, if the user's browser history indicates that the user often goes to online banking sites, a policy that requests SNC connections for banking websites may be identified and recommended. The notification generated based on the recommendation may display text, such as "We noticed you visit online banking websites. We recommend using a secure network connection." In some implementations, the notification may prompt the user for an action and may be configured to receive an input from the user.

Thus, the notification may ask the user whether he or she wants to implement the recommended policy. The user may provide an input via an interface of the mobile communications device, such as a touch screen display. The input may be relayed to a server-implemented instance of a SNC policy manager.

At step 1010, the at least one policy may be implemented as a secure network policy associated with the user or mobile communications device. In various implementations, the policy is implemented automatically. Thus, a recommended policy may be identified, a user may be notified, and the policy may be implemented automatically by a policy manager implemented on a server or on the mobile communications device itself.

In some implementations, the policy is implemented in response to a user input. As similarly discussed above, in response to being provided with a recommendation, a user may provide an input indicating that a recommended policy should or should not be implemented. A system component, such as a policy manager, may implement or not implement a recommended policy based on the received input.

Accordingly, if a user has indicated that a recommended policy should be implemented, a policy manager may implement the recommended policy for the user's mobile communications device. Alternatively, if the user has indicated that the recommended policy should not be implemented, the policy manager may continue to use the policy that was already being used. The recommendation may be cached, saved, or stored in a data record that may be used in future iterations of policy recommendation method 1000.

Figure 11:
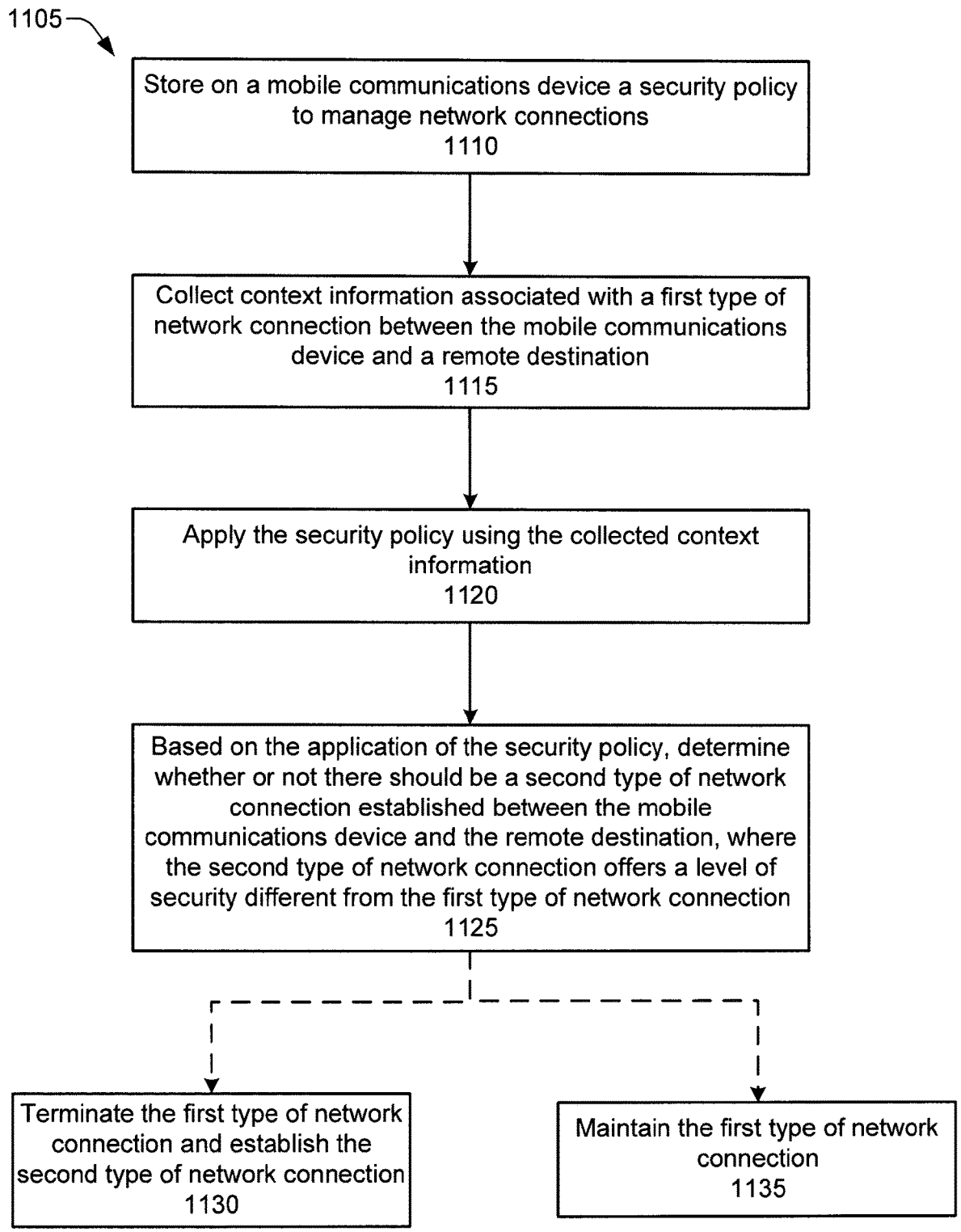
FIG. 11 illustrates an example of a block diagram of a method for applying a security policy to determine whether the security level of a network connection is appropriate for the context.

FIG. 11 shows a flow 1105 for determining whether the security level of a network connection is appropriate based on the context. In a step 1110, a security policy to manage network connections is stored on a mobile communications device. In a step 1115, context information associated with a first type of network connection between a mobile communications device and a remote destination is collected.

In a specific implementation, the context information is collected while a first type of network connection is established between the mobile communications device and a remote destination. In another specific implementation, the context information is collected after a first type of network connection is established between the mobile communications device and a remote destination. In another specific implementation, context information is collected before the network connection is established.

The remote destination can include, for example, a server, web server, application server, e-mail server, website, application, data store, node, service, another client device, access point, router, or the like. The remote destination may be referred to as a target device or target destination.

In a step 1120, the security policy is applied using the collected context information. In a step 1125, based on the application of the security policy, the system determines whether or not there should be a second type of network connection established between the mobile communications device and the remote destination. The second type of network connection offers a level of security different from the first type of network connection.

In a step 1130, if the network connection of the second type should be established the system can terminate the network connection of the first type and establish the network connection of the second type. Alternatively, in a step 1135, if the first type of network connection offers an appropriate level of security, the system allows the first type of network connection to be maintained.

In a specific implementation, determining the appropriate type of network connection is based on a category of the remote destination. For example, the remote destination may be identified through a domain name. The collected context information may include the domain name. Further detail is provided below.

In some cases, the level of security offered by the second type of network connection will be greater than the level of security offered by the first type of network connection. Consider, as an example, a scenario where the collected context information indicates that the user is managing their financial accounts, the security policy specifies that such an activity should be performed using a secure connection (e.g., HTTPS or VPN), but the current connection is a relatively unsecured connection (e.g., HTTP). In this case, the system may terminate the unsecured connection with the remote destination and establish a secured connection with the remote destination. The secured connection helps to protect the user's sensitive financial information.

In other cases, the level of security offered by the second type of network connection will be less than the level of security offered by the first type of network connection. Consider, as an example, a scenario where the collected context information indicates that the user is reading sport scores, the security policy specifies that such an activity should be performed using an unsecured connection, but the current connection is a secured connection. In this case, the additional computing overhead associated with maintaining a secured connection may not be desirable because the information is not particularly sensitive. Thus, the system may terminate the secured connection and establish an unsecured connection. The unsecured connection may provide for a faster response and improved user experience than the secured connection.

Figure 12:
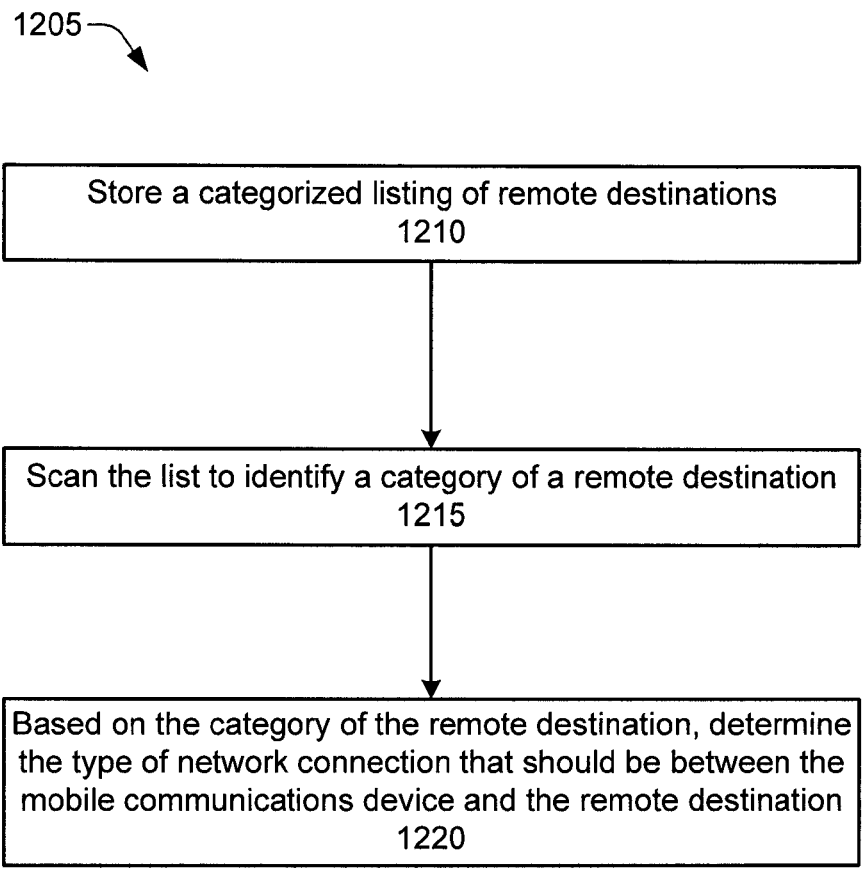
FIG. 12 illustrates an example of a block diagram of a method for using categories for determining whether the security level of the network connection is appropriate.

FIG. 12 shows a flow 1205 for determining network connection types based on the category of the remote destination. In a step 1210, a categorized listing of remote destinations is stored. The list includes a set of remote destinations and a set of categories, each remote destination being categorized into a category of the set of categories.

A remote destination may be identified by a domain name, IP address, media access control address (MAC address), or other identifier, or combinations of these. Some specific examples of domain names include www.wellsfargo.com, www.bofa.com, www.nytimes.com, and many others. Some specific examples of categories include news, financial services, cloud services provider, shopping, games, entertainment, health services, and many others.

In a step 1215, the list is scanned to identify a category of a remote destination. For example, the remote destination identified as "www.wellsfargo.com" may be categorized as "financial services." The remote destination identifies as "www.cnn.com" may be categorized as "news."

In a step 1220, based on the category of the remote destination, the system determines the type of network connection that should be between the mobile communications device and the remote destination. In a specific implementation, the security policy is applied or evaluated to make the determination. The security policy may include a list of categories and a specification of the network connection type for each category.

For example, the security policy may specify a secure network connection for the category "financial services" and a nonsecure network connection for the category "news." Thus, a secure network connection may be used for the remote destination "www.wellsfargo.com" because the domain falls within the category of "financial services." A nonsecure connection may be used for the remote destination "www.cnn.com" because the domain falls within the category of news.

Whitelisting techniques, blacklisting techniques, or both may be used to help determine the network connection type. For example, in a specific implementation, a security policy includes a listing of remote destination categories. In this specific implementation, if a remote destination falls within a category of the listing, a network connection of a first type may be required between the mobile communications device and the remote destination.

If the remote destination does not fall within a category of the listing, a network connection of a second type, different from the first type, may be required between the mobile communications device and the remote destination. In a specific implementation, the network connection of the first type is a secure network connection. The network connection of the second type is a non-secure (or less secure) network connection. In another specific implementation, the network connection of the first type is a non-secure (or less secure) network connection. The network connection of the second type is a secure network connection.

In a specific implementation, a method includes determining whether the destination is classified as a destination that is important to a corporation (e.g., one of its cloud service providers) or if destination is classified as a financial services website or a shopping site, etc.

Referring now to step 1210, in a specific implementation, the categorized listing of remote destinations is stored at the mobile communications device. Storing the listing at the mobile communications device allows for determining the category of a particular remote destination locally at the mobile device or without having to make a request to a server. This can help to improve response time since a request over a network does not have to be made.

In another specific implementation, the categorized listing is stored a server. In this specific implementation, the mobile communications device transmits the name (or other identifier) of the remote destination to the server. The server receives the remote destination identifier and cross-references the identifier with the categorized listing to identify the category. The server can then transmit the category to the mobile communications device.

Upon receipt of the category at the mobile communications device, the mobile communications device can apply the security policy to determine the type of network connection that should be between the mobile communications device and the remote destination. Storing the categorized listing at the server rather than at the mobile communications device helps to conserve the limited amount of storage on the mobile communications device. Storage space that would have been used for the list can instead be used for user files such as the user's music and video files.

In another specific implementation, a categorized listing is stored on a server and a subset of the categorized listing is stored on the mobile communications device. In this specific implementation, the mobile communication device attempts to determine the category of the remote destination by scanning the subset of listings. If the category of the remote destination cannot be identified from the subset of listings, the remote destination identifier is transmitted from the mobile communications device to the server.

The server receives the identifier and scans the categorized listing to identify the category of the remote destination. The category can then be transmitted from the server to the mobile communications device. This hybrid approach has several advantages. There can be a quick response time if the category of the remote destination can be determined locally, i.e., at the mobile communications device. In the event that the category cannot be determined locally, the server can be contacted for the determination. This provides a balanced and comprehensive approach to identifying the category of a particular remote destination.

In a specific implementation, a method includes storing at the mobile communications device a list identifying a plurality of physical network connection providers, scanning the list to determine whether a physical network connection provider for the first network connection is listed in the list, if the physical network connection provider for the first network connection is listed in the list, allowing the mobile communications device to maintain the first network connection, and if the physical network connection provider for the first network connection is not listed in the list, not allowing the mobile communications device to maintain the first network connection. The method may include receiving the list at the mobile communications device in response to a request to a server for the list.

In another specific implementation, a method includes storing at the mobile communications device a list identifying a plurality of physical network connection providers, scanning the list to determine whether a physical network connection provider for the first network connection is listed in the list, if the physical network connection provider for the first network connection is listed in the list, not allowing the mobile communications device to maintain the first network connection, and if the physical network connection provider for the first network connection is not listed in the list, allowing the mobile communications device to maintain the first network connection. The method may include receiving the list at the mobile communications device in response to a request to a server for the list.

In another specific implementation, a method includes storing at the mobile communications device a list including a plurality of physical network connection providers, and a plurality of categories, each physical network connection provider being categorized into a category of the plurality of categories, scanning the list to identify a category of a physical network connection provider for the first network connection, determining that the physical network connection provider for the first network connection is in a first category, and upon the determination, allowing the mobile communications device to maintain the first network connection. The method may include receiving the list at the mobile communications device in response to a request to a server for the list.

In another specific implementation, a method includes storing at the mobile communications device a list including a plurality of physical network connection providers, and a plurality of categories, each physical network connection provider being categorized into a category of the plurality of categories, scanning the list to identify a category of a physical network connection provider for the first network connection, determining that the physical network connection provider for the first network connection is in a first category, and upon the determination, not allowing the mobile communications device to maintain the first network connection. The method may include receiving the list at the mobile communications device in response to a request to a server for the list.

In another specific implementation, a method includes sending a request to a server for the server to evaluate a physical network connection provider for the first network connection, receiving a result from the server in response to the request, and based on the result, allowing or not allowing the mobile communications device to maintain the first network connection.

Referring to step 1115 (FIG. 11), context information may be collected during or while the network connection is established. Context information may be collected after the network connection is established. Collecting context information while the network connection is established allows for continuous monitoring that helps ensure the type of network connection offers the appropriate level of security for the user's current activity.

Context information may be collected in response to the attempt by the mobile communications device to establish the network connection. Context information may include information collected prior to the attempt by the mobile communications device to establish the first network connection, and information collected in response to the attempt by the mobile communications device to establish the first network connection.

In a specific implementation, the "while" case involves the system acting while the network connection is being established; the "after" case involves the system acting post that event. The "while" case can be for when the architecture can support the system being "in the flow" of the network connection being established, e.g., as part of an operating system module, or in the case in which the system code is the one which is actually doing the work of establishing the network connection. The "after" case can be for when the architecture does not let the code of the system participate or "get in the flow" of the original network connection being made. In this case, the system can observe the connection being made and then react to that after the fact.

In a specific implementation, after terminating the first type of network connection and establishing the second type of network connection (step 1130), context information may continue to be collected. A policy evaluation can be made based on the newly collected context information to determine whether the second type of network connection remains appropriate. If the security offered by the second type of network connection remains appropriate, the second type of network connection continues to be maintained. If the security is not appropriate, the second type of network connection is terminated and another type of network connection (e.g., first type of network connection) is established. For example, the security may not be appropriate for the user activity, location, the device, and so forth.

Similarly, after allowing the first type of network connection to be maintained (step 1135), context information may continue to be collected. A policy evaluation can be made based on the newly collected context information to determine whether the first type of network remains appropriate.

If the security offered by the first type of network connection remains appropriate, the first type of network connection continues to be maintained. If the security is not appropriate, the first type of network connection is terminated and another type of network connection (e.g., second type of network connection) is established.

Figure 13:
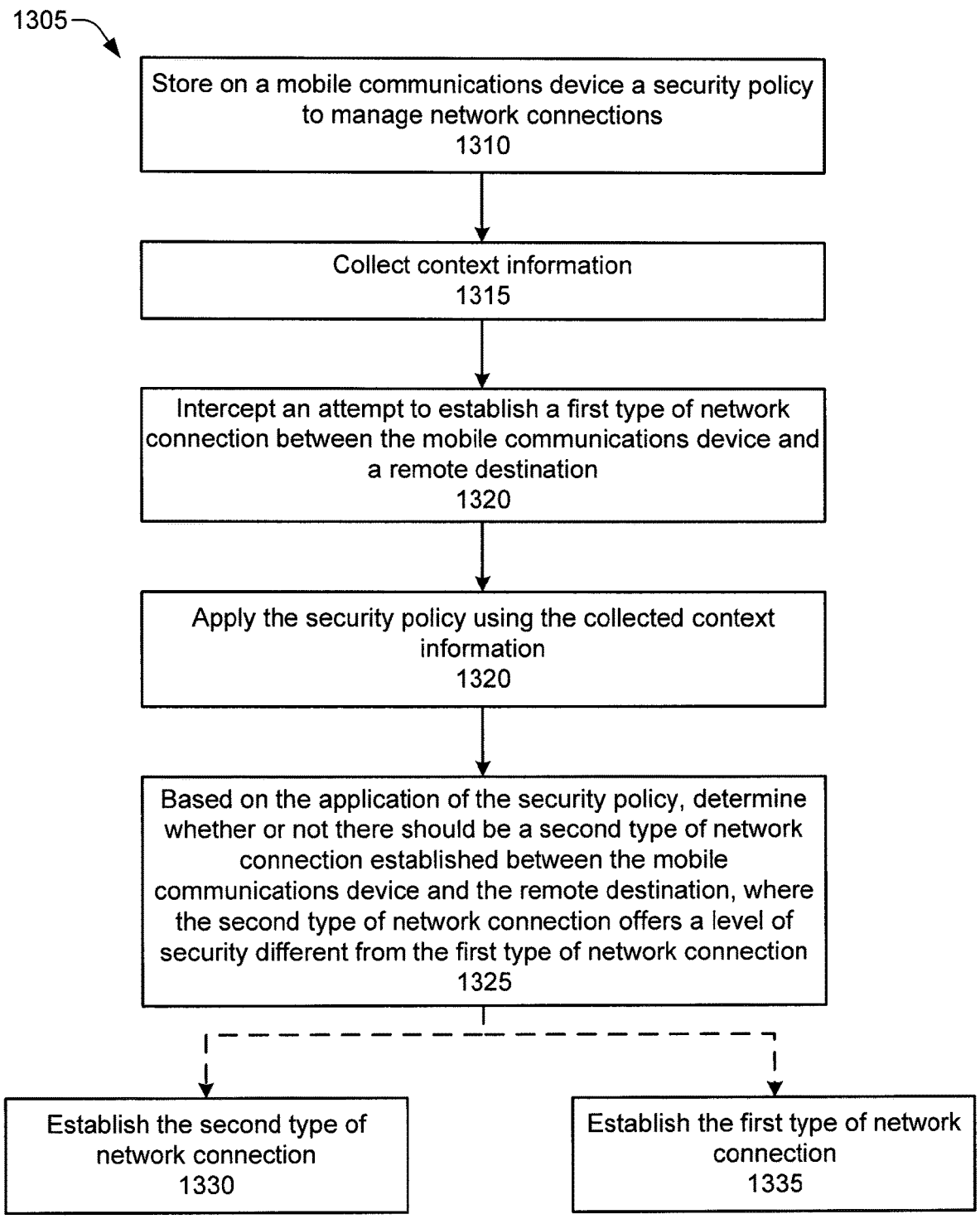
FIG. 13 illustrates an example of a block diagram of a method for applying a security policy to establish a network connection having the appropriate level of security for the context.

Context information may be collected before or prior to a network connection is established, in response to an attempt by the mobile communications device to establish a network connection, or both. Context information can be collected prior to attempt to establish network connection, context information can be collected in response to attempt to establish network connection, or both. FIG. 13 shows a flow 1305 of another specific implementation for determining the type of network connection that should be established. In steps 1310 and 1315 a security policy is stored on a mobile communications device and context information is collected.

In a step 1320, the system intercepts an attempt to establish a first type of network connection between the mobile communications device and a remote destination. The interception may be an operating system event, a network driver event, a baseband processor event, a security application event, or an Android intent filtering event.

In a step 1325, the security policy is applied using the collected context information. In a step 1330, based on the application of the security policy a determination is made as to whether there should be a second type of network connection between the mobile communications device and the remote destination, where the second type of network connection offers a level of security different from the first type of network connection. If so, the second type of network connection is established (step 1335). If not, the first type of network connection is established (step 1340).

Figure 14:
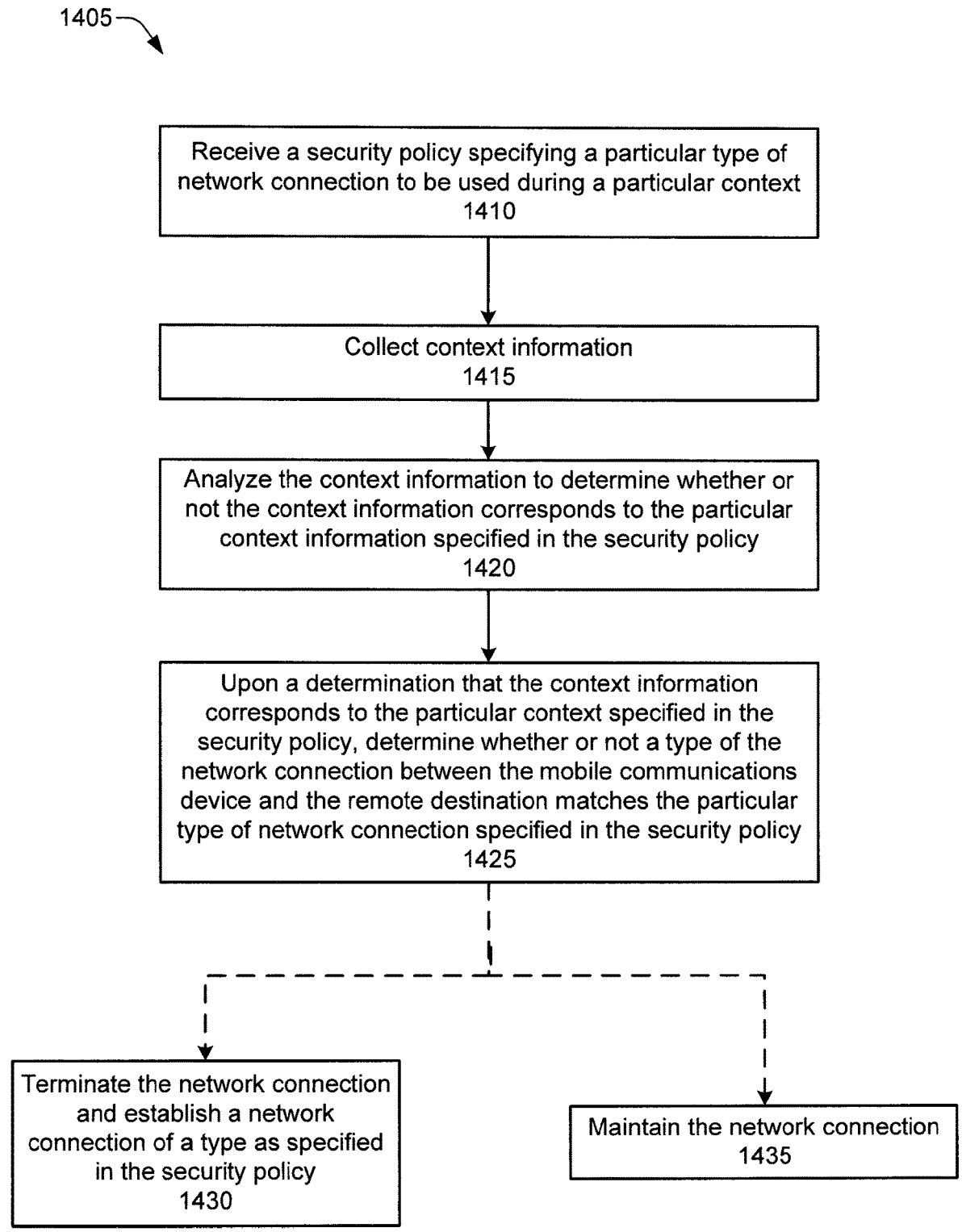
FIG. 14 illustrates an example of a block diagram of a method for receiving a security policy.

In a specific implementation, a method includes collecting context information before a network connection is established, determining based on policy what types of network connections (security levels) are appropriate for the current context, and then if an attempt is made to establish a network connection, determining if the network connection which is attempting to be established should be allowed to continue, or if a different network connection should be made. In this specific implementation, the context-based decision is being determined at least in part prior to the attempt to establish the network connection FIG. 14 shows a flow 1405 of another specific implementation of a system for ensuring a network connection having an appropriate level of security. In a step 1410, a security policy associated with a network connection between a mobile communications device and a remote destination is received. The security policy includes a specification of a particular type of network connection to be used during a particular context. The security policy may be transmitted from the remote destination to the mobile communications device.

Thus, an administrator of the remote destination can, via the security policy, specify the type of network connection that should be used to communicate with the remote destination. The security policy may be received while the network connection is established. The security policy may be received after the network connection is established. The security policy may be sent from the mobile communications device to the server for the server to apply the policy.

As an example, the remote destination may provide a combination of non-sensitive and sensitive services. An example of a non-sensitive service provided by the remote destination can include a webpage that lists publicly available mortgage rates. An example of a sensitive service provided by the remote destination can include a webpage that displays the user's account balances. The administrator can specify via the security policy that a non-secure network connection be used when the user accesses the non-sensitive services. Instead or additionally, the administrator can specify that a secure network connection be used when the user accesses the sensitive services.

In a step 1415, context information is collected. In a step 1420, the context information is analyzed to determine whether or not the context information corresponds to the particular context information specified in the security policy. In a step 1425, upon a determination that the context information corresponds to the particular context specified in the security policy, the system determines whether or not a type of the network connection between the mobile communications device and the remote destination matches the particular type of network connection specified in the security policy. If the current or existing network connection does not match, the system terminates the connection and establishes a new network connection of a type as specified in the security policy (step 1430). Alternatively, if the connection does match, the system allows the connection to be maintained (step 1435).

Continuing with the example above, if the context information indicates that the user is merely browsing the mortgage rates, but the current network connection is a secure connection, the connection may be terminated and a non-secure network connection (or less secure network connection) may instead be established (see step 1430). The less secure network connection may offer a quicker response time than the more secure connection which can thus improve the user's experience. Alternatively, if the context information indicates that the user is accessing their account balances, the system may allow the current secure network connection to be maintained (see step 1435).

Similarly, if the context information indicates that the user is accessing their account balances, but the current network connection is a non-secure connection, the connection may be terminated and a secure network connection (or more secure network connection) may instead be established (see step 1430). Alternatively, if the context information indicates that the user is merely accessing publicly available mortgage rates, the system may allow the current non-secure network connection to remain (see step 1435).

Figure 15:
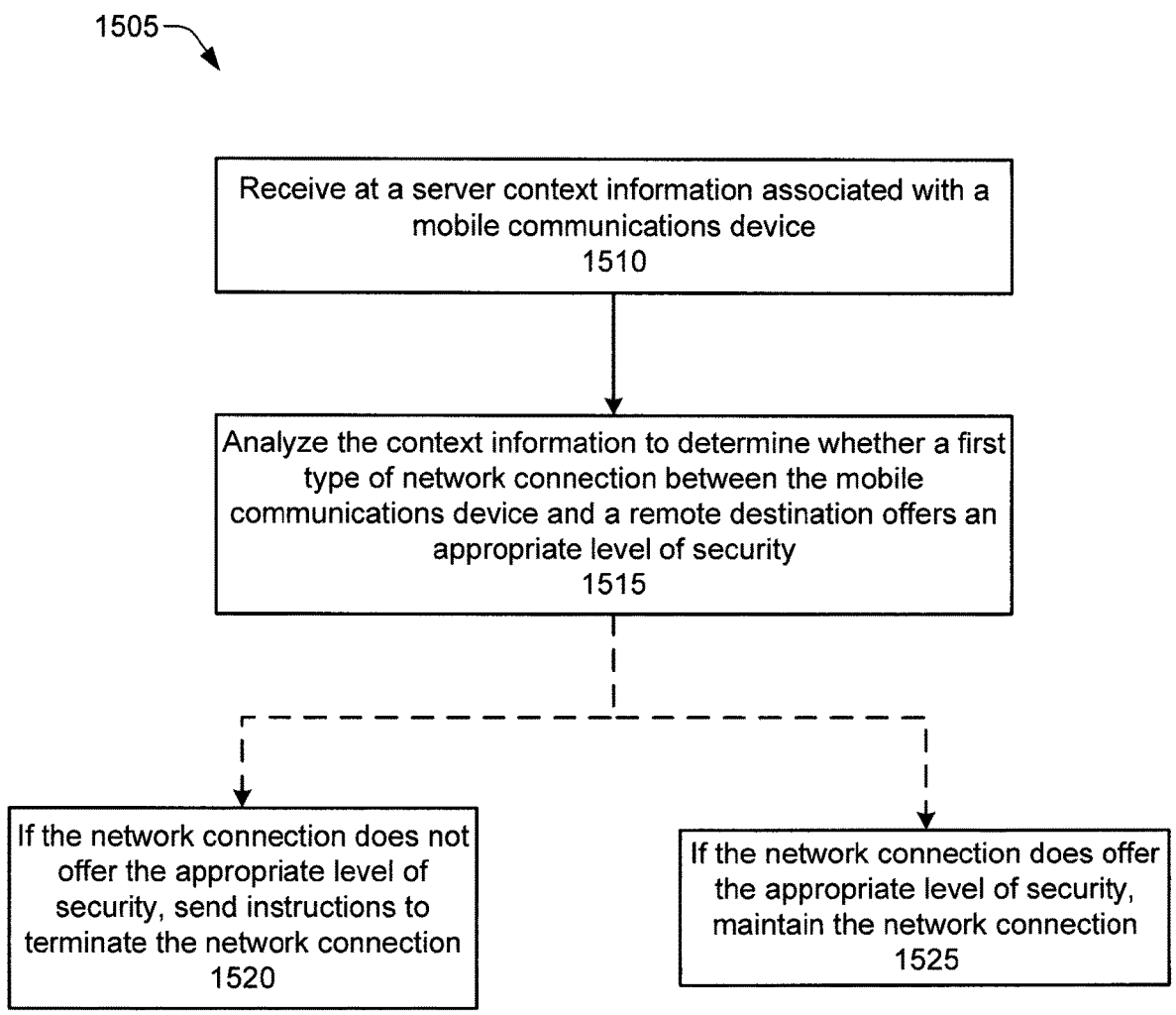
FIG. 15 illustrates an example of a block diagram of a method for analyzing context information at a server to determine whether a network connection for the mobile communications device offers the appropriate level of security.

FIG. 15 shows a flow 1505 of another specific implementation of a system for ensuring a network connection having an appropriate level of security. In this specific implementation, context information collected at a mobile communications device is transmitted to a server for analysis. In particular, in a step 1510, a server receives context information associated with a mobile communications device. In a step 1515, the server analyzes the context information to determine whether a first type of network connection between the mobile communications device and a remote destination offers an appropriate level of security. The remote destination may be same as or different from the server.

If the network connection does not offer the appropriate level of security, the server sends instructions to the mobile communications device to terminate the network connection (step 1520). The instruction may additionally include instructions to establish a new network connection that offers the appropriate level of security. Alternatively, if the current or existing network connection does offer the appropriate level of security, the network connection may be allowed to remain (step 1525). Depending upon the context, policy, or both, the new network connection may offer a level of security greater or less than the level of security offered by the previous network connection.

Network connection types may refer to different types of physical connections, different types of overlay connections, different application connections, a physical connection with or without an overlay connection, or combinations of these. More particularly, in an embodiment, a physical connection refers to a connection at the lower network layers, e.g., a cellular network connection, a Wi-Fi network connection, a BLUETOOTH network connection.

An overlay connection refers to a secure tunnel or VPN or other connection made atop the physical connection. An application connection request refers to an app or browser requesting a connection be made with a specific destination, e.g., opening a TCP or UDP socket, issuing an HTTP GET or a DNS request from an application.

There can be more than one physical connections possible, or even currently active at any point in time from a device. For example, at any point in time a device may have a cellular network physical connection, a Wi-Fi network physical connection, a Bluetooth physical connection, and so forth.

A physical connection may have one or more overlay connections atop it. An overlay connection may have one or more application connections active over it, from the same or multiple applications. An overlay network is a logical network built on top of a physical network. An app or web browser can have more than one application connection requests active at any point in time; these may be over a single socket connection or multiple socket connections.

A device may attempt to establish a physical network connection, and it may not necessarily have anything to do with the any particular application wanting to establish an application connection; e.g., the device, detecting a Wi-Fi connection is available and that it matches an SSID previously used may establish this physical network connection.

In a specific implementation, it is desirable to establish a secure connection (an overlay connection, e.g., a VPN) over a physical connection prior to or in response to any application connection request being made. E.g., a Wi-Fi connection established in a coffee shop may be a trigger to establish a secure connection, according to policy.

Applications, when attempting to establish an application connection (i.e., open a socket) typically use by default the existing already established physical connection over which to establish their application connection.

In a specific implementation, techniques are provided for the use of policy in determining how a device establishes a physical network connection. In another specific implementation, techniques are provided for the use of policy in determining how applications establish application connections.

More particularly, in a specific implementation a method includes storing on a mobile communications device a security policy to manage types of network connections, collecting context information at the mobile communications device to evaluate a first type of network connection between the mobile communications device and a target destination, applying the security policy using the collected context information at the mobile communications device, and based on the application of the security policy, determining whether or not there should be a second type of network connection between the mobile communications device and the target destination.

The first and second types of network connections may include different types of physical network connections. The first and second types of network connections may include the same type of physical network connection, one of the first or second types of network connections may include an overlay connection, and another of the first or second types of network connection may not include the overlay connection.

The first and second types of network connections may include physical network connections, where the first type of network connection may include at least one of a cellular network connection, a Wi-Fi network connection, or a Bluetooth network connection, and the second type network connection may include one of at least another of the cellular network connection, the Wi-Fi network connection, or the Bluetooth network connection.

The first and second types of network connections may include physical network connections, where the first type of network connection may include an overlay connection, and the second type of network connection may not include the overlay connection.

The first and second types of network connections may include physical network connections, where the first type of network connection may not include an overlay connection, and the second type of network connection may include the overlay connection.

The first and second types of network connections may include the same type of physical network connection, where the first type of network connection may include an overlay connection, and the second type of network connection may not include the overlay connection.

The first and second types of network connections may include the same type of physical network connection, where the first type of network connection may not include an overlay connection, and the second type of network connection may include the overlay connection.

The first and second types of network connections may include different types of physical network connections, where the first type of network connection may include an overlay connection, and the second type of network connection may not include the overlay connection.

The first and second types of network connections may include different types of physical network connections, where the first type of network connection may not include an overlay connection, and the second type of network connection may include the overlay connection.

In a specific implementation, the method further includes if there should be the second type of network connection, establishing the second type of network connection over the first type of network connection, where the first type of network connection includes a physical network connection, and the second type of network connection includes an overlay connection.

In another specific implementation, the method further includes if there should be the second type of network connection, establishing the second type of network connection over the first type of network connection, where the first type of network connection includes a physical network connection, and the second type of network connection includes a new overlay connection.

In another specific implementation, the method further includes if there should be the second type of network connection, establishing the second type of network connection over the first type of network connection, where the first type of network connection includes a physical network connection, and the second type of network connection includes an existing overlay connection.

In another specific implementation, the method further includes if there should be the second type of network connection, establishing the second type of network connection, where the second type of network connection includes a new physical network connection, and an overlay connection over the new physical network connection.

In another specific implementation, a method includes storing on a mobile communications device a security policy, collecting context information at the mobile communications device to evaluate a request by an application program to establish an application connection over an existing physical network connection, applying the security policy using the collected context information at the mobile communications device, and based on the application of the security policy, allowing or not allowing the request.

In a specific implementation, allowing the request includes establishing an overlay connection over the existing physical network connection for the application program. In another specific implementation, allowing the request includes not establishing an overlay connection over the existing physical network connection for the application program. In another specific implementation, allowing the request includes reusing an existing overlay connection over the existing physical network connection for the application program. In another specific implementation, allowing the request includes routing the application connection over the existing physical network connection because the existing physical network connection includes an overlay connection. In another specific implementation, allowing the request includes routing the application connection over the existing physical network connection because the existing physical network connection does not include an overlay connection.

In a specific implementation, not allowing the request includes terminating the existing physical network connection, and establishing a new physical network connection for the request, where the new and existing physical network connections include different types of physical network connections. In another specific implementation, not allowing the request includes maintaining the existing physical network connection, and establishing a new physical network connection for the request, where the existing physical network connection is maintained for a different application program. The method may include establishing an overlay connection over the new physical network connection.

Depending on the policy, an overlay connection may be established atop an existing physical connection, an overlay connection may be reused, a new physical connection may be established, or a new overlay connection may or may not be established atop that new physical connection.

Consider the following example. There are vulnerabilities in small cell appliances (e.g., femto-cells) that allow for interception of traffic via MiTM (Man in the Middle) attacks; a policy may state that for the category of banking sites or banking applications, a physical connection of the cell network over a small cell is too low a level of security, and a new physical connection of sufficiently high level must be established (e.g., a Wi-Fi physical connection or a cellular network connection to macro cell), and over this physical connection there may need to be established an overlay connection.

Another example of context information includes detecting a Man-in-the-middle attack (MiTM) by comparing the certificate obtained when establishing a secure (e.g., TLS) connection with one in a certificate pinning store, or one obtained dynamically via a secure connection from a trusted source (e.g., a Lookout server). If these certificates are not the same, then there may be an adversary in the middle providing a fraudulent certificate. In such a case, the detection of a possible MiTM attack is part of the context information that can be used according to policy to establish a different level of security on a connection.

In a specific implementation, techniques are provided for policy driven requirements to break a first network connection and establish a second network connection, keep a first network connection and establish a second network connection atop the first network connection a la VPN, keep or drop a first network connection but establish second physical connection e.g., Wi-Fi versus small cell and optionally establish a connection atop that new one, route a desired application network connection over an existing already established connection (e.g. reuse existing VPN or secure proxy for this), or combinations of these.

Switching from a non-secure connection to a secure connection can involve establishing an overlay connection (e.g. a VPN) over an existing physical connection, and using that overlay connection for the application. This can be accomplished by a security component that is part of the OS or runs as a privileged (e.g., preloaded) or ordinary application (depends on what the OS allows).

Switching from a non-secure connection to a secure connection can involve starting up a new physical connection (e.g., deciding that a femtocell cellular network connection should not be used, and a Wi-Fi connection should be used, or vice versa), or switching to use a different physical connection to route requests across (to use for making application connections). Upon that different physical connection there may be a policy-dictated need to establish an overlay connection.

The system may or may not have access to encrypted data in a communication Whether or not there is access can depend on where architecturally the security component runs, with what privileges; or the system may be able to use other context information to infer that sensitive information is being exchanged.

The security component could be running with system privileges in which case it can intercept system or service calls and actually inspect data intended to be sent prior to it being encrypted. Or the security component could be running on a server over the network that is essentially itself using a suitably provisioned certificate to do the functional equivalent of a MiTM scenario, although not for nefarious purposes, rather to protect the security and privacy of data being sent by the device; in such a scenario the component could also inspect the data being sent to make the determination that it is sensitive.

In an embodiment, the system can infer that sensitive data is being sent. This can be done based on other context information, such as knowing that App X is a banking app and therefore is used to send sensitive information, or that App Y is of a category of medical-information-reporting apps and thus it sends sensitive information, or that a browser is connecting to a known destination or category of destination which is known to involve sending sensitive information.

This can also be done by monitoring sources of information accessed by the application, e.g., by determining that the application is accessing a source of sensitive information (e.g., contacts database, call logs, SMS messages, etc.) or a file known to contain sensitive information (known a priori or known by inspection of file contents as they are being read or known by having been tagged or associated with metadata indicating that there is sensitive information, e.g., information from a corporation resource), or sensor information that can be sensitive information (e.g., accelerometer readings, or location information, or reading from biometric or medical or health related sensors such as blood pressure or pulse, etc.), or combinations of these.

Table A below provides an example of context information in connection with policy actions.

TABLE A

| POLICY MATCH | POLICY ACTION | COMMENTS |
| --- | --- | --- |
| PHYSNETWORK.TYPE==Wi-Fi AND PHYSNETWORK.SSID.inWhiteList( )==FALSE AND APPL.CATEGORY==Finance | Establish OVERLAY NETWORK (e.g. VPN) from device to a server (e.g. a Lookout server). | OVERLAY NETWORK is established to protect information from passive eavesdropping in device's location |
| PHYSNETWORK.TYPE==Cell AND PHYSNETWORK.SUBTYPE==smallcell AND PHYSNETWORK.ID.inWhiteList( )==FALSE AND APPL.CATEGORY==Health | Establish OVERLAY NETWORK (e.g., TLS/ SSL tunnel) from device to server (e.g., a Lookout server). | Unknown femtocell stations are not to be trusted for this category of applications, because they could be compromised. |
| DESTINATION.CATEGORY==Banking AND APPLNETWORK.TYPE!=TLS | Establish OVERLAY NETWORK (e.g. VPN) from device to a server (e.g. a Lookout server). | A web browser going to a Banking category destination and not using SSL/ TLS should have a higher degree of security. |
| APPL.CATEGORY==Gaming OR APPL.CATEGORY==Video | Use basic physical connection, not an overlay network. | Security for this class of application is not needed. |
| PHYSNETWORK.TYPE==Wi-Fi AND (PHYSNETWORK.SECTYPE==NONE OR PHYSNETWORK.SECTYPE==WEP) | Establish OVERLAY NETWORK (e.g., VPN) from device to a server (e.g. a Lookout server). | Unsecured Wi-Fi, or inadequately secured Wi-Fi (using WEP) should require an overlay network (e.g. VPN) to protect application connection. |
| DEVICE.LOCATION=CN | Establish OVERLAY NETWORK (e.g., VPN) from device to a server (e.g. a Lookout server). | When user is traveling in China, always use an OVERLAY NETWORK (e.g. VPN) |

It should be appreciated that the above is merely an example. Actual syntax, types of context information involved, or both may be different.

Below is an example for applying or evaluating a policy. For the APPL.CATEGORY==Gaming OR APPL.CATEGORY==Video rule above, it may have been the case that a secure overlay network (e.g., VPN) had been established over the physical network connection for use by other (secure or sensitive) application(s). But this category (Gaming or Video) does not require that level of security, and should not use the overhead involved in establishing or using a secure connection. The application will just use the basic physical network with no overlay network for its application connection.

In a specific implementation, establishing or terminating a connection is subject to a trigger. In a specific implementation, there are two triggers for this: (1) the device itself is making a physical network connection; (2) an application (including a web browser) is wanting to make an application network connection to a specific destination.

For (1) there can be a policy rule which requires making a different physical network connection (e.g., don't use a small cell connection, use a Wi-Fi connection).

For (2) a new application network connection may use an existing physical network connection, and may use an existing overlay network connection if one has been established and meets the policy criteria; or policy may dictate to establish a new or different overlay network connection; or may dictate not using an overlay network connection; or may even dictate establishing a new or different physical network connection. Other pieces of context information can be used in policy rules.

The security of a network connection may be determined or ranked. In a specific embodiment, as described above with respect to policy rules, there are explicit rules for what type of network connection needs to be used.

In an alternative embodiment, there are policy rules which define an explicit security level; and associated information listing which types of network connection can be used to achieve a given security level. Table B shows a modification of the example in table A above (again, as an example):

TABLE B

| POLICY MATCH | POLICY SECURITY LEVEL | COMMENTS |
|---|---|---|
| PHYSNETWORK.TYPE==Wi-Fi AND PHYSNETWORK.SSID.inWhiteList( )==FALSE AND APPL.CATEGORY==Finance | 8 | OVERLAY NETWORK is established to protect information from passive eavesdropping in device's location |
| PHYSNETWORK.TYPE==Cell AND PHYSNETWORK.SUBTYPE==smallcell AND PHYSNETWORK.ID.inWhiteList( )==FALSE AND APPL.CATEGORY==Health | 7 | Unknown femtocell stations are not to be trusted for this category of applications, because they could be compromised. |
| DESTINATION.CATEGORY==Banking AND APPLNETWORK.TYPE!=TLS | 8 | A web browser going to a Banking category destination and not using SSL/TLS should have a higher degree of security. |
| APPL.CATEGORY==Gaming OR APPL.CATEGORY==Video | 0 | Security for this class of application is not needed. |
| PHYSNETWORK.TYPE==Wi-Fi AND (PHYSNETWORK.SECTYPE==NONE OR PHYSNETWORK.SECTYPE==WEP) | 3 | Unsecured Wi-Fi, or inadequately secured Wi-Fi (using WEP) should require an overlay network (e.g., VPN) to protect application connection. |
| DEVICE.LOCATION==CN | 8 | When user is traveling in China, always use an OVERLAY NETWORK (e.g., VPN) |

There can be an association of a security level with types of connections that can meet that security level. E.g., the rule above for PHYSNETWORK.TYPE==Wi-Fi AND (PHYSNETWORK.SECTYPE==NONE OR PHYSNETWORK.SECTYPE==WEP) to SecurityLevel 3 means that the security component should ensure that at least SecurityLevel 3 is available. In an example, the Wi-Fi physical connection may not be available with EAP (original), or WPA or WPA2 or TKIP (SecurityLevel 4), or EAP extended (SecurityLevel 5); thus the security component may attempt to establish a SecurityLevel 6 or higher connection to meet the policy rule.

Table C below shows an example of a list of different network connection types and corresponding policy security levels.

TABLE C

| POLICY SECURITY LEVEL | NETWORK CONNECTION TYPE |
|---|---|
| 0 | Unsecured Wi-Fi connection |
| 1 | Wi-Fi connection with WEP |
| 2 | Cell connection, small cell |
| 3 | Wi-Fi connection with EAP (original) |
| 4 | Wi-Fi connection with WPA or WPA2 or TKIP |
| 5 | Wi-Fi connection with EAP (extended, e.g., EAP-MD5, EAP-TLS, etc.) |
| 6 | Cell connection, macro cell |
| 7 | SSL or TLS connection to a specific destination |
| 8 | OVERLAY NETWORK (e.g., VPN, IPSEC tunnel, SSL/TLS proxy, etc.) |
| 9 | OVERLAY NETWORK using pinned certificates or secure alternate channel certificate verification/revocation check |

In a specific embodiment, depending upon the particular context one type of network connection may be considered more secure than another type of network connection. For example, if the network infrastructure is trusted (a user's home network, or user's employer's corporate network) then the security level can be higher than for unknown (or non-white-listed networks). There can be black-listed networks, too. In a specific implementation, a method includes determining that a network to which the physical connection is being made is not the corporate network, or is not a known (white list) secure connection, or is a known insecure connection (blacklist).

A geographic location for the device can provide context information whereby otherwise seemingly secure connections will not be as trusted.

Context information that indicates there may be Man in the Middle (MiTM) attack ongoing can require a higher level of security. MiTM attacks can be detected by obtaining via other means a copy of the certificate for the destination or the signing chain information. Other means could include certificate pinning (the security component already has copies of the valid certificates for some locations; if the certificates provided through the network connection, or if the signing chain is different, then there may be a MiTM attack ongoing), or establishing an independent secure connection via a pinned certificate to a server which can provide trustworthy copies of certificates for comparison purposes.

A user's home network during normal times may be at one security level, but while there is a party or other gathering of other people (and their devices) in the user's home, the security level may be lower because there are untrusted devices on the home network able to observe some information about network traffic.

Any type of context information could, according to a policy rule, determine that the context information affects the determination regarding security level.

U.S. patent application Ser. No. 13/693,877, filed Dec. 4, 2012, which is incorporated by reference, describes techniques for identifying categories. Such techniques can be applicable to identifying the category that an application, website, or both belongs to. Categories can be a priori determined categories, or may be determined using an external service.

In a specific embodiment, switching between different physical network connections can mean policy does not trust a particular type of network connection for the device as a whole (based on policy and context information); or that policy requires an application network connection to be made over a different type of physical network connection. In a specific embodiment, a network connection may be established once a three-way handshake is completed, i.e., once the "SYN, SYN-ACK, ACK" messages are made.

A "network connection" may be defined relative to an individual application program on a device or relative to any program or the OS on a device. In a specific implementation, techniques provide for the routing of traffic from such a program to a destination, by VPNs or tunnels or proxies or other encapsulation means. A "network connection" can be a TCP connection that an application may make. A "network connection" can be a network interface (e.g. Wi-Fi, cell network).

An "application network connection" may be different from a "physical network connection" like the Wi-Fi connection or a cell network connection. A specific implementation of the system provides for policy-driven determination regarding "application network connections" over a given "physical network connection." Another specific implementation of the system provides for cases in which it's not just a new "application network connection" that is created (e.g., over an existing "physical network connection") but also where there is a different "physical network connection" employed as a result.

The determination of the appropriate network connection type can be automatic or without user intervention. Policy evaluation, selection, or application can be automatic rather than being manually selected. Factors including geo position (or type of network to which user is connected) can be used to modify which authentication procedures are used (e.g., asking for more extensive authentication processes/information/credentials when in riskier situations).

In a specific implementation, a secure connection (e.g., VPN connection) is established based on current context, e.g., the type or properties of or identity of the network to which the device is connected, and/or the intent to communicate with a particular destination or service or using a particular type of network connection or when communicating from a particular location. There can be policy rules for when/whether a secure connection (e.g., VPN) should be employed.

In a specific implementation, a VPN (or other secure connection) is commenced based on the intent to communicate with a particular destination or service or using a particular type of network connection or when communicating from a particular location; authentication may happen after the commencement of the VPN (or secure) connection and may be contextually dependent.

In a specific implementation, techniques are provided for establishing secure (e.g., VPN) connections contextually, depending on various conditions like the target or remote network destination, the local network to which the user is connected, the geographic location of the user, and so forth.

In this specific implementation, techniques provide for the automatic establishment of secure (e.g., VPN) connections based on various contextual conditions. The type of credentials may depend on the determined need for a secure connection (e.g., VPN). Techniques are provided for detecting the conditions under which a user or a security policy might wish to establish a secure (e.g., VPN) connection (or not), and how such a decision to establish a secure connection (e.g., VPN) is to be made. Techniques are provided for deciding whether there should be a secure (e.g., VPN) connection for a specific app. Techniques are provided for evaluating current context to decide whether to establish (one or more) secure (e.g., VPN) connections.

In a specific implementation, there is a policy which can allow or deny a secure (e.g., VPN) connection. In a specific implementation, techniques are provided for contextually assessing risk with respect to policy regarding the activities to be performed (application(s) to be used, or destination website to be contacted) and making decisions about establishing a secure (e.g., VPN) connection based on those contextual risk elements. Identification of a wireless access point can be used to check against policy about whether a secure connection (e.g., VPN) should be used as part of the decision making process.

In a specific implementation, context information includes a user risk level, device risk level, or both. A user or device risk level may be raised based on recent past events. For example, software may have discovered malware on the device (and handled it), or may have detected the user attempting to access a blocked URL. Such events can raise the risk level for this user or device, even though there is no malware actually on the device (there would have been, conceivably, had the anti-virus software or safe browsing software/service not intervened). The system may provide a security history report.

This patent application describes techniques for managing network connections in connection with mobile communications devices. It should be appreciated, however, that aspects of the system may be implemented in sessile things as in Internet of Things (IoT). Generally, "sessile" things are primarily stationary devices (as opposed to mobile devices). They are often unattended by a user. Examples include the NEST thermostat and the Philips HUE LED lighting system. These things are accessible and controllable over a network, but normally are operating autonomously with respect to earlier received commands or policy.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment.

What is claimed is:

1. A method comprising:
receiving, at a server, context information associated with a mobile communications device;
analyzing, at the server, the context information to obtain a first determination as to whether a communication initiated by a first application executing on the mobile communications device requires a network connection providing a level of security appropriate for the first application, the level of security being one from a plurality of levels of security, wherein each of the plurality of levels of security is required by one or more applications initiating communications on the mobile communications device;

analyzing, at the server, the context information to obtain a second determination as to whether an existing first network connection from the mobile communications device for the communication initiated by the first application executing on the mobile communications device is providing the level of security; and at the server in response to the analysis of the context information:

sending instructions causing the mobile communications device to terminate the existing first network connection when the first determination is that the communication requires a network connection providing a first level of security and the second determination is that the existing first network connection is not providing the first level of security, or allowing the existing first network connection to be maintained on the mobile communications device when the first determination is that the communication requires a network connection providing the first level of security and the second determination is that the existing first network connection is providing the first level of security.

2. The method of claim 1 further comprising, when the second determination is that the existing first network connection is not providing the first level of security and after the step of sending instructions to the mobile communication device to terminate the existing first network connection:

at the server, sending instructions to the mobile communications device to establish a second network connection for the first application executing on the mobile communications device, wherein a second level of security provided by the second network connection is greater than a third level of security provided by the terminated existing first network connection.

3. The method of claim 1 further comprising when the second determination is that the existing first network connection is not providing the first level of security and after the step of sending instructions to the mobile communication device to terminate the existing first network connection:

at the server, sending instructions to the mobile communications device to establish a second network connection for the first application executing on the mobile communications device, wherein a second level of security provided by the second network connection is less than a third level of security provided by the terminated first network connection.

4. The method of claim 1 further comprising:
at the server, allowing the mobile communications device to maintain an existing second network connection for a second application executing on the mobile communications device, wherein a third level of security provided by the existing first network connection for the first application is greater than a second level of security provided by the second network connection.

5. The method of claim 1 further comprising:
at the server, allowing the mobile communications device to maintain a second network connection for a second application executing on the mobile communications device, wherein a third level of security provided by the existing first network connection for the first application is less than a second level of security provided by the second network connection.

6. The method of claim 1, wherein the context information regards the first application or a destination, the method further including:

receiving, at the server, a security policy from the mobile communications device or from an administrator, and using the security policy, during the analyzing the context information, to obtain the first determination and during the analyzing the context information to obtain the second determination.

7. The method of claim 6, wherein the security policy includes a category including a type of destination or a type of application, and the category is associated with a type of network connection;

wherein the first determination that the communication requires a network connection providing the first level of security includes determining that the first application or the destination of the existing first network connection falls within the type of application or the type of destination of the category of the security policy;

wherein the second determination that the existing first network connection is not providing the first level of security includes determining that the existing first network connection is not the type of network connection associated with the category of the security policy;

wherein the instructions are sent to the mobile communications device to terminate the existing first network connection when the first determination is that the first application or the destination of the existing first network connection falls within the type of application or the type of destination of the category of the security policy and the second determination is that the existing first network connection is not the type of network connection associated with the category of the security policy; and wherein the existing first network connection is allowed to be maintained on the mobile communications device when the first determination is that the first application or the destination of the existing first network connection falls within the type of application or the type of destination of the category of the security policy and the second determination is that the existing first network connection is the type of network connection associated with the category of the security policy.

8. The method of claim 6, wherein:
the context information regards the existing first network connection;
the first determination that the communication requires a network connection providing the first level of security includes:
determining that the existing first network connection must be a type of network connection required by the security policy;
the second determination that the existing first network connection is not providing the first level of security includes:
determining that the existing first network connection is not the type of network connection;
the instructions are sent to the mobile communications device to terminate the existing first network connection when:
the first determination is that the existing first network connection must be the type of network connection and the second determination is that the existing first network connection is not the type of network connection; and the existing first existing network connection is allowed to be maintained on the mobile communications device when:

the first determination is that the existing first network connection must be the type of network connection and the second determination is that the existing first network connection is the type of network connection.

9. A method comprising:

receiving, at a server, context information associated with a mobile communications device, the context information including a destination of the first network connection and information regarding: a use of the first network connection, or the first application;

analyzing, at the server, the context information to determine whether an existing first network connection from the mobile communications device for a first application executing on the mobile communications device offers a level of security appropriate for the first application, the analysis of the context information determining:

the destination provides a first service and a second service, and the level of security is appropriate for the first service and is not appropriate for the second service; and at the server in response to the analysis of the context information:

sending instructions causing the mobile communications device to terminate the first network connection when the analysis of the context information determines that the first application is using the second service, or allowing the first network connection to be maintained on the mobile communications device when the analysis of the context information determines that the first application is using the first service.

10. A non-transitory, computer-readable storage medium having stored thereon a plurality of instructions, which, when executed by a processor of a server, cause the server to:

receive context information associated with a mobile communications device;

analyze the context information to obtain a first determination as to whether a communication initiated by a first application executing on the mobile communications device requires a network connection providing a level of security appropriate for the first application, the level of security being one from a plurality of levels of security, wherein each of the plurality of levels of security is required by one or more applications initiating communications on the mobile communications device;

analyzing the context information to obtain a second determination as to whether an existing first network connection from the mobile communications device for the communication initiated by the first application executing on the mobile communications device is providing the level of security; and in response to the analysis of the context information:

send instructions causing the mobile communications device to terminate the existing first network connection when the first determination is that the communication requires a network connection providing a first level of security and the second determination is that the existing first network connection is not providing the first level of security, or allow the existing first network connection to be maintained on the mobile communications device when the first determination is that the communication requires a network connection providing the first level of security and the second determination is that the existing first network connection is providing the first level of security.

11. The non-transitory, computer-readable storage medium of claim 10, when the second determination is that the existing first network connection is not providing the first level of security and after the step of sending instructions to the mobile communication device to terminate the existing first network connection, the instructions further causing the server to:

send instructions to the mobile communications device to establish a second network connection for the first application executing on the mobile communications device, wherein a second level of security provided by the second network connection is appropriate for the first application.

12. The non-transitory, computer-readable storage medium of claim 10, wherein the context information regards the first application or a destination, the instructions further causing the server to:

receive a security policy from the mobile communications device or from an administrator, and using the security policy, during the analysis of the context information, to obtain the first determination and during the analyzing the context information to obtain the second determination.

13. The non-transitory, computer-readable storage medium of claim 12, wherein the security policy includes a category including a type of destination or a type of application, and the category is associated with a type of network connection;

wherein the first determination that the communication requires a network connection providing the first level of security includes determining that the first application or the destination of the existing first network connection falls within the type of application or the type of destination of the category of the security policy;

wherein the second determination that the existing first network connection is not providing the first level of security includes determining that the existing first network connection is not the type of network connection associated with the category of the security policy;

wherein the instructions are sent to the mobile communications device to terminate the existing first network connection when the first determination is that the first application or the destination of the existing first network connection falls within the type of application or the type of destination of the category of the security policy and the second determination is that the existing first network connection is not the type of network connection associated with the category of the security policy; and wherein the existing first network connection is allowed to be maintained on the mobile communications device when the first determination is that the first application or the destination of the existing first network connection falls within the type of application or the type of destination of the category of the security policy and the second determination is that the existing first network connection is the type of network connection associated with the category of the security policy.

14. The non-transitory, computer-readable storage medium of claim 12, wherein:
the context information regards the existing first network connection;
the first determination that the communication requires a network connection providing the first level of security includes:
determining that the existing first network connection must be a type of network connection required by the security policy;
the second determination that the existing first network connection is not providing the first level of security includes:
determining that the existing first network connection is not the type of network connection;
the instructions are sent to the mobile communications device to terminate the existing first network connection when:
the first determination is that the existing first network connection must be the type of network connection and the second determination is that the existing first network connection is not the type of network connection; and
the existing first network connection is allowed to be maintained on the mobile communications device when:
the first determination is that the existing first network connection must be the type of network connection and the second determination is that the existing first network connection is the type of network connection.

15. A non-transitory, computer-readable storage medium having stored thereon a plurality of instructions, which, when executed by a processor of a server, cause the server to:
receive context information associated with a mobile communications device, the context information including a destination of the first network connection and information regarding: a use of the first network connection, or the first application;
analyze the context information to determine whether an existing first network connection from the mobile communications device for a first application executing on the mobile communications device offers a level of security appropriate for the first application, the analysis of the context information determining:
the destination provides a first service and a second service, and
the level of security is appropriate for the first service and is not appropriate for the second service; and
in response to the analysis of the context information:
send instructions causing the mobile communications device to terminate the first network connection when the analysis of the context information determines that the first application is using the second service, or
allow the first network connection to be maintained on the mobile communications device when the analysis of the context information determines that the first application is using the first service.

16. A system, comprising a server with at least one processor and memory and instructions that when executed by the at least one processor cause the server to:
receive context information associated with a mobile communications device;
analyze the context information to obtain a first determination as to whether a communication initiated by a first application executing on the mobile communications device requires a network connection providing a level of security appropriate for the first application, the level of security being one from a plurality of levels of security, wherein each of the plurality of levels of security is required by one or more applications initiating communications on the mobile communications device;
analyzing the context information to obtain a second determination as to whether an existing first network connection from the mobile communications device for the communication initiated by the first application executing on the mobile communications device is providing the level of security; and
in response to the analysis of the context information:
send instructions causing the mobile communications device to terminate the existing first network connection when the first determination is that the communication requires a network connection providing a first level of security and the second determination is that the existing first network connection is not providing the first level of security, or
allow the existing first network connection to be maintained on the mobile communications device when the first determination is that the communication requires a network connection providing the first level of security and the second determination is that the existing first network connection is providing the first level of security.

17. The system of claim 16, when the second determination is that the existing first network connection is not providing the first level of security and after the step of sending instructions to the mobile communication device to terminate the existing first network connection, the instructions further causing the server to:
send instructions to the mobile communications device to establish a second network connection for the first application executing on the mobile communications device, wherein a second level of security provided by the second network connection is appropriate for the first application.

18. The system of claim 16, wherein the context information regards the first application or a destination, the instructions further causing the server to:
receive a security policy from the mobile communications device or from an administrator, and using the security policy, during the analysis of the context information, to obtain the first determination and during the analyzing the context information to obtain the second determination.

19. The system of claim 18, wherein the security policy includes a category including a type of destination or a type of application, and the category is associated with a type of network connection;
wherein the first determination that the communication requires a network connection providing the first level of security includes determining that the first application or the destination of the existing first network connection falls within the type of application or the type of destination of the category of the security policy;
wherein the second determination that, the existing first network connection is not providing the first level of security includes determining that the existing first network connection is not the type of network connection associated with the category of the security policy;

wherein the instructions are sent to the mobile communications device to terminate the existing first network connection when the first determination is that the first application or the destination of the existing first network connection falls within the type of application or the type of destination of the category of the security policy and the second determination is that the existing first network connection is not the type of network connection associated with the category of the security policy; and wherein the existing first network connection is allowed to be maintained on the mobile communications device when the first determination is that the first application or the destination of the existing first network connection falls within the type of application or the type of destination of the category of the security policy and the second determination is that the existing first network connection is the type of network connection associated with the category of the security policy.

20. The system of claim 18, wherein:

the context information regards the existing first network connection;

the first determination that the communication requires a network connection providing the first level of security includes:
   determining that the existing first network connection must be a type of network connection required by the security policy;

the second determination that the existing first network connection is not providing the first level of security includes:
   determining that the existing first network connection is not the type of network connection;

the instructions are sent to the mobile communications device to terminate the existing first network connection when:
   the first determination is that the existing first network connection must be the type of network connection and the second determination is that the existing first network connection is not the type of network connection; and the existing first existing network connection is allowed to be maintained on the mobile communications device when:
   the first determination is that the existing first network connection must be the type of network connection and the second determination is that the existing first network connection is the type of network connection type.

21. A system, comprising a server with at least one processor and memory and instructions that when executed by the at least one processor cause the server to:

receive context information associated with a mobile communications device, the context information including a destination of the first network connection and information regarding: a use of the first network connection, or the first application;

analyze the context information to determine whether an existing first network connection from the mobile communications device for a first application executing on the mobile communications device offers a level of security appropriate for the first application, the analysis of the context information determining:
   the destination provides a first service and a second service, and
   the level of security is appropriate for the first service and is not appropriate for the second service; and in response to the analysis of the context information:
   send instructions causing the mobile communications device to terminate the first network connection are sent when the analysis of the context information determines that the first application is using the second service, or
   allow the first network connection to be maintained on the mobile communications device when the analysis of the context information determines that the first application is using the first service.

* * * * *